(12) United States Patent
Ueno

(10) Patent No.: US 7,136,900 B2
(45) Date of Patent: Nov. 14, 2006

(54) INFORMATION PROCESSING APPARATUS AND METHOD RECORDING MEDIUM, AND PROGRAM

(75) Inventor: Hiroshi Ueno, Tokyo (JP)

(73) Assignee: Sony Corporation, Tokyo (JP)

( * ) Notice: Subject to any disclaimer, the term of this patent is extended or adjusted under 35 U.S.C. 154(b) by 716 days.

(21) Appl. No.: 10/107,406

(22) Filed: Mar. 28, 2002

(65) Prior Publication Data

US 2002/0156855 A1    Oct. 24, 2002

(30) Foreign Application Priority Data

Mar. 29, 2001   (JP)   ............................. 2001-097075

(51) Int. Cl.
*G06F 15/16* (2006.01)
(52) U.S. Cl. ..................................... 709/206
(58) Field of Classification Search ................ 709/206
See application file for complete search history.

(56) References Cited

U.S. PATENT DOCUMENTS

| | | | | |
|---|---|---|---|---|
| 5,958,052 | A * | 9/1999 | Bellovin et al. | 713/201 |
| 6,275,850 | B1 * | 8/2001 | Beyda et al. | 709/206 |
| 6,324,569 | B1 * | 11/2001 | Ogilvie et al. | 709/206 |
| 6,591,291 | B1 * | 7/2003 | Gabber et al. | 709/206 |
| 6,735,568 | B1 * | 5/2004 | Buckwalter et al. | 705/1 |

FOREIGN PATENT DOCUMENTS

EP    0 361 738    4/1990
EP    0 872 806    10/1998

OTHER PUBLICATIONS

Arensburger et al., To Take Arms Against a Sea of Email, Communications of the ACM, Mar. 1995, vol. 38, No. 3, 108-109.*
Pazzani, Representation of Electronic Mail Filtering Profiles, a User Study, International Conference on Intelligent User Interfaces, Proceedings of the 5th international conference on Intelligent user interfaces, New Orleans, LA, 2000, 202-206.*
Boone, Concept Features in Re:Agent, an Intelligent Email Agent, International Conference on Autonomous Agents, Proceedings of the second international conference on Autonomous agents, Minneapolis, MN 1998, 141-148.*
Berghel, Email—The Good, The Bad, and The Ugly, Communications of the ACM, Apr. 1997, vol. 40, No. 4, 11-15.*

(Continued)

Primary Examiner—Jason Cardone
Assistant Examiner—Jeffrey R. Swearingen
(74) Attorney, Agent, or Firm—Oblon, Spivak, McClelland, Maier & Neustadt, P.C.

(57) ABSTRACT

The present invention is intended to provide a receiving apparatus and method, a recording medium, and a program. A script added as an attachment file to an electronic mail is extracted therefrom in response to a mail opening command, a syntax analysis is performed on the extracted script, predetermined information stored in the receiving apparatus is retrieved on the basis of the result of the syntax analysis, the retrieved predetermined information is determined whether or not it is attached with a predetermined attribute, and, if the predetermined attribute is found attached to the predetermined information, the personal information contained in the predetermined information is deleted, thereby outputting the predetermined information with the personal information deleted. Consequently, the novel setup can prevent the personal information of recipients of electronic mails containing a script which is intended to take out the personal information without notice.

14 Claims, 52 Drawing Sheets

OTHER PUBLICATIONS

Spafford, Eugene. "The Internet Worm Program: An Analysis". Computer Communication Review, Dec. 8, 1988. Purdue Technical Report CSD-TR-823.*

RFC 1135: The Helminthiasis of the Internet, Dec. 1989.*

M. Vandenwauver, et al., Infrastructure for Collaborative Enterprises. (Wet Ice '99) Proceedings. IEEE 8TH International Workshops on Stanford, pp. 152-157, XP-10358651, "Why Enterprises Need More Than Firewalls and Intrusion Detection Systems", Jun. 16, 1999.

K. J. Maly, et al., Infrastructure for Collaborative Enterprises. (Wet Ice 96) Proceedings of the 5TH Workshop on Stanford, pp. 106-111, XP-10199817, "A Privilege Management and Enforcement System for Distributed Resource Sharing", Jun. 19, 1996.

Y. Sakama, et al., Special Feature (1): NTT International Symposium '96, vol. 9, No. 3, pp. 40-48, XP-000694464, "Agent Communications on OCN", May 1, 1997.

* cited by examiner

FIG. 15

```
To: "Someone"<someone@sony.co.jp>
Subject:   othello
MIME-Version: 1.0
Content-Type: multipart/mixed;
boundary="-----=_NextPart_000_0011_01BFA9E7.2EE28580"
```
— BODY

```
------=_NextPart_000_0011_01BFA9E7.2EE28580
Content-Type: text/plain;
           charset="iso-2022-jp"
Content-Transfer-Encoding: 7bit
Second Move of Othello
```
— TEXT

```
------=_NextPart_000_0011_01BFA9E7.2EE28580
Content-Type: application/x-emma <SCRIPT LANGUAGE=emmascript>
function othello() {
        show();
}
function ontap() {
        var x=getx();
        var y=gety();
        if (check(x,y)==false) {
                confirm("error")
                return;
        }
        update(x,y);
        Sendmail(getsender());
        exit;
}
function onload() {
        othello();
}
...
</SCRIPT>

------=_NextPart_000_0011_01BFA9E7.2EE28580--

-----Next_Part(Wed_Apr_19_11:42:48_2000_705)-----
```
— SCRIPT

FIG. 17

```
------=_NextPart000_0011_01BFA9E7.2EE28580
Content-Type: application/x-emma

<SCRIPT LANGUAGE=javascript>
function othello () {
        show () ;
}
function ontap () {
        var x=getx () ;
        var y=gety () ;
        if (check (x, y) == false) {
          confirm ("error")
          return;
        }
        update (x, y) ;
        Sendmail (getsender ()) ;
        exit ;
}
function onload () {
        othello () ;
}
...
</SCRIPT>
```

FIG. 31

```
                 ┌ To: "Someone"<someone@sony.co.jp>
                 │ Subject:   othello
              B  │ MIME-Version: 1.0
              O  │ Content-Type: multipart/mixed;
              D  │ boundary="------=_NextPart_000_0011_01BFA9E7.2EE28580"
              Y  │
                 │
              T  │ ------=_NextPart_000_0011_01BFA9E7.2EE28580
              E  │ Content-Type: text/plain;
              X  │           charset="iso-2022-jp"
              T  │ Content-Transfer-Encoding: 7bit
                 └ Second Move of Othello ┌ ------=_NextPart_000_0011_01BFA9E7.2EE28580
                 │ Content-Type: application/x-emma
                 │
                 │ <SCRIPT LANGUAGE=emmascript>
                 │ function othello() {
                 │         show();
                 │ }
                 │ function ontap() {
                 │         var x=getx();
                 │         var y=gety();
                 │         if (check(x,y)==false) {
              S  │                 confirm("error")
              C  │                 return;
              R  │         }
              I  │         update(x,y);
              P  │         Sendmail(getsender());
              T  │         exit;
                 │ }
                 │ function onload() {
                 │         othello();
                 │ }
                 │ ...
                 │ </SCRIPT>
                 │ </SIGNATURE>
                 │ 347a9d8684ab96533fb6b51906fdacf9
                 │ </SIGNATURE>
                 │
                 │ ------=_NextPart_000_0011_01BFA9E7.2EE28580--
                 │
                 └ -----Next_Part (Wed_Apr_19_11:42:48_2000_705)-----
```

FIG. 51

| ATTRIBUTE | DATE | TIME | CONTENTS | PLACE | MATE | COMMENTS |
|---|---|---|---|---|---|---|
| ATTRIBUTE A | 01-2-16 | 10:00-10:00 | MEETING | HEAD OFFICE | MR. TANAKA | * * * * * * |
| ATTRIBUTE A | 01-2-16 | 11:00-12:00 | ARRANGEMENT | COMPANY A | MR. SATO | * * * * * * |
| ATTRIBUTE A | 01-2-16 | 16:00-17:00 | ARRANGEMENT | HEAD OFFICE | MR. KAWAMURA | * * * * * * |

INFORMATION PROCESSING APPARATUS AND METHOD RECORDING MEDIUM, AND PROGRAM

BACKGROUND OF THE INVENTION

The present invention relates to a receiving apparatus and method, a recording medium, and a program and, more particularly, to a receiving apparatus and method, a recording medium, and a program which are capable of preventing personal information from being leaked when a script attached to an electronic mail is executed in an unauthorized manner.

Systems which send and receive text-based data via networks, or so-called electronic mail systems, are currently in wide use.

A receiving apparatus which has received an electronic mail (hereafter sometimes referred to simply as mail) displays the received mail in the form of text.

Sometimes, a sender of an electronic mail may require its recipient to take some action.

Japanese Patent Laid-open Nos. 2000-47955 and Hei 11-65964 disclose systems for sending and receiving data for use in the execution of an application program by attaching the data to an electronic mail to cause its recipient to execute some processing or take some action.

If the sender of an electronic mail can cause its recipient to take actions desired by the sender as described above, the sender with malicious intent can cause the recipient to take some action which is not desired by the recipient.

For example, the sender can retrieve as desired confidential personal information of the recipient which the recipient wants to keep confidential.

SUMMARY OF THE INVENTION

It is therefore an object of the present invention to provide a receiving apparatus and method, a recording medium, and a program which are capable of preventing the personal information of a mail recipient from being leaked if unauthorized attempts are performed to retrieve the personal information by a mail sender.

According to an aspect of the present invention, there is provided a receiving apparatus for receiving an electronic mail, including:

an extracting means for extracting, in response to an opening command for opening the electronic mail, a script added to the electronic mail as an attachment file;

an executing means for executing a syntax analysis on the script extracted by the extracting means;

a retrieving means for retrieving, on the basis of the execution of the syntax analysis, predetermined information stored in the receiving apparatus;

a determining means for determining whether or not an attribute is attached to the predetermined information retrieved by the retrieving means;

a deleting means for, if the attribute is found attached to the predetermined information by the determining means, deleting personal information contained in the predetermined information; and an output control means for controlling the output of the predetermined information with the personal information deleted by the deleting means.

According to another aspect of the present invention, there is provided a receiving method for a receiving apparatus for receiving an electronic mail, including the steps of:

extracting, in response to an opening command for opening the electronic mail, a script added to the electronic mail as an attachment file;

executing a syntax analysis on the script extracted in the extracting step;

retrieving, on the basis of the execution of the syntax analysis, predetermined information stored in the receiving apparatus;

determining whether or not an attribute is attached to the predetermined information retrieved in the retrieving step;

deleting, if the attribute is found attached to the predetermined information in the determining step, personal information contained in the predetermined information; and controlling the output of the predetermined information with the personal information deleted in the deleting step.

According to still another aspect of the present invention, there is provided a recording medium recording a computer-readable program for controlling a receiving apparatus for receiving an electronic mail, including the steps of:

extracting, in response to an opening command for opening the electronic mail, a script added to the electronic mail as an attachment file;

executing a syntax analysis on the script extracted in the extracting step;

retrieving, on the basis of the execution of the syntax analysis, predetermined information stored in the receiving apparatus;

determining whether or not an attribute is attached to the predetermined information retrieved in the retrieving step;

deleting, if the attribute is found attached to the predetermined information in the determining step, personal information contained in the predetermined information; and controlling the output of the predetermined information with the personal information deleted in the deleting step.

According to yet another aspect of the present invention, there is provided a program for causing a computer for controlling a receiving apparatus for receiving an electronic mail to execute the steps of:

extracting, in response to an opening command for opening the electronic mail, a script added to the electronic mail as an attachment file;

executing a syntax analysis on the script extracted in the extracting step;

retrieving, on the basis of the execution of the syntax analysis, predetermined information stored in the receiving apparatus;

determining whether or not an attribute is attached to the predetermined information retrieved in the retrieving step;

deleting, if the attribute is found attached to the predetermined information in the determining step, personal information contained in the predetermined information; and controlling the output of the predetermined information with the personal information deleted in the deleting step.

BRIEF DESCRIPTION OF THE DRAWINGS

These and other objects of the invention will be seen by reference to the description, taken in connection with the accompanying drawing, in which:

FIG. 15 illustrates one example of the electronic mail;

FIG. 17 illustrates an exemplary script;

FIG. 31 illustrates an example of the electronic mail which includes a script storing authentication data;

FIG. 51 shows an example of a recording of the schedule data associated with a schedule table;

DETAILED DESCRIPTION OF THE PREFERRED EMBODIMENTS

Figure 1:
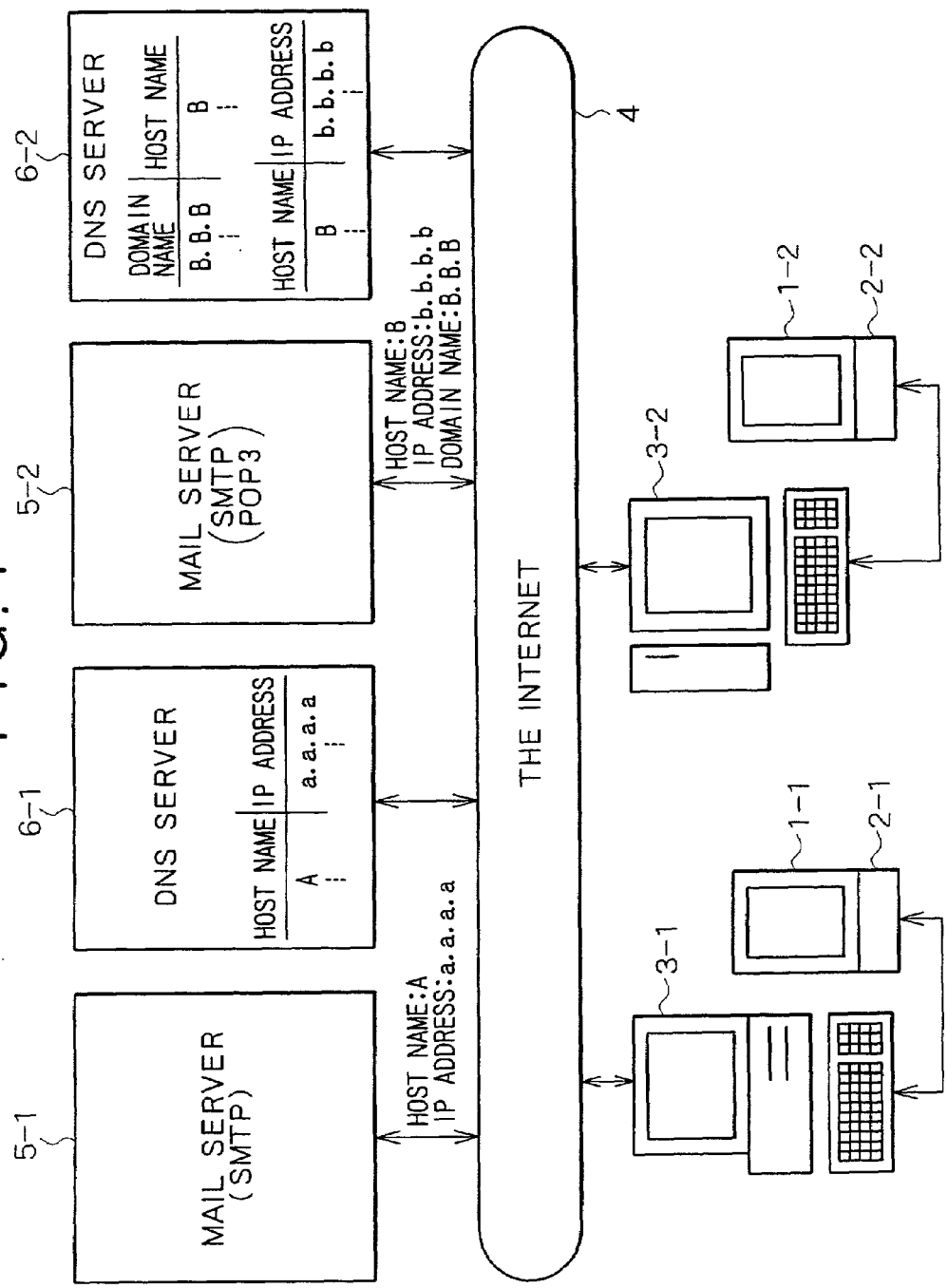
FIG. 1 is a schematic diagram illustrating an electronic mail send/receive system practiced as a first embodiment associated with the present invention.

This invention will be described in further detail by way of example with reference to the accompanying drawings. Now, referring to FIG. 1, there is shown a schematic diagram illustrating an electronic mail send/receive system practiced as a first embodiment of the present invention. A PDA (Personal Digital Assistant) 1-1 is mounted on a cradle 2-1 and connected to a personal computer 3-1 via the cradle 2-1.

The PDA 1-1 sends an electronic mail to a PDA 1-2 via the cradle 2-1, the personal computer 3-1, the Internet 4, mail servers 5-1 and 5-2, and DNS (Domain Name System) servers 6-1 and 6-2. When the PDA 1-2 receives the electronic mail and if the received electronic mail contains a script (for example, a Java script), the PDA 1-2 extracts the script and executes the extracted script.

The PDA 1-2 is mounted on a cradle 2-2 and connected to a personal computer 3-2 via the cradle 2-2.

The PDA 1-2 sends an electronic mail to the PDA 1-1 via the cradle 2-2, the personal computer 3-2, the Internet 4, the mail servers 5-1 and 5-2, and DNS servers 6-1 and 6-2.

When the PDA 1-1 receives the electronic mail and if the received electronic mail contains a script, the PDA 1-1 extracts the script and executes the extracted script.

The cradle 2-1 is connected to the PDA 1-1 and the personal computer 3-1 by means of serial communication based on the USB (Universal Serial Bus) or RS-232-C standard. The cradle 2-1 has a terminal for connection with the PDA 1-1 and a cable for connection with the personal computer 3-1, thereby sending and receiving electronic mails between the PDA 1-1 and the personal computer 3-1. Also, the cradle 2-1 supplies power to the mounted PDA 1-1.

The personal computer 3-1 is connected to the PDA 1-1 via the cradle 2-1 and to the Internet 4 via a public switched phone line and an Internet connection service provider for example, not shown. The personal computer 3-1 sends, via the Internet 4, an electronic mail supplied from the PDA 1-1 to the mail server 5-1 and sends an electronic mail supplied from the mail server 5-1 to the PDA 1-1.

The cradle 2-2 is connected to the PDA 1-2 and the personal computer 3-2 by means of serial communication based on the USB or RS-232-C standard. The cradle 2-1 has a terminal for connection with the PDA 1-2 and a cable for connection with the personal computer 3-2, thereby sending and receiving electronic mails between the PDA 1-2 and the personal computer 3-2. Also, the cradle 2-2 supplies power to the mounted PDA 1-2.

The personal computer 3-2 is connected to the PDA 1-2 via the cradle 2-2 and to the Internet 4 via a public switched phone line and an Internet connection service provider for example, not shown. The personal computer 3-2 sends, via the Internet 4, an electronic mail supplied from the PDA 1-2 to the mail server 5-2 and sends an electronic mail supplied from the mail server 5-2 to the PDA 1-2.

The mail server 5-1 receives an electronic mail from the PDA 1-1 or PDA 1-2 via the Internet 4 and, if the domain of the destination of the received electronic mail does not correspond to the mail server 5-1, the mail server 5-1 transfers the received electronic mail to another mail server, for example the mail server 5-2. The mail server 5-1 receives an electronic mail transferred from the mail server 5-2 via the Internet 4 and, if the domain of the destination of the received electronic mail does not correspond to the mail server 5-1, the mail server 5-1 transfers the received electronic mail to another mail server, not shown.

If the domain of the destination of the electronic mail received from the PDA 1-1 or 1-2 or the mail server 5-2 via the Internet 4 corresponds to the mail server 5-1, the mail server 5-1 stores the received electronic mail into its mail box called a spool.

If the domain of the destination of the electronic mail received from the PDA 1-1 or 1-2 via the Internet 4 does not correspond to the mail server 5-2, the mail server 5-2 transfers the received electronic mail to another mail server, for example the mail server 5-1. The mail server 5-2 receives the electronic mail transferred from the mail server 5-1 via the Internet 4 and, if the received electronic mail does not correspond to the mail server 5-2, transfers the received electronic mail to another mail server, not shown.

If the domain of the destination of the electronic mail received from the PDA 1-1 or 1-2 or the mail server 5-1 via the Internet 4 corresponds to the mail server 5-2, the mail server 5-2 stores the received electronic mail into its mail box called a spool.

When the DNS server 6-1 receives a host name from the PDA 1-1 or 1-2 or the mail server 5-1 or 5-2, the DNS 6-1 sends the IP (Internet Protocol) address corresponding to the received host name to the PDA or mail server from which the host name has been sent.

When the DNS server 6-1 receives a domain name from the mail server 5-1 or 5-2, the DNS server 6-1 sends the host name of the mail server (for example, the mail server 5-1 or 5-2) which corresponds to the received domain name to the mail server from which the domain name has been sent.

When the DNS server 6-2 receives a host name from the PDA 1-1 or 1-2 or the mail server 5-1 or 5-2, the DNS server 6-2 sends the IP address corresponding to the received host name to the PDA or mail server from which the host name has been sent.

When the DNS server 6-2 receives a domain name from the mail server 5-1 or 5-2, the DNS server 6-2 sends the host name of the mail server (for example, the mail server 5-1 or 5-2) corresponding to the received domain name to the mail server from which the domain name has been sent.

In what follows, the PDA 1-1 and the PDA 1-2 are generically referred to simply as a PDA 1 unless otherwise noted. Likewise, the cradle 2-1 and the cradle 2-2 are generically referred to simply as a cradle 2 unless otherwise noted. Likewise, the personal computer 3-1 and the personal computer 3-2 are generically referred to simply as a personal computer 3 unless otherwise noted.

The following describes mail sending and receiving operations to be performed via the Internet 4.

The sending and receiving of electronic mails via the Internet 4 is very much like those of postal mail. In postal mail, a letter arrives at its recipient in four steps; (1) write a letter, (2) put the letter into a post, (3) transfer the letter between post offices, and (4) deliver the letter to its recipient.

In electronic mail based on the Internet 4, electronic mail arrives at its recipient in four steps; (1) write an electronic mail by use of a mail send/receive program, (2) press the send button of this program upon finishing the writing, (3) transfer the written electronic mail between mail servers, and (4) the recipient presses the receive button of his/her mail send/receive program.

The mail send/receive program sends and receives electronic mails. The mail send/receive program is also called a mailer and has the capabilities equivalent to the mailbox on the road and the letter box at home.

Most mail send/receive programs have capabilities of displaying electronic mails on a display screen or editor capabilities for mail writing. The user operates the mail send/receive program to send and receive electronic mails.

Typical mail send/receive programs are Outlook Express (trademark) of Microsoft Corporation, Eudora Pro (trademark) of QUALCOMM Incorporated, and such free software as Becky! Internet Mail, and AL-Mail32, for example.

Each mail server has a role of the post office, so to speak. The mail server receives an electronic mail sent from a mail send/receive program and sends the received electronic mail to a mail send/receive program. A typical mail server program is sendmail (trademark) of Sendmail, Inc., for example.

The mail server has three main roles. First, the mail server properly sends an electronic mail received from a mail send/receive program to another mail server. Second, the mail server arranges the electronic mails received from another mail server as classified by destination (or recipient) and manages the mail thus arranged. Third, the mail server sends the managed electronic mails to mail send/receive programs upon their requests.

Processing of the mail send/receive program for sending electronic mails to a mail server is different from the processing of the mail server for sending electronic mails to the mail send/receive program in processing procedure and communication procedure.

The communication procedure is referred to as a protocol. The processing of the mail send/receive program for sending electronic mails to the mail server and the processing of the mail server for sending electronic mails to another mail server are executed on the basis of SMTP (Simple Mail Transfer Protocol) in many cases.

The processing of the mail send/receive program for receiving electronic mails from the mail server is executed on the basis of POP3 (Post Office Protocol Version 3) in many cases.

The mail server has different ports for SMTP and POP3. The mail send/receive program, when sending electronic mails, communicates with the mail server via the port corresponding to SMTP and, when receiving electronic mails, communicates with the mail server via the port corresponding to POP3.

In the case of postal mail, a letter sent from abroad is postmarked every time it passes a country. Likewise, electronic mail is postmarked electronically.

When an electronic mail is sent, it is postmarked every time it passes a mail server. This postmark is called a header because it is attached to the beginning of the electronic mail.

The header is largely divided into three blocks; the lowest part (nearest to the body text) of each electronic mail is a block which is attached by the mail send/receive program and the upper two parts are blocks which are attached by the mail server.

The header stores more recent information as these parts go up.

The header information attached by the mail send/receive program is similar to the address of postal mail. "From" stores the mail address of the sender, "To" stores the address of the recipient, and "Subject" stores the title of that electronic mail.

Of the blocks attached by the mail server, "Received" stores a time stamp. "form" stores the name of the server through which this electronic mail has passed.

Each mail server attaches each passing electronic mail with the block "Received." Therefore, sequentially checking the "Received" blocks from bottom to top indicates the mail servers through which the electronic mail has been passed.

The following describes the setting of the mail send/receive program. The information which must be properly set for sending an electronic mail includes the electronic mail address corresponding to the mail send/receive program and the host name of the mail server corresponding to SMTP.

The electronic mail address corresponding to the mail send/receive program is the address of the sender corresponding to sender's name. If the electronic mail address corresponding to the mail send/receive program is not set, the recipient cannot know its sender. If the destination address is not known, the electronic mail cannot be returned.

The mail send/receive program inserts the electronic mail address corresponding thereto into the "From" line in the header. The electronic mail address corresponding to the mail send/receive program is also used as the destination address to which the recipient writes back. Some mail send/receive programs can change the recipient of answer mail by setting the item of return address.

To the host name of the mail server corresponding to SMTP, the host name of the mail server to which the mail send/receive program sends an electronic mail is set. When sending an electronic mail, the mail send/receive program sends it to the mail server on the basis of the host name of the mail server corresponding to SMTP. The host name is written as "mailserver.so-net.ne.jp" for example.

The electronic mail address and the host name are written on the basis of a domain name. The domain name is written as a country name, organization type, and company name each being separated from the other by a comma. In each domain name, the larger divisions come backward in domain name character string.

Each electronic mail address includes the user name followed by delimiter "@" followed by the domain name.

The host name includes the server name followed by delimiter "." followed by the domain name.

As written such, each electronic mail address or host name provides a unique mail address or host name.

The domain names of electronic mail address and host name may have upper and lower cases, no distinction being made between them.

The following describes the sending of electronic mails by a mail send/receive program to a mail server. In sending electronic mails, the mail send/receive program must acquire the IP address corresponding to the host name. The IP address is written as a combination of numerals and commas like "192.168.0.1" for example.

DNS is a system for converting a host name into an IP address. The Internet 4 has many DNS servers. When a host name is sent to any of the DNS servers, that DNS server returns the IP address corresponding to that host name.

For example, the DNS server 6-1 shown in FIG. 1 stores IP address a.a.a.a in correspondence with host name A.

Immediately before accessing a mail server, the mail send/receive program gets the IP address of that mail server from the DNS server.

The following describes a procedure of sending an electronic mail from a mail send/receive program to a mail server. The mail send/receive program sends an electronic mail to the mail server by following the procedure of SMTP.

The SMTP procedure includes TCP (Transmission Control Protocol) setup, mail server call, preparation for sending, address notification, sending of body text, end confirmation, and TCP end processing. Each of mail server call, preparation for sending, address notification, sending of body text, and end confirmation includes a request from the mail send/receive program and a reply from the mail server.

In the SMTP processing, the mail send/receive program and the mail server communicate with each other by command statement and return mail code. In a command statement "RCPT from:y@so-net.ne.jp" for example, "RCPT" is a command for telling the mail destination address, which is "y@so-net.ne.jp."

In the return mail code, "Yes" is "250" for example. Some of the return mail codes are: 251 indicates "No such user exists"; 450 indicates "Mail box is in use"; 451 indicates "Abnormal end due to error"; 452 indicates "Necessary resources not enough"; 501 indicates "Command syntax error"; 502 indicates "Command unavailable"; and 550 indicates "Mail box is not found."

Electronic mail has a broadcasting capability. This capability sends a same electronic mail to multiple recipients.

For example, when a plurality of mail addresses are written to "To" line of the header, the mail send/receive program repeats the process of sending the RCPT command for each of these mail addresses.

The broadcasting is also supported by use of a dedicated header such as "CC" (Carbon Copy) or "BCC" (Blind Carbon Copy) for example.

When an electronic mail is sent by use of the CC line or the BCC line, each recipient of the electronic mail knows that the received electronic mail is a copy of the original because the "To" line of the header does not have the recipient address.

When an electronic mail is sent by use of the CC line, the header stores the mail address of the recipient. When an electronic mail is sent by use of the BCC line, the mail send/receive program deletes the BCC line from the header upon processing for RCPT command transmission and sends the body text of the electronic mail. The transmission of electronic mails by use of the BCC line is useful when the sender does not want to tell the addresses of the recipients to which a particular electronic mail is broadcast.

The following describes the processing in which a mail server transfers electronic mails to a mail server near the destination address of a particular electronic mail. The transfer of electronic mails between mail servers is executed in accordance with the SMTP procedure.

In the transfer of electronic mails between mail servers, the sending mail server extracts the domain name from the destination address of a particular electronic mail and sends the extracted domain name to the DNS server.

Because the DNS server stores the relationship between domain name and mail server host name as an MX record, the DNS server sends the host name of the mail server corresponding to the domain name to the mail server which has sent the domain name.

For example, the DNS server 6-2 shown in FIG. 1 stores host name B as related domain name B.B.B.

The mail server which has received the host name sends it to the DNS server.

Because the DNS server stores the relationship between host name and IP address as an A record, the DNS server sends the IP address corresponding to the host name to the mail server which has sent the host name.

For example, the DNS server 6-2 shown in FIG. 1 stores IP address b.b.b.b as related to host name B.

The mail server which has sent the IP address sends an electronic mail to the mail server corresponding to the domain name of the destination address of the electronic mail in accordance with the above-mentioned SMTP procedure.

Each mail server can broadcast electronic mails by use of a mailing list. In mail broadcasting by use of a mailing list, an alias capability is used.

Each mail server which uses the alias capability stores a plurality of addresses which constitute a group for a predetermined mail address (representative address). When each mail server receives an electronic mail addressed to the representative address, the mail server retransmits a copy of the received electronic mail to all addresses recorded in the representative address. The mail server sequentially sends the electronic mail to the registered mail addresses without rewriting the header of the electronic mail.

The mail server corresponding to the domain name stores the received electronic mails into its mail box called a spool. Each mail server manages the electronic mails for each user and delivers the managed electronic mails when the receive button of the mail send/receive program of the user corresponding to the destination address is pressed by the user.

The reason why the mail server does not send electronic mails to the mail send/receive program on the basis of SMTP is that the apparatus executing the mail send/receive program is not possibly operating or connected to the Internet 4.

The mail server sends electronic mails to the mail send/receive program on the basis of POP3. The POP3 procedure includes TCP setup, mail server call, user authentication, confirmation of mail box contents, checking the number of incoming electronic mails, reception of body text, request for deletion, confirmation of end, and ending of TCP. Each of the processes of mail server call, user authentication, confirmation of mail box contents, checking the number of incoming electronic mails, reception of body text, request for deletion, confirmation of end includes a request from the mail send/receive program and a reply from mail server.

The command statement and return mail code in POP3 are different from those in SMTP.

In POP3, unless the user is authenticated by the user ID and password previously registered with the mail server, mail reception processing is not executed.

Figure 2:
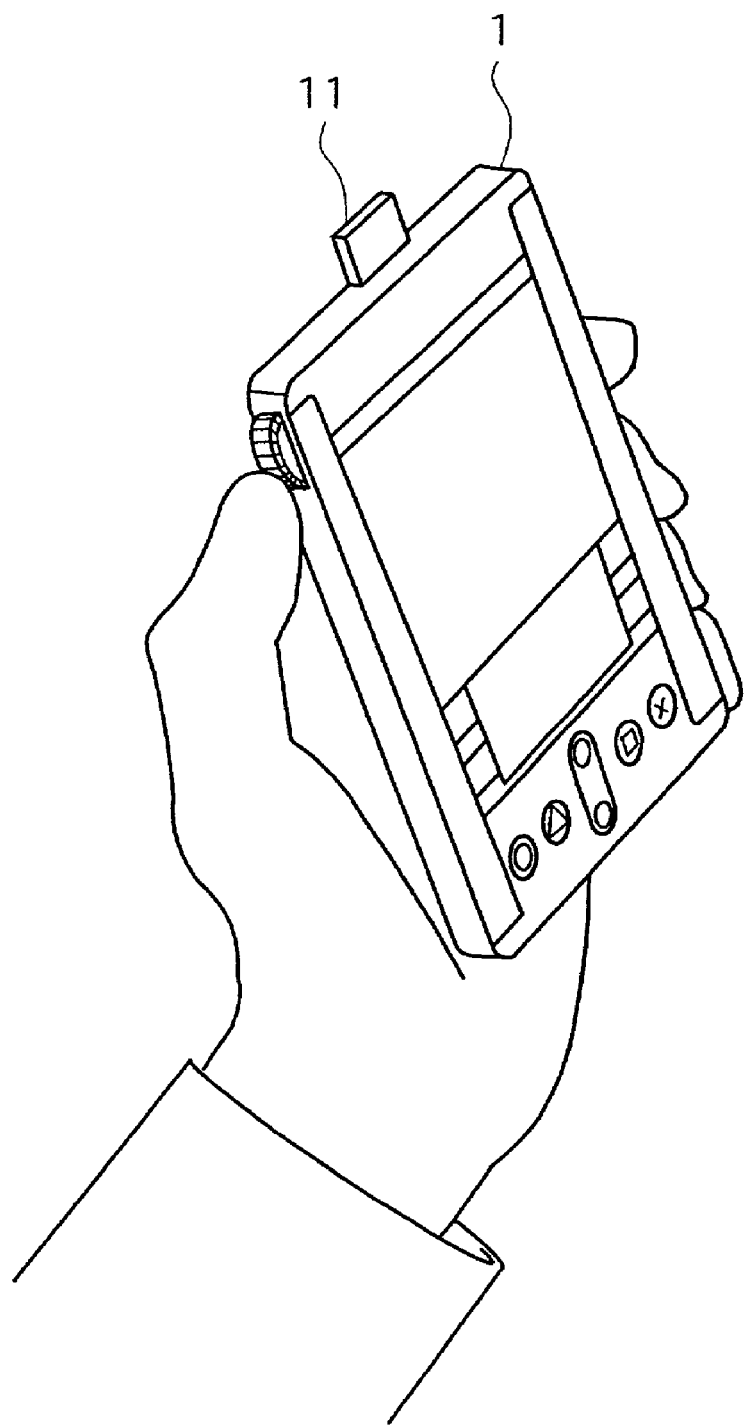
FIG. 2 is an external perspective view illustrating a PDA.
Figure 3:
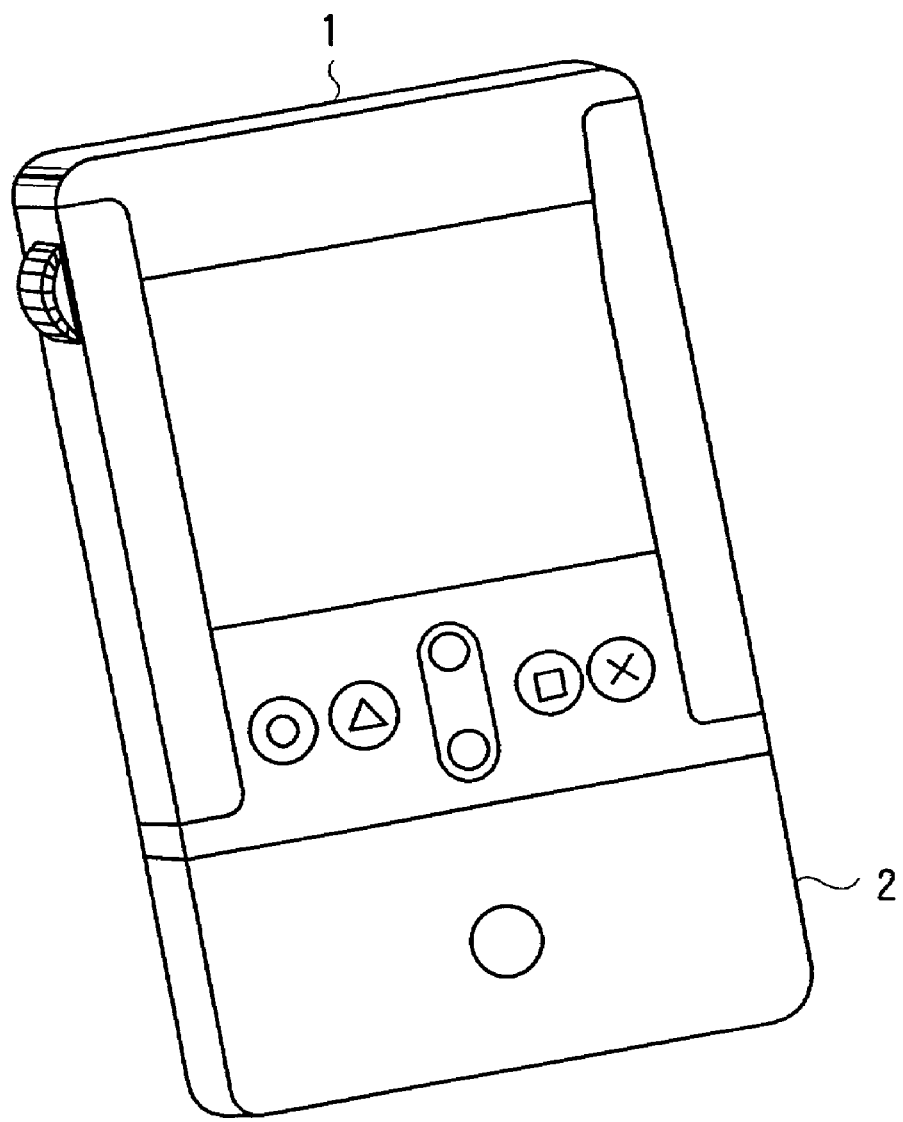
FIG. 3 is an external perspective view illustrating the PDA loaded on a cradle.
Figure 4:
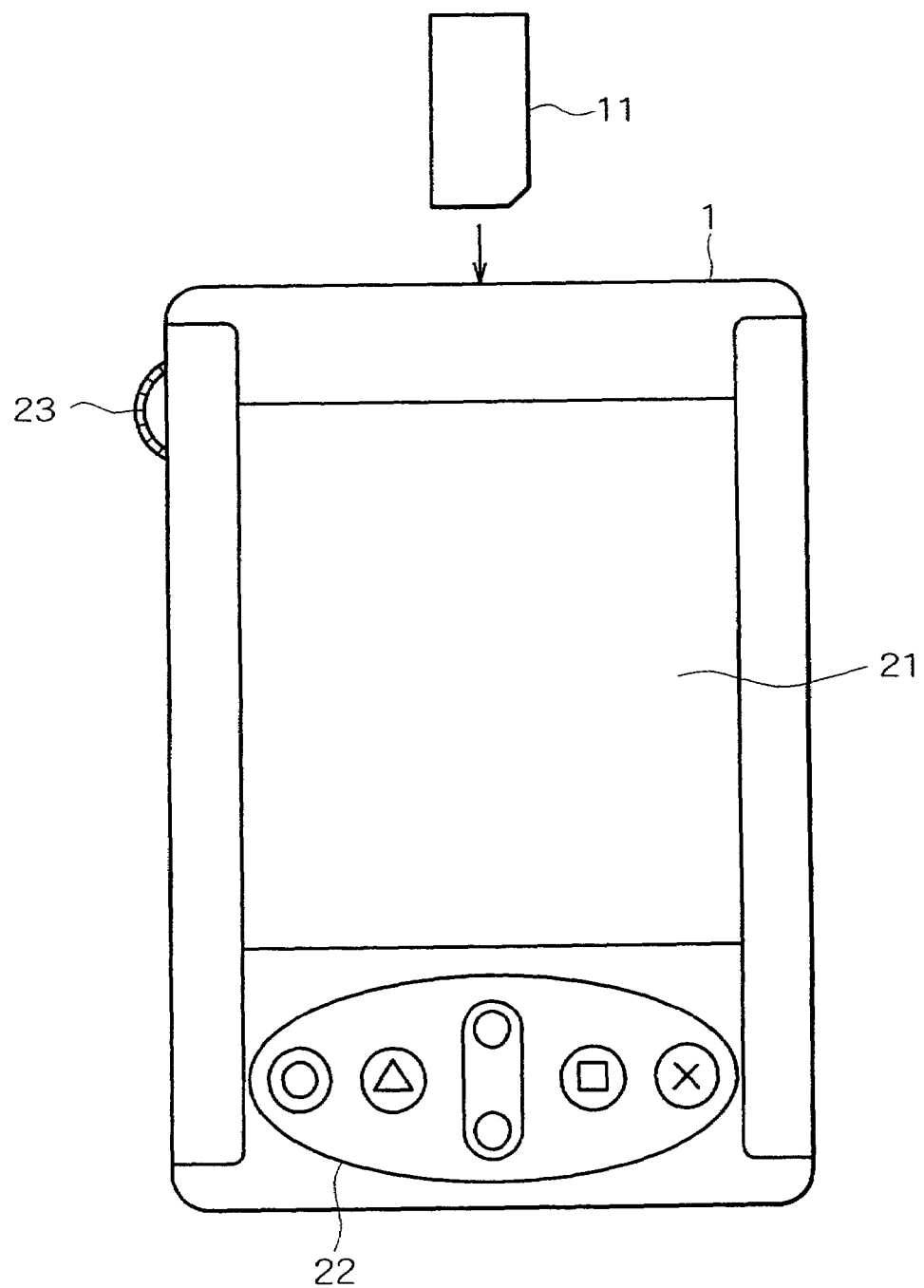
FIG. 4 is a front view of the PDA.

FIGS. 2 through 4 illustrates the external views of the PDA 1. FIG. 2 illustrates a perspective view of the PDA 1 held in the user's hand. FIG. 3 illustrates a perspective view of the PDA 1 loaded in the cradle 2. FIG. 4 illustrates the front view of PDA 1.

The case of the PDA 1 is designed so that it can be held by one hand and operated with ease in this condition. A slot is arranged on the top end of the PDA 1 into which a Memory Stick (trademark) 11 incorporating a semiconductor memory is loaded.

The PDA 1 is loaded in the cradle 2 such that the bottom of the PDA 1 comes in contact with the upper surface of the cradle 2. At the bottom of the PDA 1, a USB port (not shown) for connecting the PDA 1 to the cradle 2 is arranged.

The PDA 1 has a display block 21, keys 22, and a jog dial 23.

The display block 21 is constituted by a thin display device such as a liquid crystal display device and displays icons, thumbnails, and text for example. A touch pad is arranged on the upper part of the display block 21. By pressing the touch pad with the finger or a pen, the user can input predetermined data or commands into the PDA 1.

The key 22 is constituted by input keys for example through which the user inputs the selection of icons or thumbnails displayed on the display block 21.

The jog dial 23 is rotated or pressed into the main body of the PDA 1 to select icons or thumbnails for example displayed on the display block 21

Figure 5:
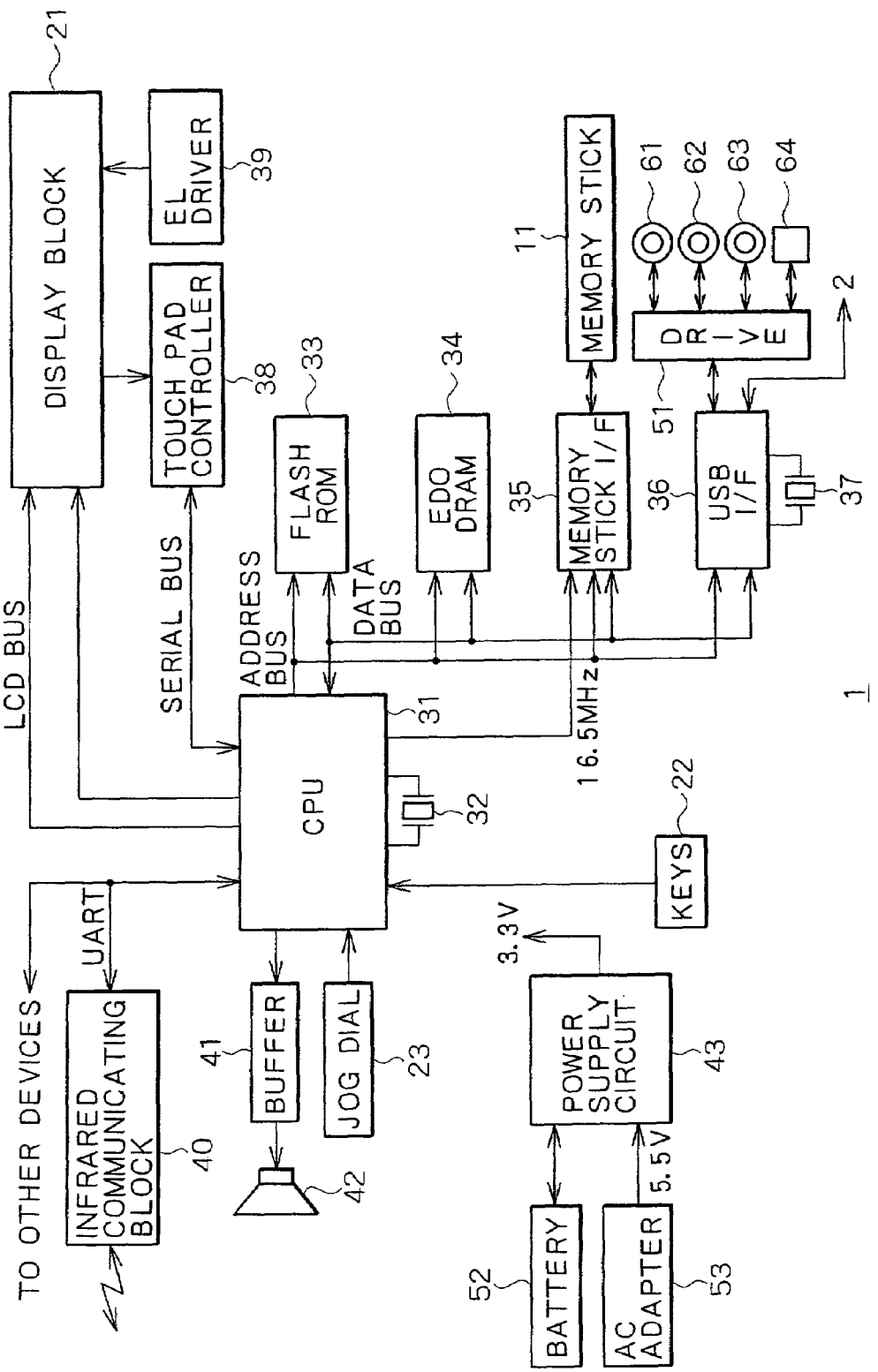
FIG. 5 is a block diagram illustrating an exemplary configuration of the PDA.

FIG. 5 shows a configuration of the PDA 1. A CPU (Central Processing Unit) 31 executes various programs such as an operating system and application programs stored in a flash ROM (Read Only Memory) 33 or an EDO DRAM (Extended Data Out Dynamic Random Access Memory) 34, in synchronization with a clock signal supplied from an oscillator 32.

The flash ROM 33 is constituted by a flash memory, a kind of EEPROM (Electrically Erasable Programmable Read Only Memory), generally storing data which is basically fixed among the programs and parameters for use by the CPU 31. The EDO DRAM 34 stores those parameters which change from time to time in the programs for use by the CPU 31 or in their execution.

A Memory Stick interface 35 reads data from the Memory Stick 11 loaded in the PDA 1 and writes data supplied from the CPU 31 to the Memory Stick 11.

A USB interface 36 inputs data or programs from a drive 51, which is a USB device, in synchronization with a clock signal supplied from an oscillator 37 and supplies the data from the CPU 31 to the drive 51. The USB interface 36 inputs data or programs from the cradle 2, which is a USB device, and supplies data from the CPU 31 to the cradle 2, in synchronization with a clock signal supplied from the oscillator 37.

The drive 51 reads data or programs from a magnetic disc 61, an optical disc 62, a magneto-optical disc 63, or a semiconductor memory 64, each loaded in the drive 51, and supplies these data or programs to the CPU 31 or the EDO DRAM 34 via the USB interface 36. The drive 51 stores data and programs into the magnetic disc 61, the optical disc 62, the magneto-optical disc 63, or the semiconductor memory 64.

The flash ROM 33, the EDO DRAM 34, the Memory Stick interface 35, and the USB interface 36 are connected to the CPU 31 via an address bus and a data bus.

The display block 21 receives data from the CPU 31 via an LCD bus and displays an image or text based on the received data. When the touch pad arranged on the upper part of the display block 21 is operated, a touch pad controller 38 receives data (indicative of the coordinates of the touch made, for example) and supplies a signal corresponding to the received data to the CPU 31 via a serial bus.

An EL (Electro Luminescence) driver 39 operates an electro-luminescence element arranged on the rear side of the liquid crystal device of the display block 21 to control the brightness of the display block 21.

An Infrared communicating block 40 transmits, by use of infrared light, data received from the CPU 31 to other devices, not shown, via a UART (Universal Asynchronous Receiver Transmitter) and transmits data supplied, by use of infrared light, from other devices to the CPU 31. The PDA 1 can communicate with other devices via the UART.

An audio reproducing block 42, composed of a speaker and an audio data decoder for example, decodes previously stored audio data or audio data received via the Internet 4 for example, reproduces the data, and outputs the sound. For example, the audio reproducing block 42 reproduces the audio data supplied from the CPU 31 via a buffer 41 to output the sound corresponding to the audio data.

The keys 22, composed of input keys for example, is operated by the user when inputting various commands into the CPU 31.

The jog dial 23 is rotated or pressed by the user to supply corresponding data to the CPU 31.

A power supply circuit 43 converts the voltage of power supplied from a battery 52 or an AC (Alternate Current) adapter 53 and supplies the resultant voltage to the above-mentioned circuits, the CPU 31 through the audio reproducing block 42.

Figure 6:
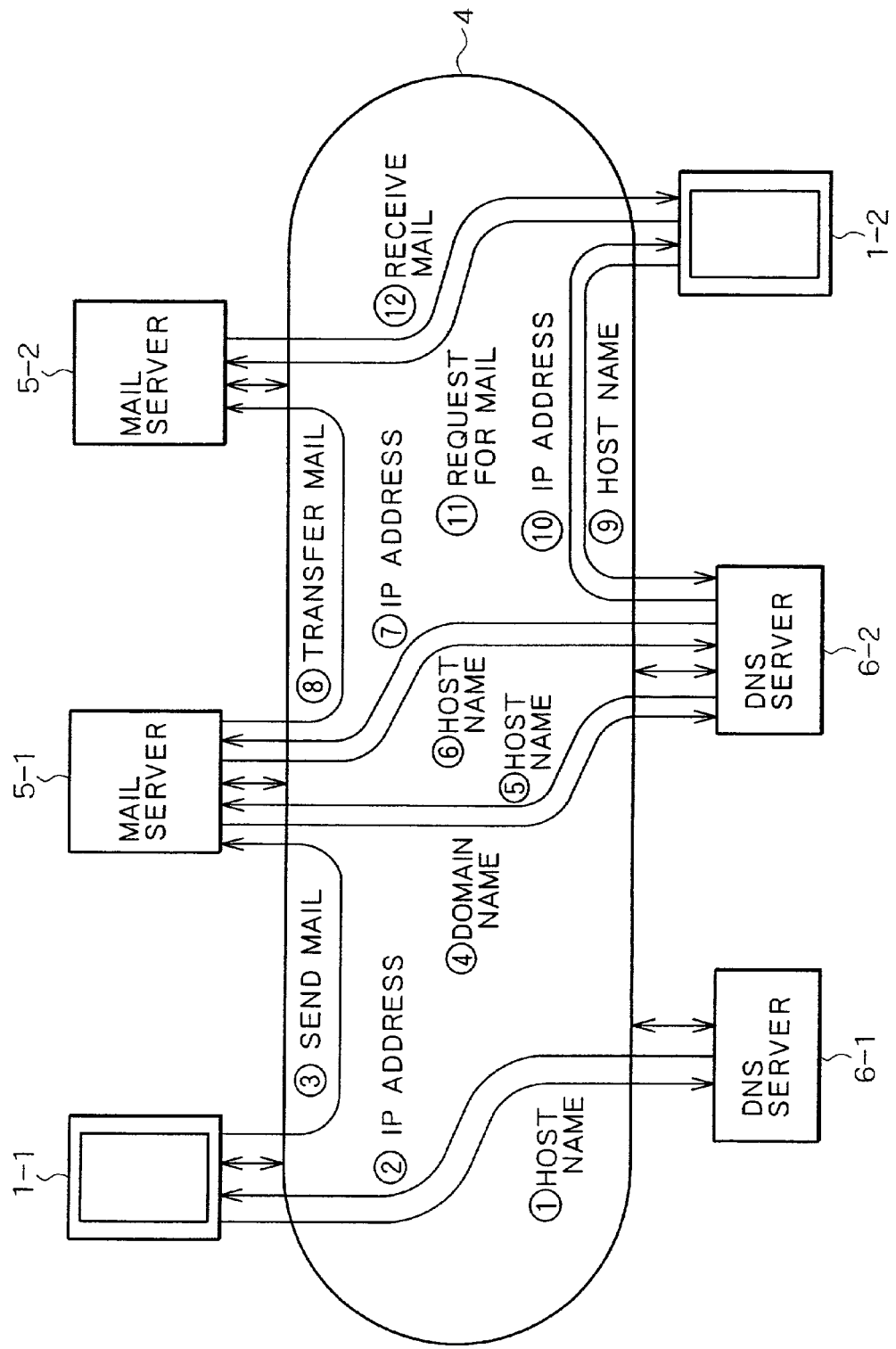
FIG. 6 is a schematic diagram illustrating a procedure in which an electronic mail transmitted by the PDA is received by another PDA.

The following describes a procedure in which an electronic mail sent by the PDA 1-1 is received by the PDA 1-2 with reference to FIG. 6. The PDA 1-1 sends the host name of the mail server 5-1 to the DNS server 6-1 via the cradle 2-1, the personal computer 3-1, and the Internet 4 ((1) in FIG. 6). The DNS server 6-1 sends, via the Internet 4, to the PDA 1-1 the IP address of the mail server 5-1 stored in the A record as related to the received host name ((2) in FIG. 6).

On the basis of the IP address of the mail server 5-1 received from the DNS server 6-1, the PDA 1-1 sends an electronic mail to the mail server 5-1 via the cradle 2-1, the personal computer 3-1 and the Internet 4 on the basis of the SMTP procedure ((3) in FIG. 6).

The mail server 5-1 checks the destination address of received electronic mail and, if the domain name of the destination address does not match the domain of the mail server 5-1, sends the domain name to the DNS server 6-2 via the Internet 4 ((4) in FIG. 6). The DNS server 6-2 sends to the mail server 5-1 the host name of the mail server 5-2 stored in the MX record as related to the received domain name via the Internet 4 ((5) in FIG. 6).

The mail server 5-1 sends to the DNS server 6-2 the host name of the mail server 5-2 corresponding to the destination address received from the DNS server 6-2 via the Internet 4 ((6) in FIG. 6). Via the Internet 4, the DNS server 6-2 sends to the mail server 5-1 the IP address of the mail server 5-2 stored in the A record as related to the received host name ((7) in FIG. 6).

Via the Internet 4, the mail server 5-1 transfers the electronic mail to the mail server 5-2 in accordance with the received IP address and on the basis of the SMTP procedure ((8) in FIG. 6). The mail server 5-1 checks the destination address of the received electronic mail and, if the domain name of the destination address matches the domain of the mail server 5-2, stores the received electronic mail into its mail box called a spool.

The PDA 1-2 sends to the DNS server 6-2 the host name of the mail server 5-2 via the cradle 2-2, the personal computer 3-2, and the Internet 4 ((9) in FIG. 6). The DNS server 6-2 sends via the Internet 4 the IP address of the mail server 5-2 corresponding to the received host name to the PDA 1-2 ((10) in FIG. 6).

On the basis of the received IP address of the mail server 5-2, the PDA 1-2 requests the mail server 5-2 for the electronic mail via the cradle 2-2, the personal computer 3-2, and the Internet 4 on the basis of POP3 procedure ((11) in FIG. 6). The PDA 1-2 receives the requested electronic mail from the mail server 5-2 via the cradle 2-2, the personal computer 3-2, and the Internet 4 on the basis of POP3 procedure ((12) in FIG. 6).

Figure 7:
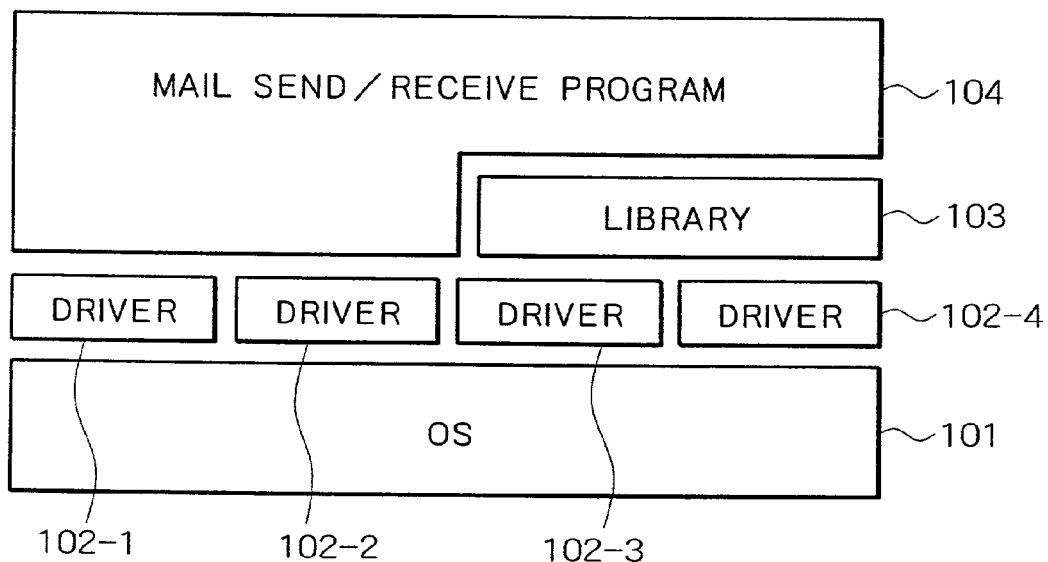
FIG. 7 is a schematic diagram illustrating a program which is executed by the PDA which sends electronic mails.

FIG. 7 shows programs to be executed by the PDA 1 when it sends electronic mails. An operating system (hereafter referred to as an OS) 101 controls the basic operations of the PDA 1.

A driver 102-1 is a program for controlling the displaying of the display block 21. A driver 102-2 is a program for controlling the operation of the touch pad controller 38. A driver 102-3 is a program for controlling the reproduction of audio data in the audio reproducing block 42. A driver 102-4 is a program for executing a process corresponding to the input operation in the jog dial 23.

A library 103 stores a plurality of routines for use by application programs such as a mail send/receive program 104.

A mail send/receive program 104 sends and receive electronic mails via the cradle 2-1 or 2-2, the personal computer 3-1 or 3-2, and the Internet 4.

It should be noted that the configuration of the programs shown in FIG. 7 is substantially the same as that of the programs of a prior-art mail send/receive device.

Figure 8:
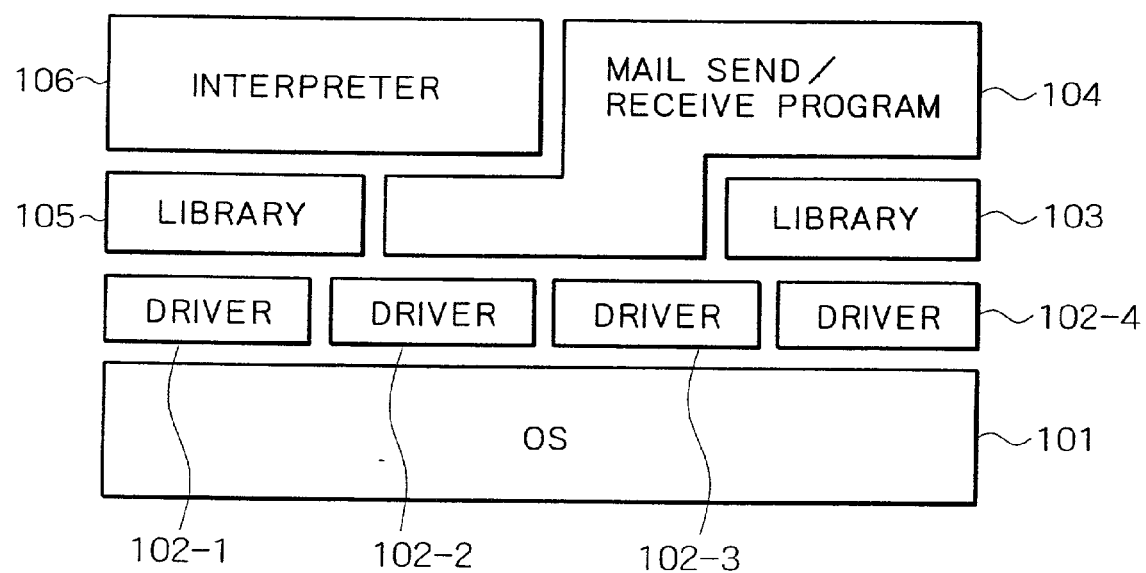
FIG. 8 is a schematic diagram illustrating a program which is executed by the PDA which sends or receives electronic mails.
Figure 9:
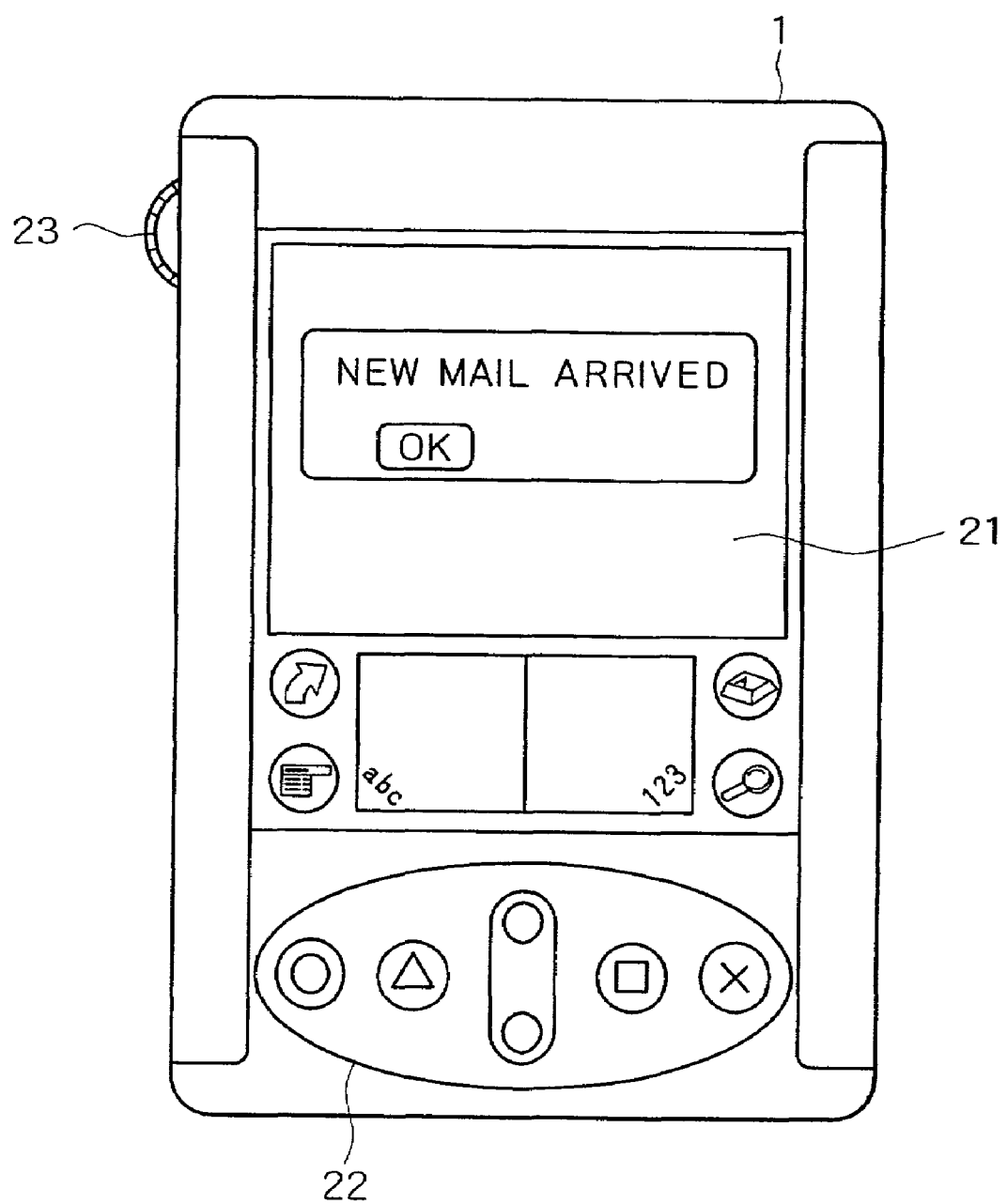
FIG. 9 is a top view of the PDA on which an exemplary message is shown.

FIG. 8 illustrates programs to be executed by the PDA 1 when it sends or receives electronic mails. The mail send/receive program 104 displays an image illustrated in FIG. 9 for example on the display block 21 when receiving electronic mails from the mail server 5-2. When displaying the received electronic mails, the mail send/receive program 104 supplies the received electronic mails to an interpreter 106.

The library 105 stores routines to be used when the interpreter 106 executes scripts.

The interpreter 106 is a program which is plugged in the mail send/receive program 104 and extracts a script from each of the received electronic mails to execute the extracted script. For example, the interpreter 106 causes the driver 102-1 to display a predetermined image on the display block 21 in accordance with the execution of the script and the driver 102-3 to reproduce predetermined audio data from the audio reproducing block 42.

The interpreter 106 causes the drivers 102-1 through 102-4 corresponding to the display block 21 and the audio reproducing block 42 to execute image display and audio reproduction. Therefore, even if the display block 21 or the audio reproducing block 42 is of different types due to different types of the PDA 1, the image display and audio reproduction by the interpreter 106 can be executed with reliability.

Also, the interpreter 106 causes the drivers 102-1 through 102-4 corresponding to the devices such as the display block 21 and the audio reproducing block 42 to execute the processing such as image display and audio reproduction. Therefore, even if devices of various types to be operated in accordance with the execution of the script are incorporated in the PDA 1, these devices can be controlled by the interpreter 106 with reliability.

It should be noted that, if an electronic mail to be displayed contains a script, the mail send/receive program 104 may activate the interpreter 106 and load the library 105.

Figure 10:
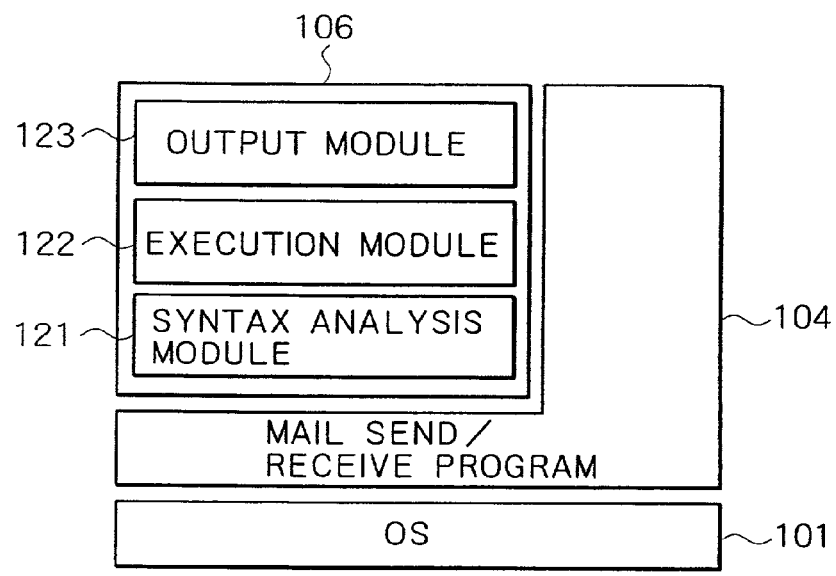
FIG. 10 is a schematic diagram illustrating a detail construction of an interpreter.

FIG. 10 illustrates a detail structure of the interpreter 106. The interpreter 106 includes a syntax analysis module 121, an execution module 122, and an output module 123.

Figure 11:
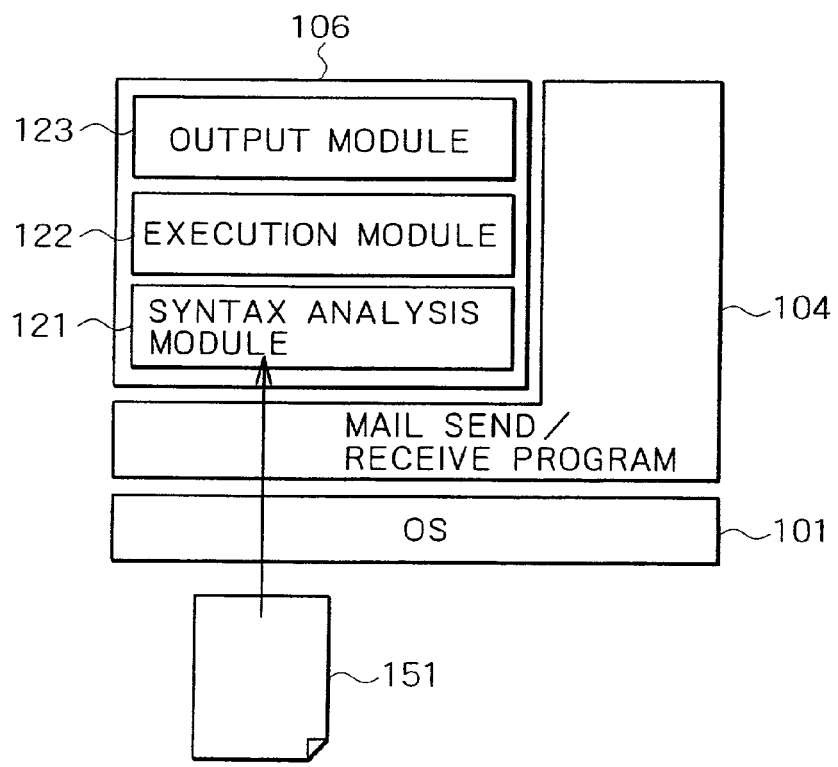
FIG. 11 is a schematic diagram illustrating an exemplary operation of the interpreter.

When the mail send/receive program 104 displays an electronic mail 151 as shown in FIG. 11 for example, the syntax analysis module 121 receives the electronic mail 151 from the mail send/receive program 104, extracts a script from the received electronic mail 151, and supplies the extracted script to the execution module 122.

Figure 12:
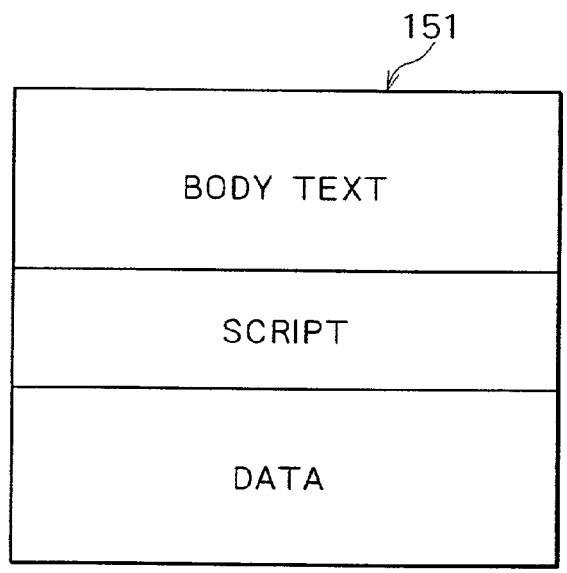
FIG. 12 is a schematic diagram illustrating an exemplary structure of an electronic mail.

FIG. 12 shows an exemplary structure of the electronic mail 151 to be sent or received by the PDA 1. The electronic mail 151, if it contains a script, stores it after a mail body text. If the stored script requires data, the electronic mail 151 stores, after the script, the data necessary for the execution of the script by the interpreter 106.

If the data are stored along with the script in the electronic mail 151, the syntax analysis module 121 extracts both the script and the data and supplies the extracted script and the extracted data to the execution module 122.

Figure 13:
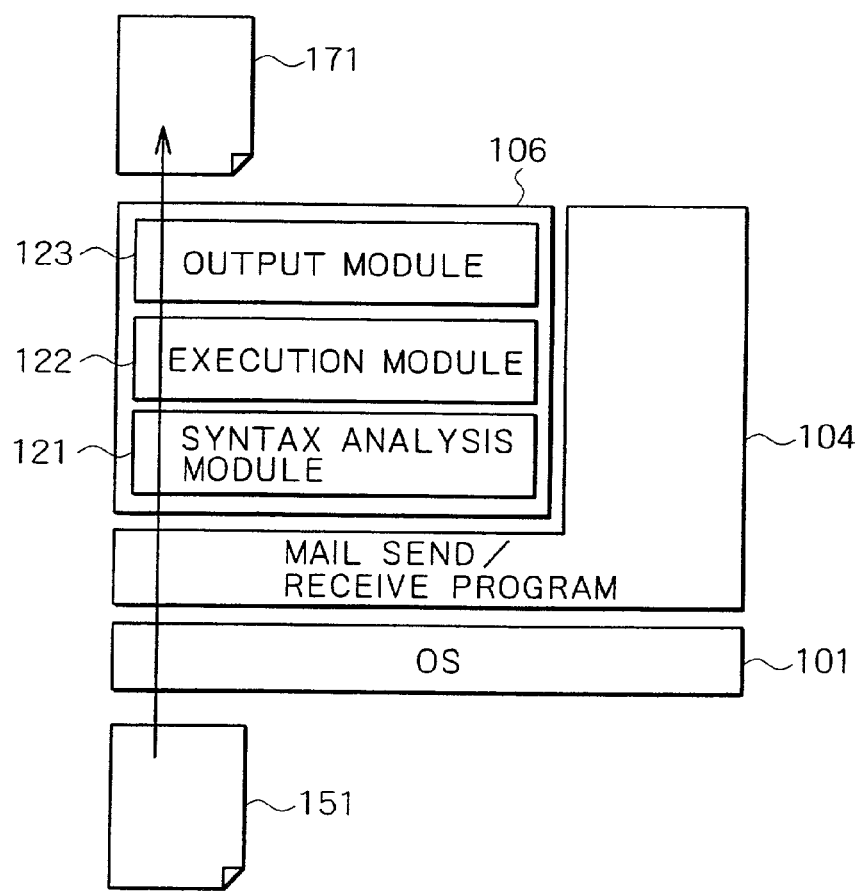
FIG. 13 is a schematic diagram illustrating another exemplary operation of the interpreter.

FIG. 13 illustrates the flow of processing of the interpreter 106 to be executed when the electronic mail 151 stores the script. The syntax analysis module 121 supplies the extracted script to the execution module 122.

The execution module 122 executes the received script. In accordance with a result of the execution of the script, the output module 123 displays an image, outputs audio, or stores output data 171 into the EDO DRAM 34 for example.

Figure 14:
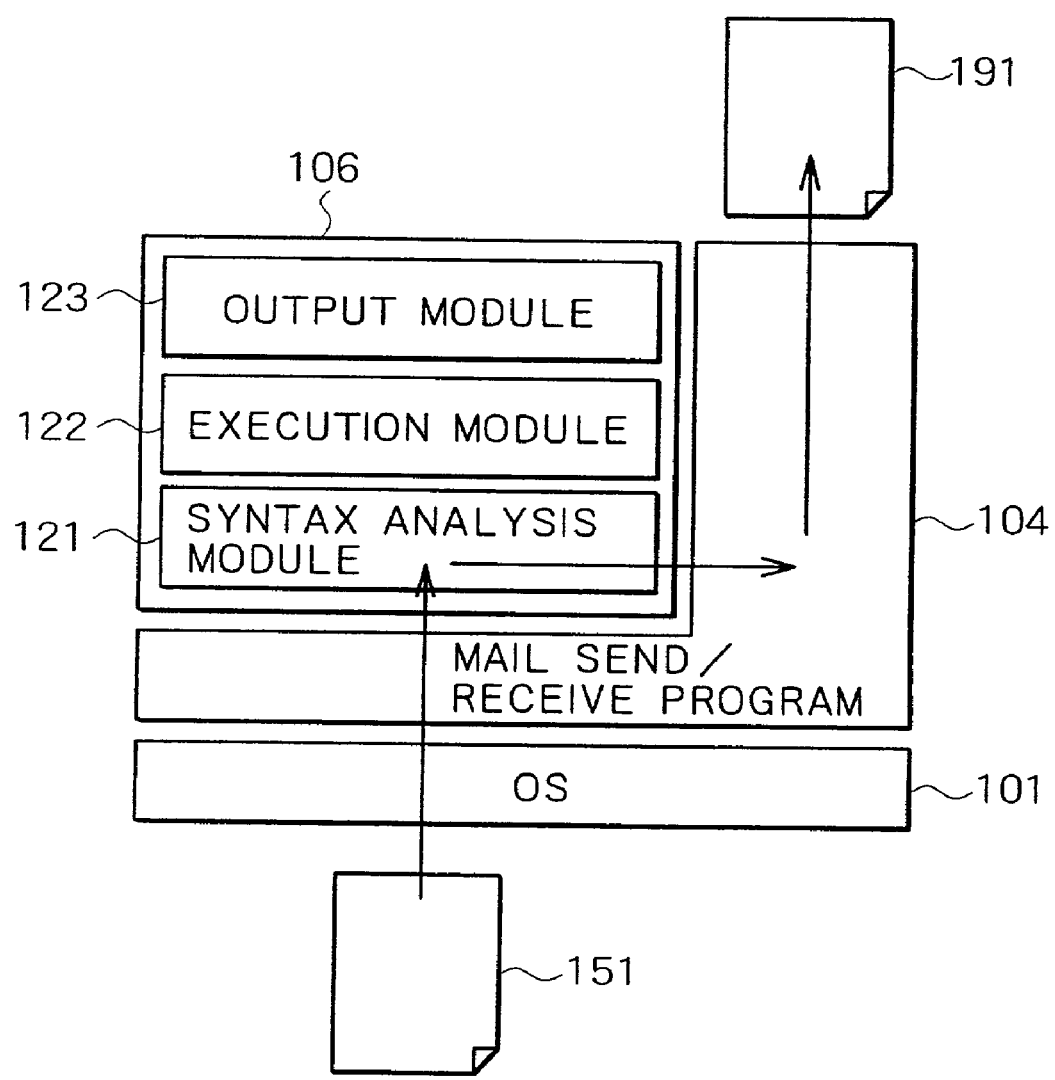
FIG. 14 is a schematic diagram illustrating still another exemplary operation of the interpreter.

On the other hand, if the syntax analysis 121 module has not extracted a script from the electronic mail 151 (namely, no script is contained in the electronic mail 151), the syntax analysis module 121 causes the mail send/receive program 104 to execute the subsequent processing, normal mail processing being executed as shown in FIG. 14. At this moment, the mail send/receive program 104 supplies text data 191 corresponding to the body text of the electronic mail 151 to the driver 102-1. The driver 102-1 displays the body text of the electronic mail 151 on the display block 21 on the basis of the text data 191.

FIG. 15 shows an example of the electronic mail 151 for executing the game of Othello. In the example shown in FIG. 15, the electronic mail 151 includes a body text and a script. The script contained in the electronic mail 151 shown in FIG. 15 is application/x-emma described in MIME (Multi Purpose Internet Mail Extension).

In the electronic mail 151 shown in FIG. 15, "To: "Someone"<someone@sony.co.jp>" through "second move of Othello" correspond to the body text and "- - - - - - =_NextPart__000__0011__01BFA9E72EE28580'through"---- Next_Part(Wed__Apr__19__11:42:48__2000__705)- - - -" correspond to the script.

Figure 16:
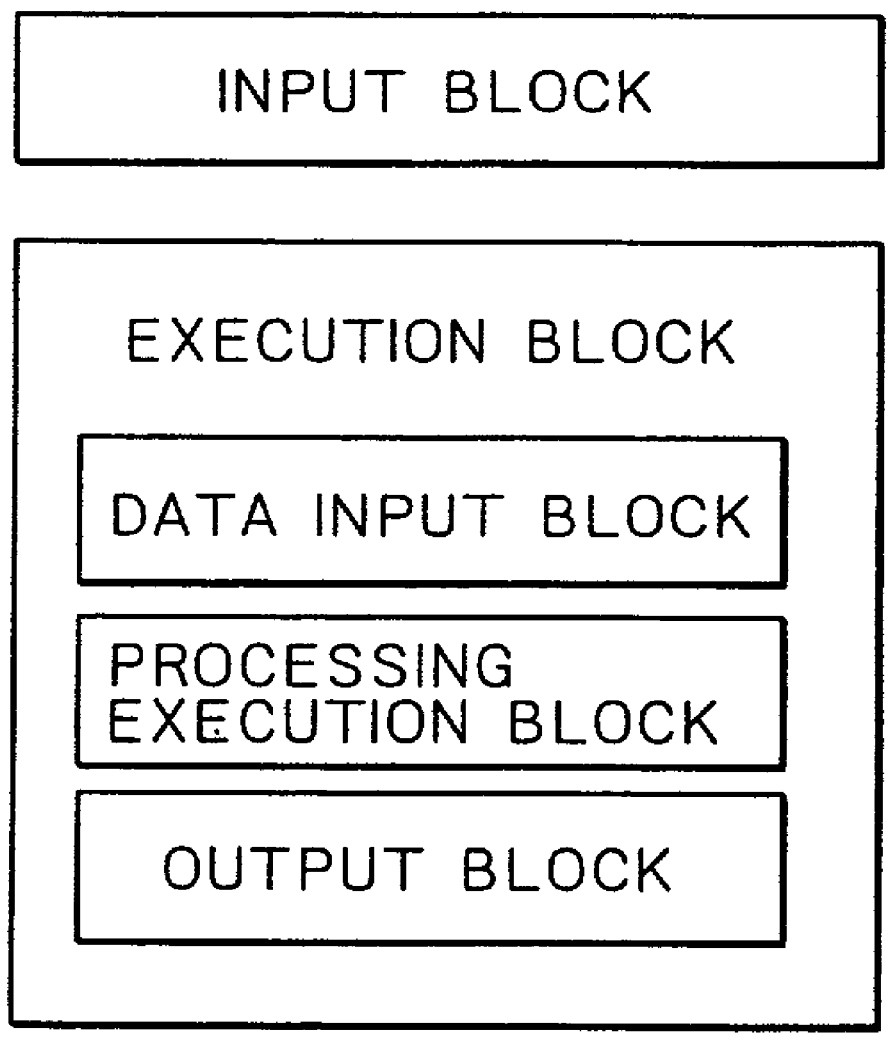
FIG. 16 is a schematic diagram illustrating the execution of a script.

FIG. 16 schematically shows the execution of the script. The script execution is divided into an input block and an execution block.

In the input block, the script is extracted from the electronic mail 151 by the syntax analysis module 121.

The execution block is further divided into a data input block, a processing execution block, and an output block. In the data input block, the execution module 122 causes the driver 102-1 for example to display an image for data input on the display block 21 and the driver 102-2 to control the input from the touch pad controller 38.

The inputting in the data input block is executed by the execution module 122 by controlling the drivers corresponding to a tablet, the keys 22, the jog dial 23, a sensor, the Memory Stick interface 35, an external attached keyboard, a modem, the USB interface 36, the infrared communicating block 40, and the drive 52, for example.

In the processing execution block, the execution module 122 executes the processing logic of the script.

In the output block, the output module 123, in accordance with the processing in the processing execution block, causes the driver 102-1 for example to display an image indicative of the result of the processing on the display block 21 and the driver 102-3 to output an audio signal, which is the result of the processing, from the audio reproducing block 42.

In the output block, the outputting is executed by the output module 123 by controlling the drivers corresponding to the display block 21, the modem, the audio reproducing block 42, the Memory Stick interface 35, the USB interface 36, the infrared communicating block 40, and the drive 51, for example.

Figure 18:
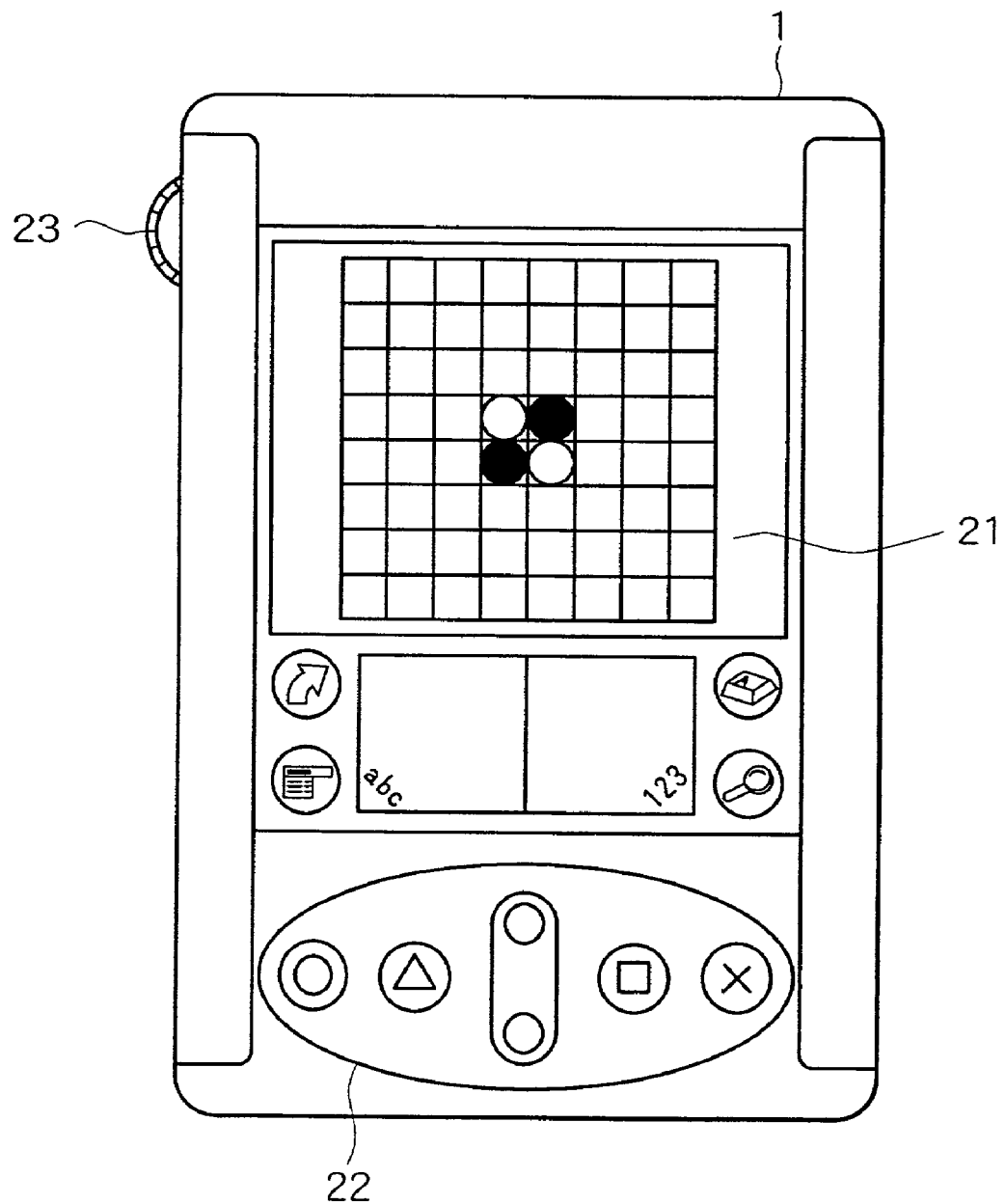
FIG. 18 is a top view of the PDA illustrating an example of display.

FIG. 17 shows an example of a script for executing the game of Othello. When the script shown in FIG. 17 is read into the interpreter 106, the execution module 122 activates onload( ) method, causing show( ) method to display an Othello board and the pieces on the display block 21 as shown in FIG. 18.

Figure 19:
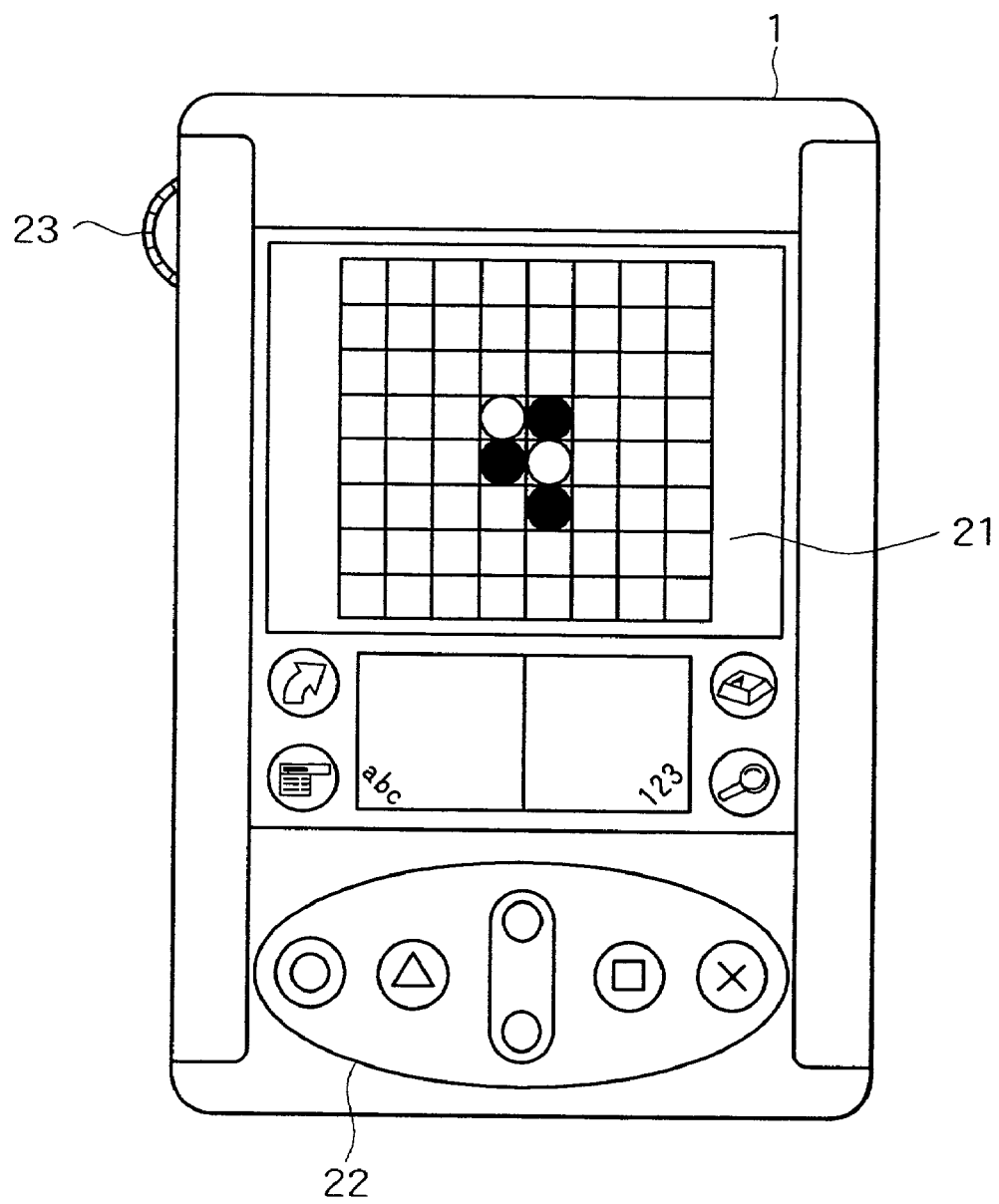
FIG. 19 is a top view of the PDA illustrating another example of display.

When the user inputs a new move as shown in FIG. 19, the execution module 122 captures, by ontap( ) method, the coordinates on the Othello board at which the new move was made. The execution module 122 determines by check( ) method whether or not the coordinates corresponding to the new move satisfy the requirements specified by the rules of Othello. If the new move is found not satisfying the requirements, the execution module 122 tells an error by confirm( ) method (an error message is displayed on the display block 21), repeating the execution of ontap( ) method.

Figure 20:
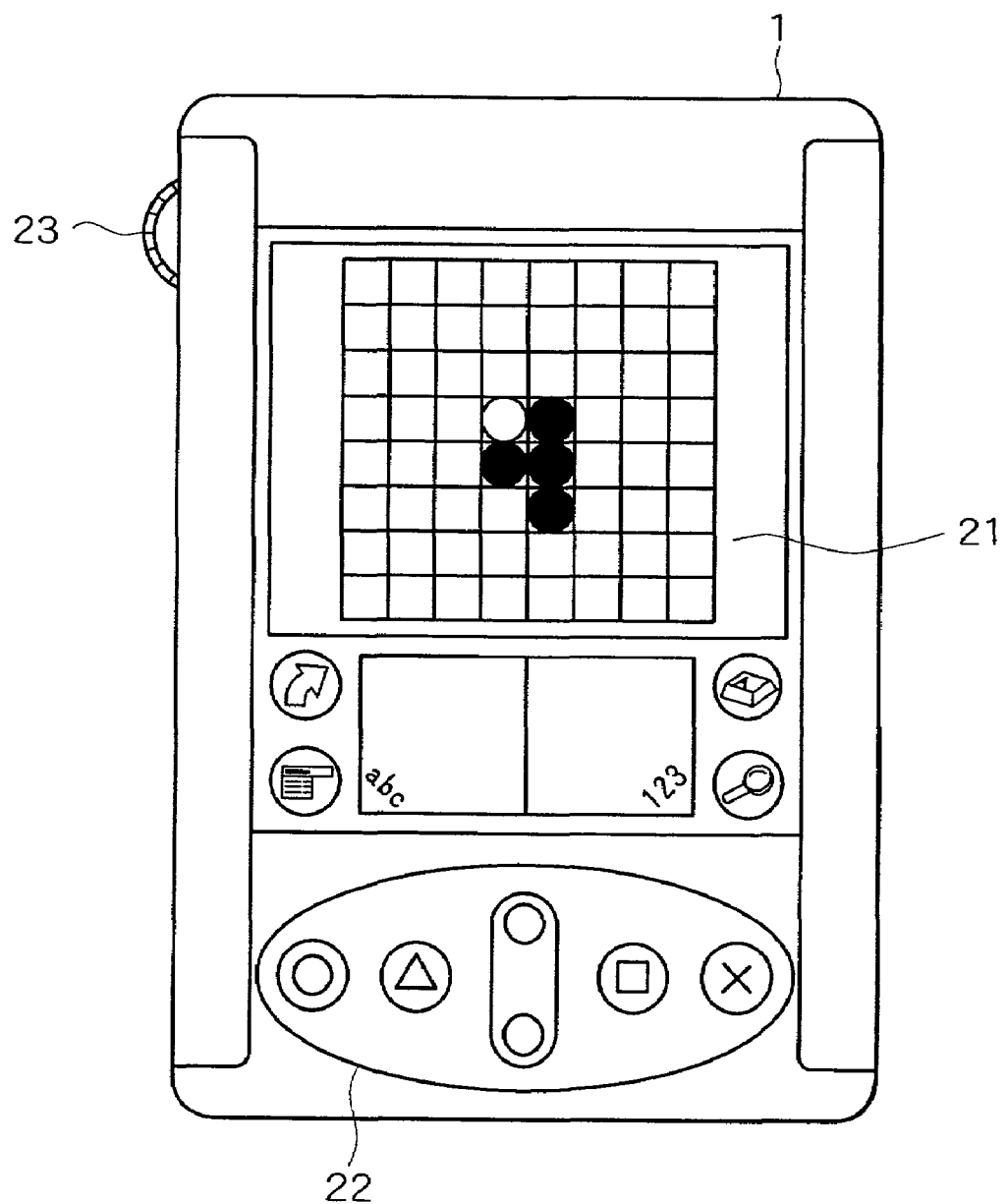
FIG. 20 is a top view of the PDA illustrating still another example of display.
Figure 21:
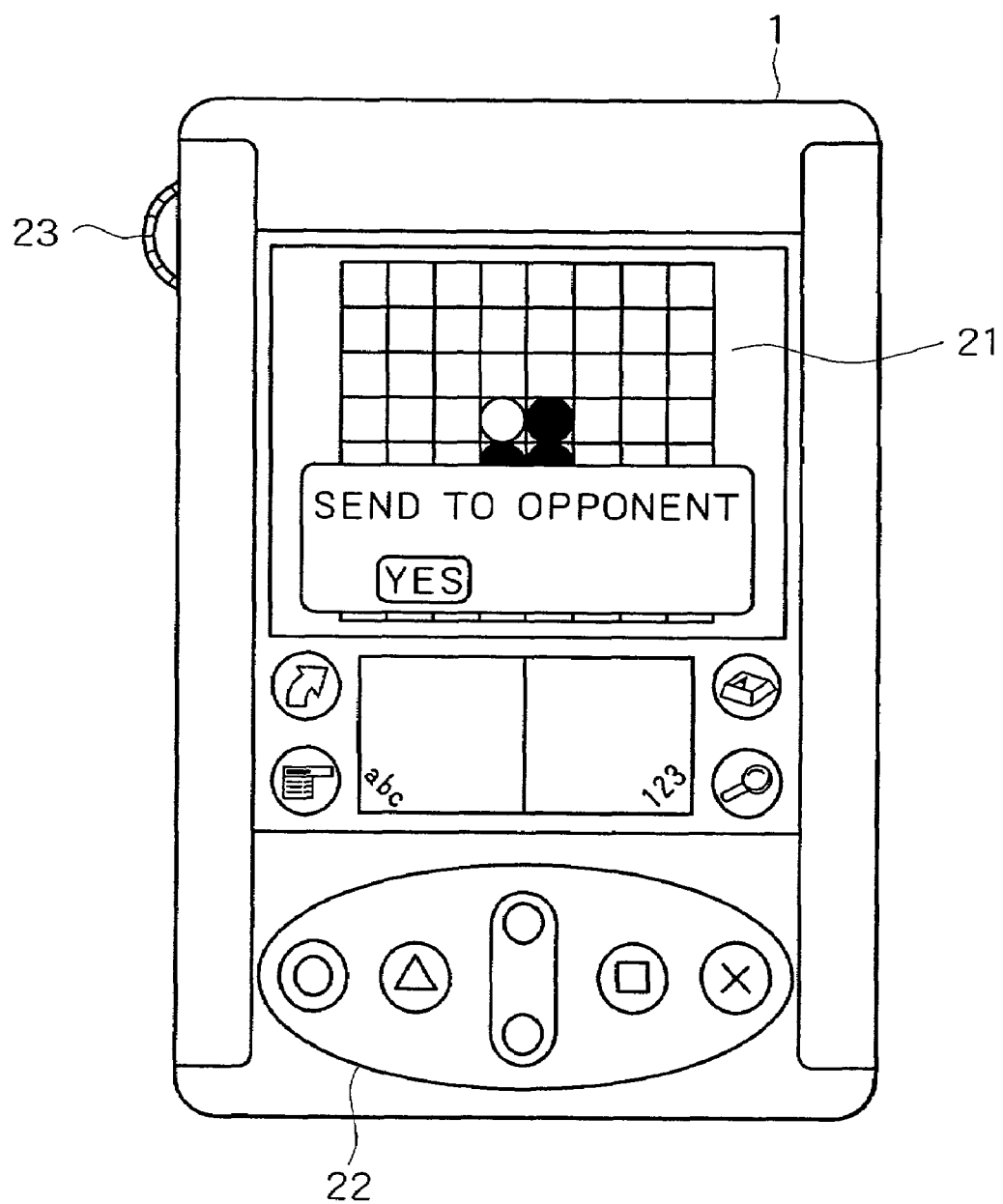
FIG. 21 is a top view of the PDA illustrating yet another example of display.

If the new move is found satisfying the requirements, the execution module 122 updates the piece surface by update( ) method as shown in FIG. 20. The output module 123 executes by sendmail( ) method a process of sending mail to the opponent as shown in FIG. 21, upon which the processing is ended by exit( ) method.

Figure 22:
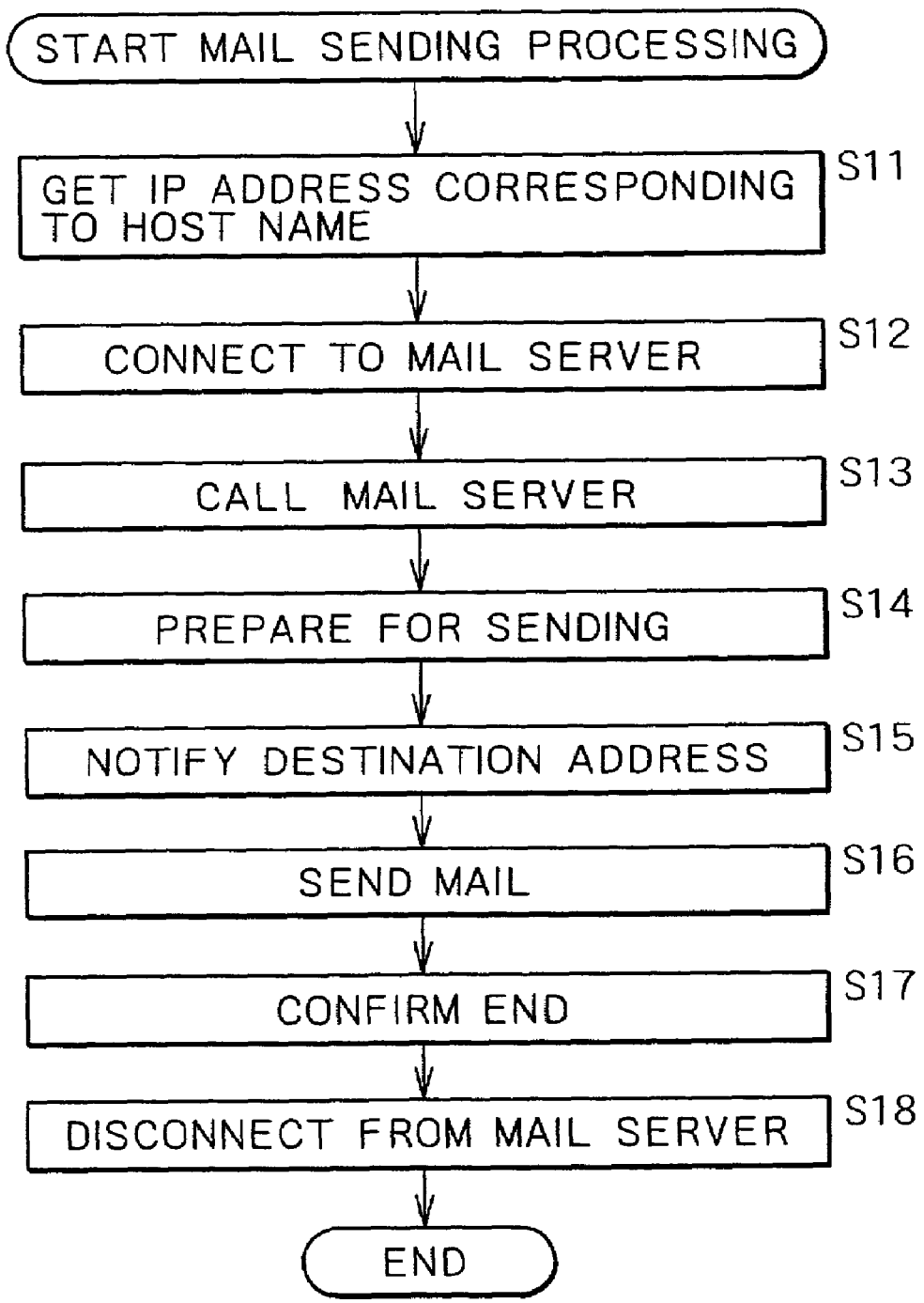
FIG. 22 is a flowchart describing mail sending processing.

The following describes the processing of mail sending by the PDA 1 which executes the mail send/receive program 104, with reference to the flowchart shown in FIG. 22. In step S11, the mail send/receive program 104 causes the USB interface 36 to send the host name corresponding to the mail server 5-1 to the DNS server 6-1 via the cradle 2, the personal computer 3, and the Internet 4 and gets the IP address corresponding to the mail server 5-1 from the DNS server 6-1.

The processes of steps S12 through S18 are executed on the basis of the SMTP procedure for example.

In step S12, the mail send/receive program 104 causes the USB interface 36 to specify the IP address via the cradle 2, the personal computer 3, and the Internet 4, thereby connecting the PDA 1 to the mail server 5-1. In step S13, the mail send/receive program 104 causes the USB interface 36 to call the mail server 5-1 via the cradle 2, the personal computer 3, and the Internet 4 (namely, call a mail server program, for example, sendmail (trademark)) which is executed by the mail server 5-1).

In step S14, the mail send/receive program 104 causes the USB interface 36 to request the mail server 5-1 for making preparations for mail sending (namely, notify the mail server program which is executed by the mail server 5-1 of the execution of a mail sending procedure). In step S15, the mail send/receive program 104 causes the USB interface 36 to notify the mail server 5-1 of the destination address (mail address) of an electronic mail to be sent.

In step S16, the mail send/receive program 104 causes the USB interface 36 to send the electronic mail to the mail server 5-1. In step S17, the mail send/receive program 104 causes the USB interface 36 to confirm the end of processing with the mail server 5-1.

In step S18, the mail send/receive program 104 causes the USB interface 36 to disconnect from the mail server 5-1, upon which the processing comes to an end.

Thus, the PDA 1 can send mail to the mail server 5-1.

It should be noted that the processing in which the mail server 5-1 transfers mail to the mail server 5-2 is generally the same as the mail send processing except for a process of acquiring the host name corresponding to mail destination address and therefore the description of the mail transfer processing is skipped.

Figure 23:
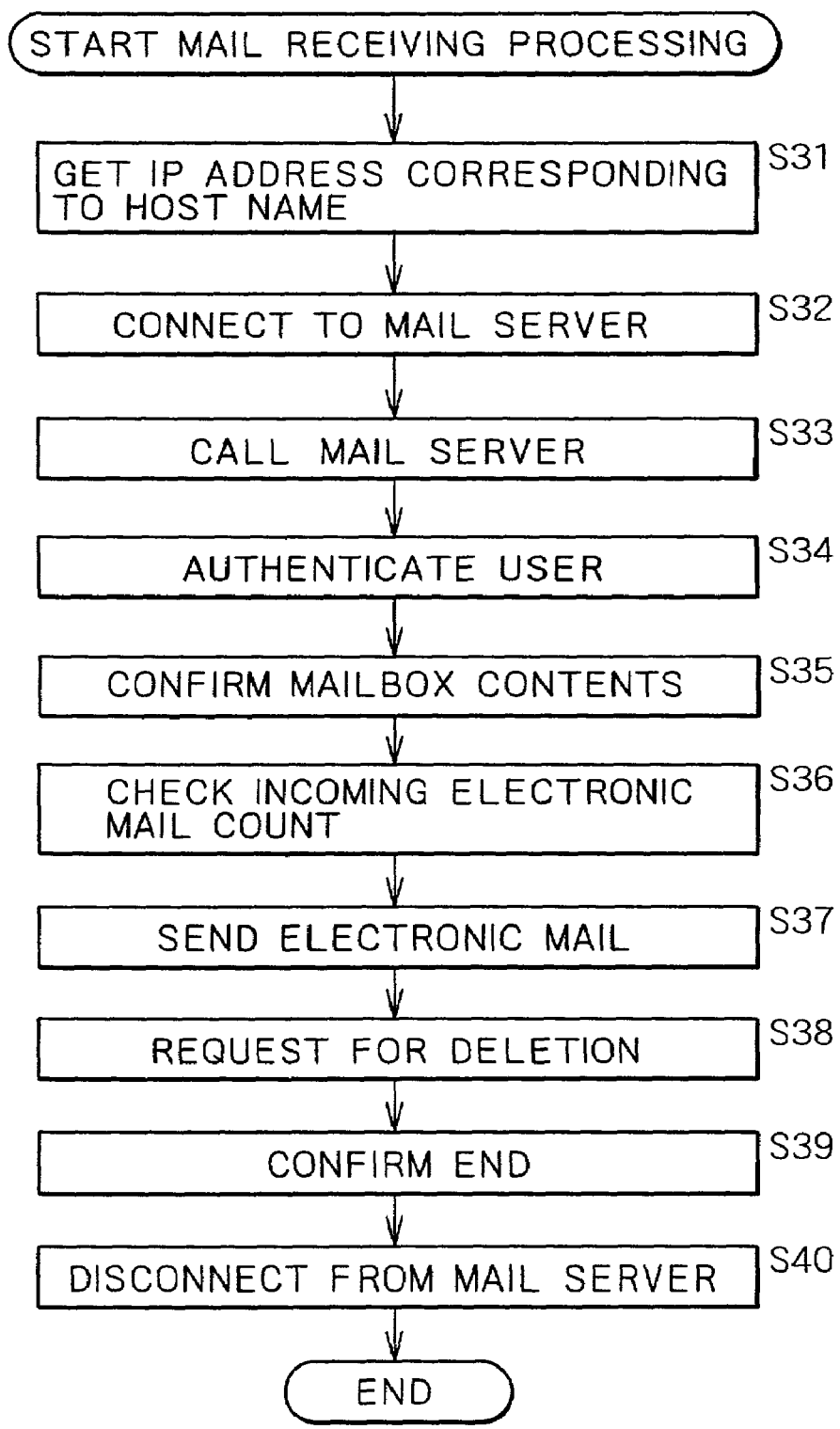
FIG. 23 is a flowchart describing mail receiving processing.

The following describes the mail reception processing by the PDA 1 which executes the mail send/receive program 104 with reference to the flowchart shown in FIG. 23. In step S31, the mail send/receive program 104 causes the USB interface 36 to send the host name corresponding to the mail server 5-2 to the DNS server 6-2 via the cradle 2, the personal computer 3, and the Internet 4 and gets the IP address corresponding to the mail server 5-2 from the DNS server 6-2.

The processes of steps S32 through S40 are executed on the basis of the POP3 procedure for example.

In step S32, the mail send/receive program 104 causes the USB interface 36 to specify the IP address via the cradle 2, the personal computer 3, and the Internet 4, connecting the PDA 1 to the mail server 5-2. In step S33, the mail send/receive program 104 causes the USB interface 36 to call the mail server 5-2 via the cradle 2, the personal computer 3, and the Internet 4.

In step S34, the mail send/receive program 104 causes the USB interface 36 to send the user ID and password of the user of the PDA 1 to the mail server 5-2 via the cradle 2, the personal computer 3, and the Internet 4, causing the mail server 5-2 to execute the authentication of the user.

In step S35, the mail send/receive program 104 causes the USB interface 36 to check the contents of the mail box (storing the electronic mail addressed to the user of the PDA 1) by the mail server 5-2.

In step S36, the mail send/receive program 104 causes the USB interface 36 to send the number of incoming electronic mails to the user of the PDA 1 by the mail server 5-2 and receives the number of incoming electronic mails.

In step S37, the mail send/receive program 104 causes the USB interface 36 to send the electronic mail addressed to the user of the PDA 1 by the mail server 5-2 and receive the electronic mail sent from the mail server 5-2. Then, the mail send/receive program 104 causes the USB interface 36 to request the mail server 5-2 for deleting the electronic mail addressed to the user of the PDA 1. The mail server 5-2 accordingly deletes the electronic mail addressed to the user of the PDA 1.

In step S39, the mail send/receive program 104 causes the USB interface 36 to confirm the end of the processing with the mail server 5-2.

In step S40, the mail send/receive program 104 causes the USB interface 36 to disconnect the connection with the mail server 5-2, upon which the processing comes to an end.

Thus, the PDA 1 can receive the electronic mail addressed to the user of the PDA 1 from the mail server 5-2.

Figure 24:
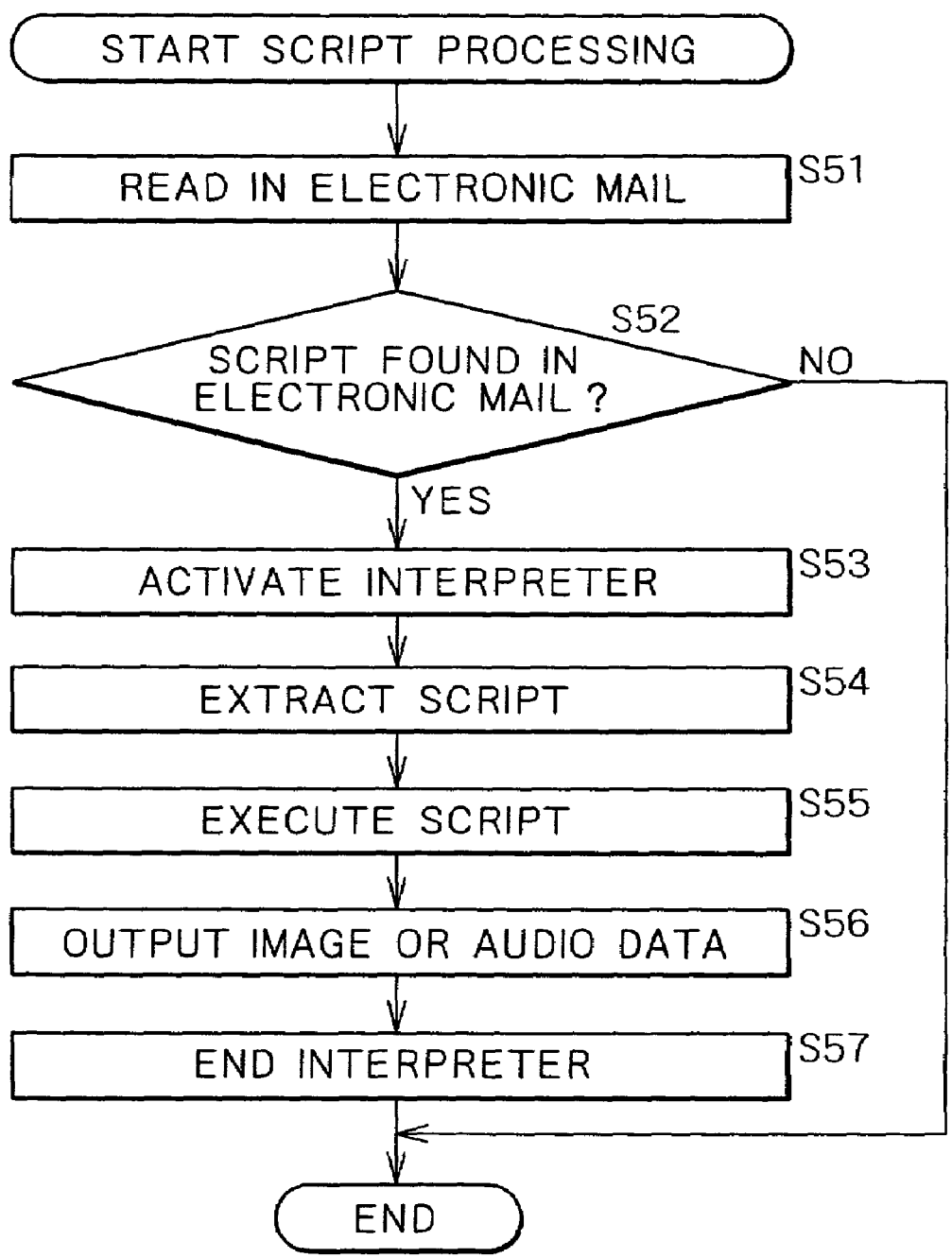
FIG. 24 is a flowchart describing script processing.

The following describes the script processing of the PDA 1 which executes the mail send/receive program 104 and the interpreter 106, the processing being executed when the mail send/receive program 104 displays a received electronic mail, with reference to the flowchart shown in FIG. 24. In step S51, the mail send/receive program 104 reads in the received electronic mail 151.

In step S52, the mail send/receive program 104 checks the read electronic mail 151 for a script. If a script is found, the mail send/receive program goes to step S53 to start the interpreter 106. The mail send/receive program 104 supplies the electronic mail 151 to the interpreter 106.

It should be noted that the interpreter 106 may have been started beforehand along with the mail send/receive program 104.

In step S54, the syntax analysis module 121 of the interpreter 106 extracts the script from the electronic mail 151 on the basis of the description of the electronic mail 151. In step S55, the execution module 122 of the interpreter 106 executes the extracted script.

In step S56, the output module 123 of the interpreter 106 executes an image display or audio output process depending on the result of the script execution. In step S57, the mail send/receive program 104 ends the interpreter 106, upon which the processing comes to an end.

In step S52, if no script is found, no script processing is required, so that the processes of steps S53 through S57 are skipped, upon which the processing comes to an end.

Thus, when a script is contained in the electronic mail 151, the PDA 1 activates the interpreter 106 to execute the processing corresponding to the script.

It should be noted that the process of step S52 may be executed by the syntax analysis module 121 of the already activated interpreter 106.

Figure 25:
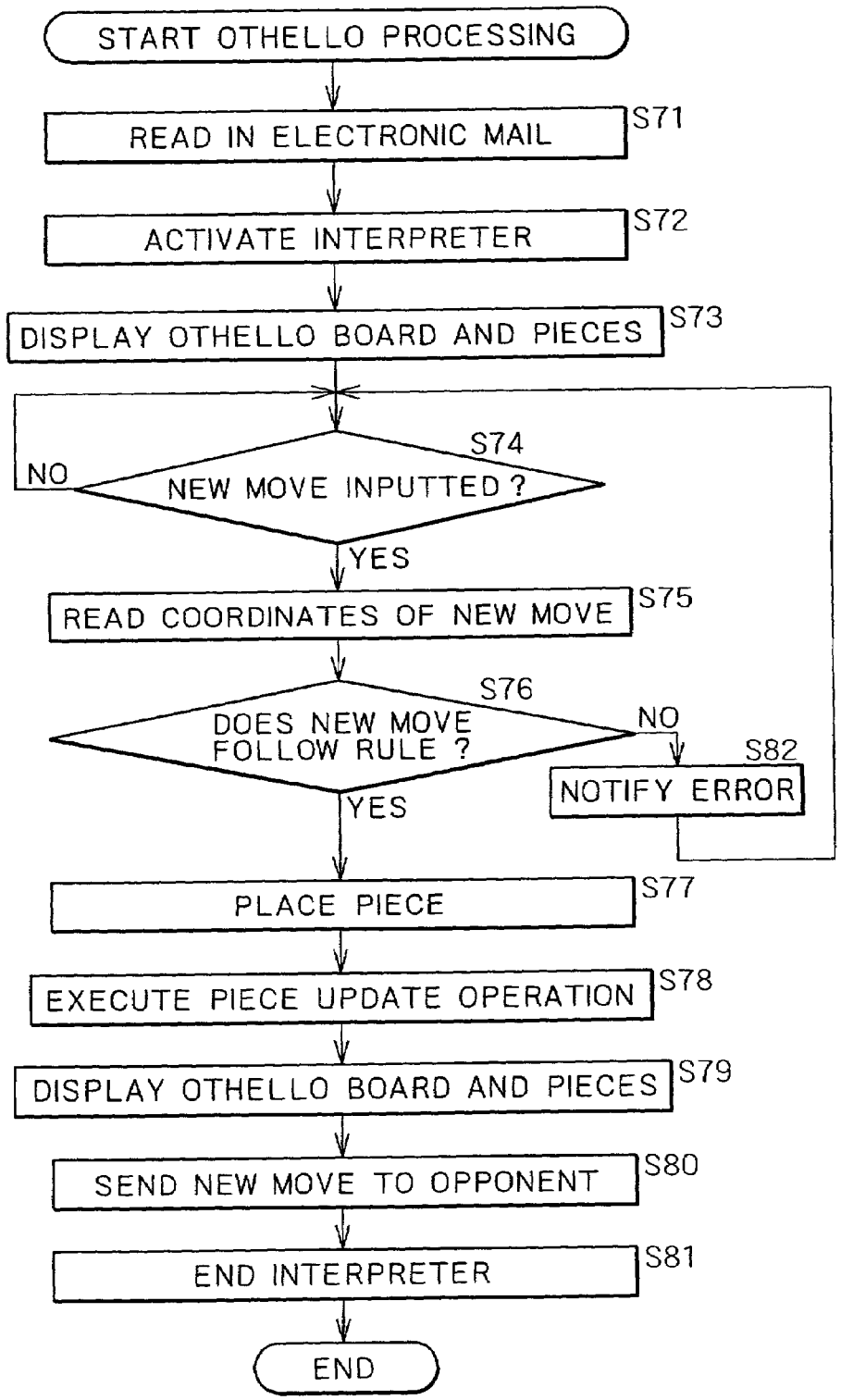
FIG. 25 is a flowchart describing Othello game processing.

The following describes the processing of Othello, which is a more specific example of the script execution, with reference to the flowchart shown in FIG. 25. In step S71, the mail send/receive program 104 reads in a received electronic mail 151.

In step S72, the mail send/receive program 104 activates the interpreter 106. In step S73, the output module 123 of the interpreter 106 displays an Othello board and pieces on the display block 21.

In step S74, the execution module 122 determines whether a new move has been made. If no new move is found, the execution module 122 repeats the decision process of step S74.

If a new move is found in step S74, then the execution module 122 reads the coordinates (indicative of a position on the Othello board) of the new move in step S75. In step S76, the execution module 122 determines whether the new move satisfies the requirements specified in the Othello rule. If the new move is found satisfying the requirements, the execution module 122 goes to step S77 to place a piece to the position on the Othello board corresponding to the new move.

In step S78, the execution module 122 executes piece update operation such as reversing the faces of a particular piece. In step S79, the output module 123 displays an Othello board and pieces on the display block 21.

In step S80, the output module 123 causes the USB interface 36 to communicate a new move to the opponent. In step S81, the mail send/receive program 104 ends the interpreter 106, upon which the processing comes to an end.

In step S76, if the new move is found not satisfying the requirements of the Othello rules, then, in step S82, the output module 123 displays an error message on the display block 21 to notify the user of the error, upon which the procedure returns to step S74 to repeat the processing from inputting of a new move.

Thus, the PDA 1 executes the Othello game processing on the basis of the script included in the electronic mail 151.

As described, when the user reads the electronic mail 151, the PDA 1 executes an action desired by the sender of the electronic mail 151. If the user does not read the electronic mail 151, the PDA 1 does not execute the script included in the electronic mail 151, so that the load of the script processing is minimized.

The PDA 1 can execute various processes corresponding to script descriptions only by executing the interpreter 106, so that, as compared with attaching data to an electronic mail, there is no need for storing many application programs corresponding to the kinds of the attached data.

In addition, because the interpreter 106 executes scripts, the installation of the interpreter 106 in security can execute the processing more safely as compared with the direct execution of execution programs attached to an electronic mail.

The following describes a mail send/receive system practiced as a second embodiment of the invention.

Figure 26:
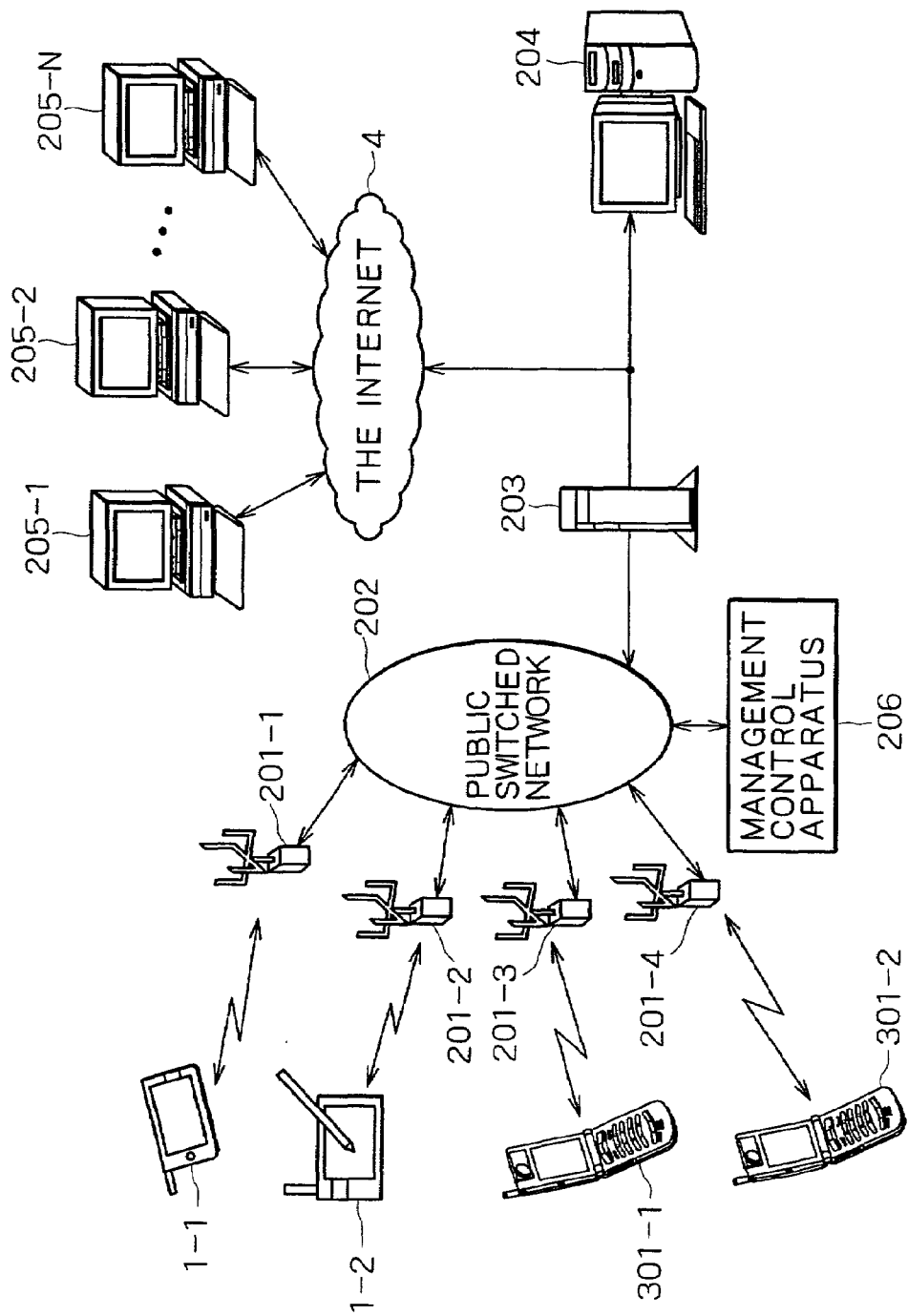
FIG. 26 is a schematic diagram illustrating an electronic mail send/receive system practiced as a second embodiment of the present invention.

FIG. 26 shows a mail send/receive system practiced as a second embodiment of the invention. A public switched network 202 is connected to PDA 1-1 or 1-2 or camera-mounted digital mobile phones 301-1 and 301-2 via base stations 201-1 through 201-4, stationary wireless stations, respectively, each arranged in each of cells obtained by dividing a communication service provision area into a desired size.

The base stations 201-1 through 201-4 wirelessly connect the mobile wireless stations PDAs 1-1 and 1-2 and the camera-mounted digital mobile phones 301-1 and 301-2 by W-CDMA (Wideband Code Division Multiple Access) for example and can communicate mass data with the PDAs 1-1 and 1-2 and the camera-mounted digital mobile phones 301-1 and 301-2 at a maximum data transfer rate of 2 Mbps by use of 2 GHz frequency band.

Because PDAs 1-1 and 1-2 and the camera-mounted digital mobile phones 301-1 and 301-2 can communicate mass data with the base stations 201-1 through 201-4 at the high data transfer rate based on W-CDMA, various kinds of data communication of not only audio talk but also electronic mail transfer, simplified home page browsing, and image transfer can be executed.

The base stations 201-1 through 201-4 are connected to the public switched network 202 by wired line. The public switched network 202 is connected to the Internet 4, a subscriber wired terminal device, a computer network, and an intranet for a company for example, not shown.

An access server 203 of an Internet service provider is connected to the public switched network 202 and to a content server 204 owned by the Internet service provider.

In response to a request from the subscriber wired terminal device, the PDA 1-1 or 1-2, or the camera-mounted digital mobile phones 301-1 and 301-2, the content server 204 provides content such as a simplified home page for example in the form of a compact HTML (Hypertext Markup Language).

The Internet 4 is connected to many WWW (World Wide Web) servers 205-1 through 205-N. The WWW servers 205-1 through 205-N are accessed from the subscriber wired terminal devices, the PDAs 1-1 and 1-2 and the camera-mounted digital mobile phones 301-1 and 301-2 in accordance with the TCP (Transmission Control Protocol)/IP (Internet Protocol) standard.

With the PDAs 1-1 and 1-2 and the camera-mounted digital mobile phones 301-1 and 301-2, the communication with the base stations 201-1 through 201-4 is made by 2-Mbps simplified transport protocol, while the communication from the base stations 201-1 through 201-4 to the Internet 4 and the WWW servers 205-1 through 205-N is made by TCP/IP.

A management control apparatus 206 is connected via the public switched network 202 to the subscriber wired terminal devices, the PDAs 1-1 and 1-2, and the camera-mounted digital mobile phones 301-1 and 301-2 to perform authentication and charge processing on the subscriber wired terminal devices, the PDAs 1-1 and 1-2, and the camera-mounted digital mobile phones 301-1 and 301-2.

The camera-mounted digital mobile phones 301-1 and 301-2 send or receive mail by the same processing as that of the PDA 1 via the public switched network 202 and the Internet 4. The camera-mounted digital mobile phones 301-1 and 301-2, if a script is contained in the received electronic mail, activate the interpreter 106 to execute the script.

In what follows, the camera-mounted digital mobile phones 301-1 and 301-2 are generically referred to as a camera-mounted digital mobile phone 301 unless they need to be specifically distinguished.

Figure 27:
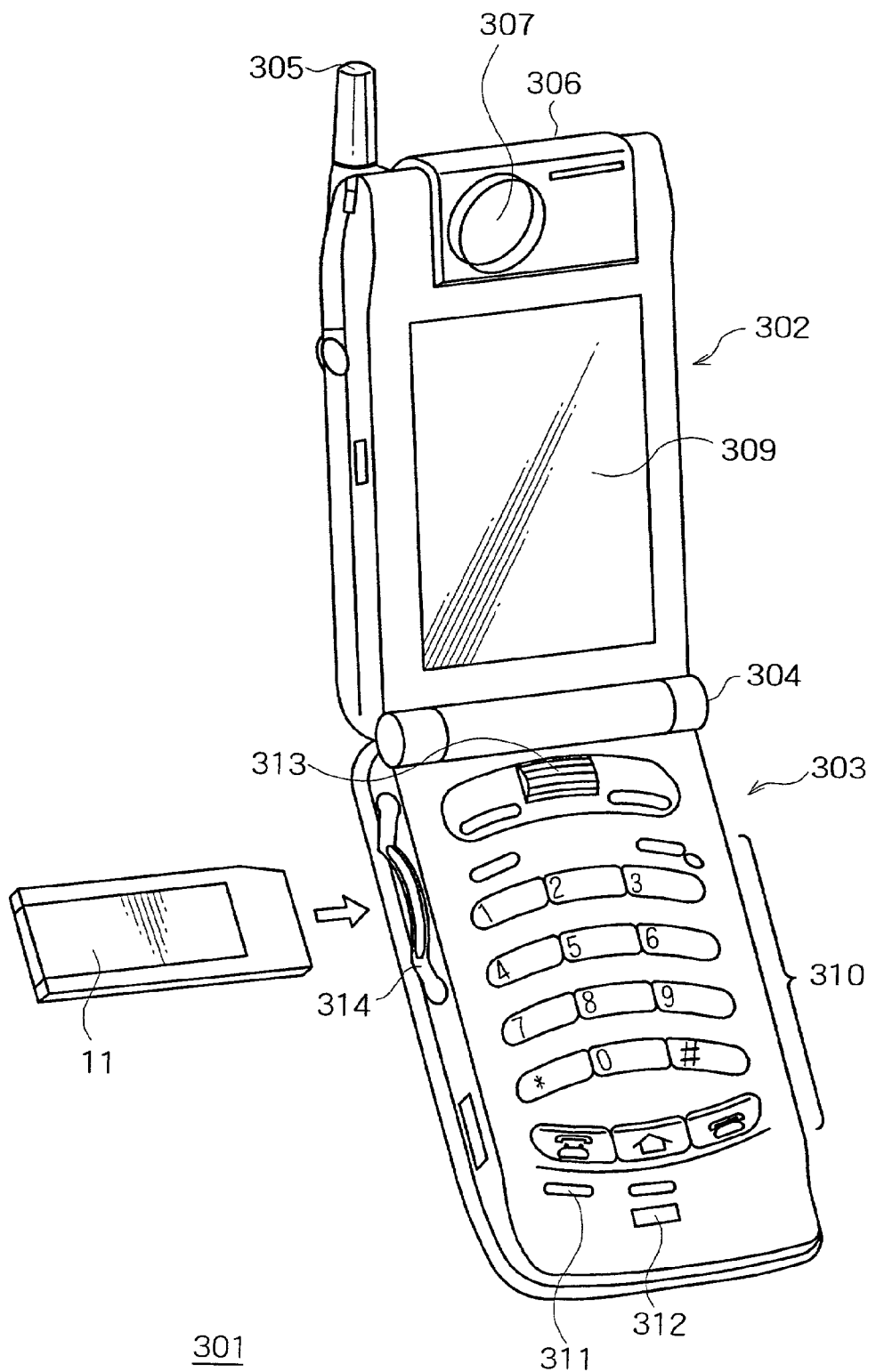
FIG. 27 is an external perspective view illustrating a camera-mounted digital mobile phone.

The following describes an external configuration of the camera-mounted digital mobile phone 301 to which the present invention is applied. As shown in FIG. 27, the camera-mounted digital mobile phone 301 is composed of a display block 302 and a main body 303 and foldable with a hinge 304 at the center.

The display block 302 has a retractable send/receive antenna 305 at the upper left side. The camera-mounted digital mobile phone 301 sends and receives radio waves with any of the base stations 201-1 through 201-4, which are stationary wireless stations, via the antenna 305.

The display block 302 has a camera block 306 which is pivotal in a range of about 180 degrees at the upper center block. The camera-mounted digital mobile phone 301 images desired objects by a CCD camera 307 housed in the camera block 306.

Figure 28:
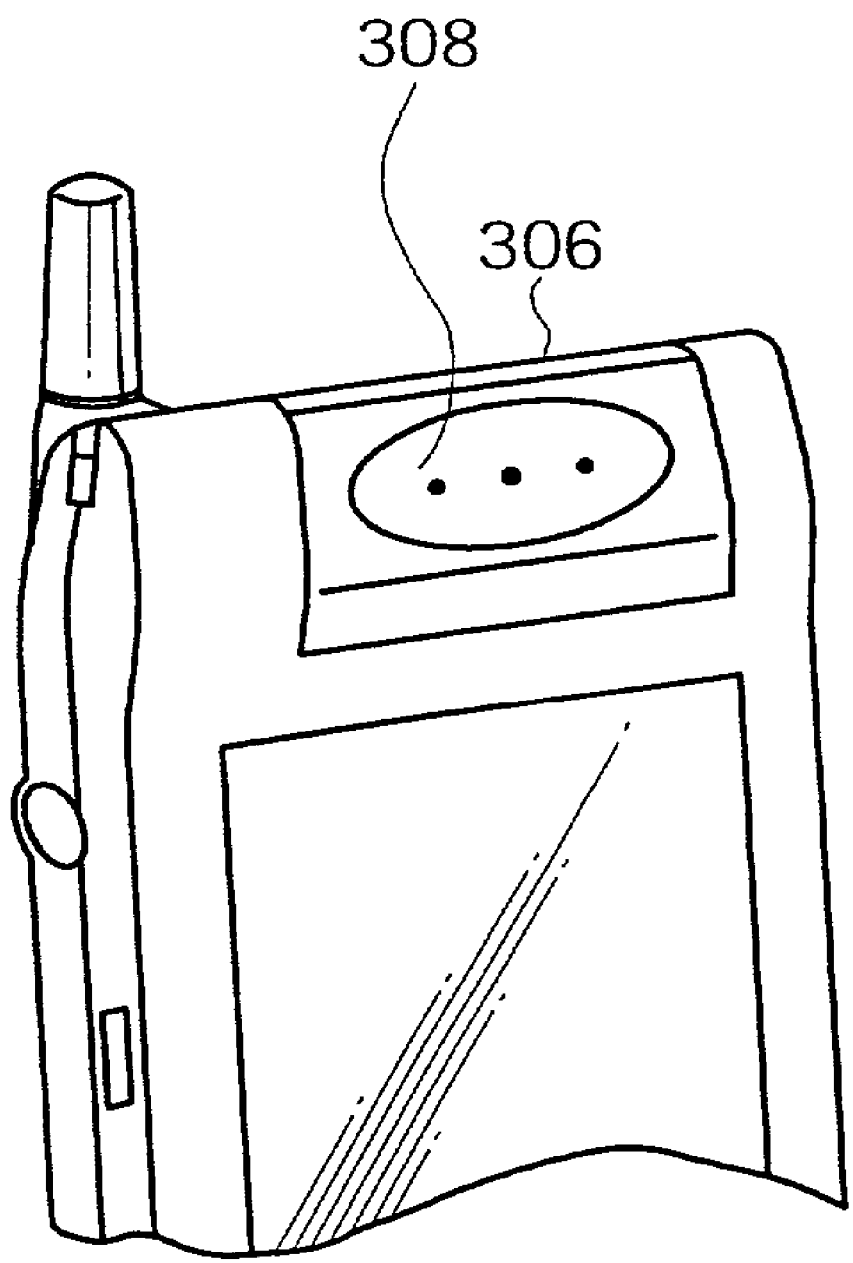
FIG. 28 is a partial external perspective view illustrating a display block of the camera-mounted digital mobile phone.

If the camera block 306 is rotated and positioned by the user about 180 degrees, the display block 302 is positioned with a speaker 308 arranged at the rear center of the camera block 306, faced to the front side as shown in FIG. 28. Thus, the camera-mounted digital mobile phone 301 gets in the normal talk mode.

In addition, the display block 302 has a liquid crystal display 309 at the front center section. The liquid crystal display 309 displays the contents of an electronic mail, a simplified home page, and an image taken by the CCD camera 307 of the camera block 306 in addition to radio wave reception status, battery remaining amount, and names and numbers of phones registered as a telephone directory and call log.

On the other hand, the main body 303 has operation keys 310 including numeric keys, a call key, a redial key, a hung-up/power key, a clear key and an electronic mail key on the front surface. Various commands are inputted from these operation keys 310 into the camera-mounted digital mobile phone 301.

Below the operation keys 310 of the main body 303, a memo button 311 and a microphone 312 are arranged. When the memo button 311 is pressed, the camera-mounted digital mobile phone 301 records the voice of the other party. The camera-mounted digital mobile phone 301 picks up the voice of the user in the talk mode through the microphone 312.

In addition, a rotatable jog dial 313 is arranged over the operation keys 310 on the main body 303 in a manner in which the jog dial 313 is slightly projecting from the surface of the main body 303. In accordance with the rotary operation of the jog dial 313, the camera-mounted digital mobile phone 301 executes the scrolling of a telephone directory list or electronic mails displayed on the liquid crystal display 309, the turning of the displayed pages of simplified home page, and the feeding of displayed images, for example.

For example, the main body 303 selects a desired telephone number from among those in a telephone directory list displayed on the liquid crystal display 309 by the rotation of the jog dial 313 by the user and, when the jog dial 313 is pressed into the main body 303, enters the selected telephone number, thereby automatically originating a call to the party at the selected telephone number.

It should be noted that a battery pack, not shown, is loaded in the main body 303 at the rear side. When the hung-up/power key is turned on, power is supplied from the battery pack to each circuit, making the camera-mounted digital mobile phone 301 ready for operation.

The main body 303 also has a Memory Stick slot 314 at the upper left side in which the detachable Memory Stick 11 is loaded. When the memo button 311 is pressed, the camera-mounted digital mobile phone 301 records the voice of the other party into the loaded Memory Stick 11. In accordance with the operation of the user, the camera-mounted digital mobile phone 301 records an electronic mail, a simplified home page, or an image taken by the CCD camera 307 into the loaded Memory Stick 11.

The Memory Stick 11 is a kind of flash memory card developed by Sony Corporation, the applicant hereof. The Memory Stick 11 incorporates a flash memory element, one kind of EEPROM (Electrically Erasable and Programmable Read Only Memory) which is a non-volatile memory, housed in a plastic case having dimensions of 21.5 mm×50 mm×2.8 mm. The Memory Stick allows writing and reading of various data such as images, voices, and music via a 10-pin terminal.

The Memory Stick 11 uses a proprietary serial protocol which guarantees compatibility with the devices in which it is used even if the specifications of the incorporated flash memory have been changed due to the increase in its capacity for example, realizes the high-speed performance of maximum write rate of 1.5 MB/S and maximum read rate of 2.45 MB/S, and ensures the high reliability by the provision of an error deletion preventing switch.

Consequently, the camera-mounted digital mobile phone 301, configured to detachably load the Memory Stick 11, can share data with other electronic devices via the Memory Stick 11.

Figure 29:
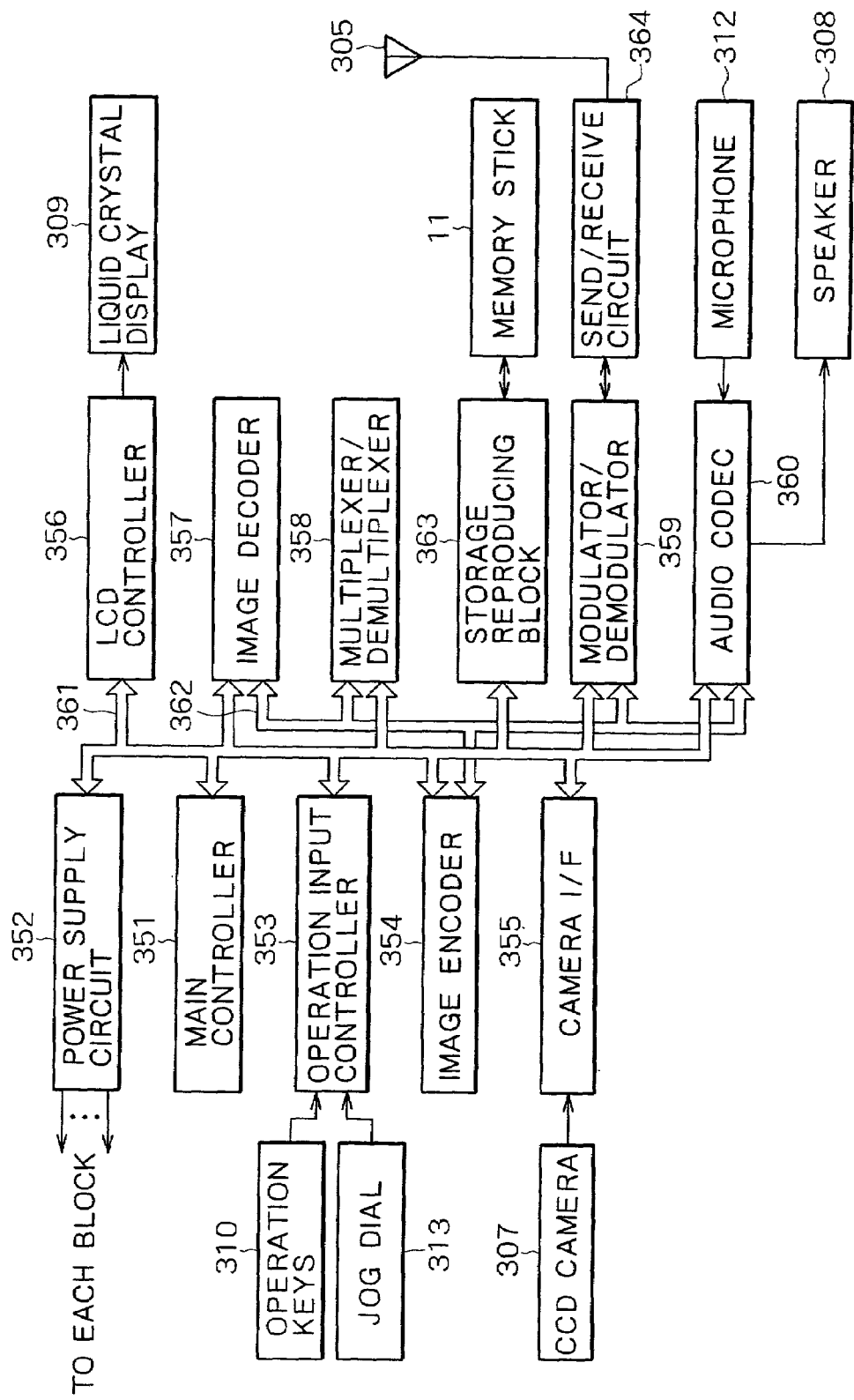
FIG. 29 is a block diagram illustrating an exemplary configuration of the camera-mounted digital mobile phone.

As shown in FIG. 29, the camera-mounted digital mobile phone 301 is configured so that a main controller 351 for centrally controlling each portions of the display block 302 and the main body 303 is connected to a power supply circuit 352, an operation input controller 353, an image encoder 354, a camera interface (I/F) 355, an LCD (Liquid Crystal Display) controller 356, an image decoder 357, a multiplexer/demultiplexer 358, a storage reproducing block 363, a modulator/demodulator 359, and an audio codec 260 via a main bus 361, and the image encoder 354, the image decoder 357, the multiplexer/demultiplexer 358, the modulator/demodulator 359, and the audio codec 360 are interconnected by a synchronous bus 362.

The power supply circuit 352, when the hung-up/power key is turned on by the user, supplies power from the battery pack to each component circuit, thereby making the camera-mounted digital mobile phone 301 ready for operation.

Under the control of the main controller 351 composed of a CPU, a ROM, and a RAM for example, the camera-mounted digital mobile phone 301 converts an audio signal picked up by the microphone 312 in the talk mode into digital audio data through the audio codec 360. The camera-mounted digital mobile phone 301 performs spread spectrum on the digital audio data through a modulator/demodulator 359 and performs digital-to-analog conversion and then frequency conversion on the digital audio data through the a send/receive circuit 364, sending the resultant digital audio data via the antenna 305.

The camera-mounted digital mobile phone 301 amplifies a receive signal received at the antenna 305 in the talk mode, performs frequency conversion and analog-to-digital conversion on the amplified receive signal, performs despread spectrum on the converted signal, and converts the resultant signal into an analog audio signal through the audio codec 360. The camera-mounted digital mobile phone 301 outputs a voice corresponding to this analog audio signal from the speaker 308.

Further, in the data communication mode, when sending an electronic mail, the camera-mounted digital mobile phone 301 sends the text data of the electronic mail inputted from the operation keys 310 and the jog dial 313 to the main controller 351 via the operation input controller 353.

The main controller 351 performs spread spectrum on the text data through the modulator/demodulator 359 and then digital-to-analog conversion and frequency conversion through the send/receive circuit 364, sending the resultant text data to a corresponding base station via the antenna 305.

In the data communication mode, when receiving an electronic mail, the camera-mounted digital mobile phone 301 performs despread spectrum on the receive signal received from the base station 201-3 via the antenna 305 to restore the original text data and displays the original text data on the liquid crystal display 309 through the LCD controller 356 as an electronic mail.

In the data communication mode, when sending or receiving an electronic mail, the main controller 351 executes the mail send/receive program 104 and the interpreter 106.

The LCD controller 356 is connected to the liquid crystal display 309 via a flexible printed circuit board having a panel ID setting block, like the flexible printed circuit board.

Then, the camera-mounted digital mobile phone 301 also can record the received electronic mail in accordance with the operation by the user into the Memory Stick 11 via the storage reproducing block 363.

In the data communication mode, when sending image data, the camera-mounted digital mobile phone 301 supplies the image data taken by the CCD camera 307 to the image encoder 354 via the camera interface 355.

When not sending image data, the camera-mounted digital mobile phone 301 can also display the image data taken by the CCD camera 307 onto the liquid crystal display 309 via the camera interface 355 and the LCD controller 356.

The image encoder 354 converts the image data supplied from the CCD camera 307 into coded image data by coding and compressing based on MPEG2 (Moving Picture Experts Group 2) or MPEG4 for example and sends the coded image data to the multiplexer/demultiplexer 358.

At this moment, the in camera-mounted digital mobile phone 301, a voice picked up by the microphone 312 while taking the image by the CCD camera 307 is sent to the multiplexer/demultiplexer 358 via the audio codec 360 as digital audio data.

The multiplexer/demultiplexer 358 multiplexes the coded image data supplied from the image encoder 354 with the audio data supplied from the audio codec 360 by a predetermined algorithm, performs spread spectrum on the resultant multiplexed data through the modulator/demodulator 359, and performs digital-to-analog conversion and frequency conversion through the send/receive circuit 364, outputting the resultant data via the antenna 305.

In the data communication mode, when receiving the data of a moving image file linked with a simplified home page for example, the camera-mounted digital mobile phone 301 performs despread spectrum on the receive signal received from the corresponding base station via the antenna 305 through the modulator/demodulator 359 and sends the resultant multiplexed data to the multiplexer/demultiplexer 358.

The multiplexer/demultiplexer 358 divides the multiplexed data into coded image data and audio data, supplying the coded image data to the image decoder 357 and the audio data to the audio codec 360 via the synchronous bus 362.

The image decoder 357 generates reproduced moving image data by decoding the coded image data by the corresponding predetermined decoding algorithm such as MPEG2 or MPEG4 for example and supplies the reproduced moving image data to the liquid crystal display 309 via the LCD controller 356. Consequently, the camera-mounted digital mobile phone 301 displays the moving image data contained in a moving image file linked with a simplified home page for example.

At the same time, the audio codec 360 converts the audio data into an analog audio signal and supplies it to the speaker 308. Consequently, the camera-mounted digital mobile phone 301 reproduces the audio data contained in the moving image file linked with the simplified home page for example.

In this case, as with an electronic mail, the camera-mounted digital mobile phone 301 also can record the data linked with the received simplified home page into the Memory Stick 11 via the storage reproducing block 363 as operated by the user.

It should be noted that the present invention is applicable to not only the PDA 1 and the camera-mounted digital mobile phone 301 but also such terminal devices as a notebook personal computer, a PHS (Personal Handyphone System), and a car navigation system that send and receive an electronic mail.

The following describes a detail configuration of the interpreter 106.

Figure 30:
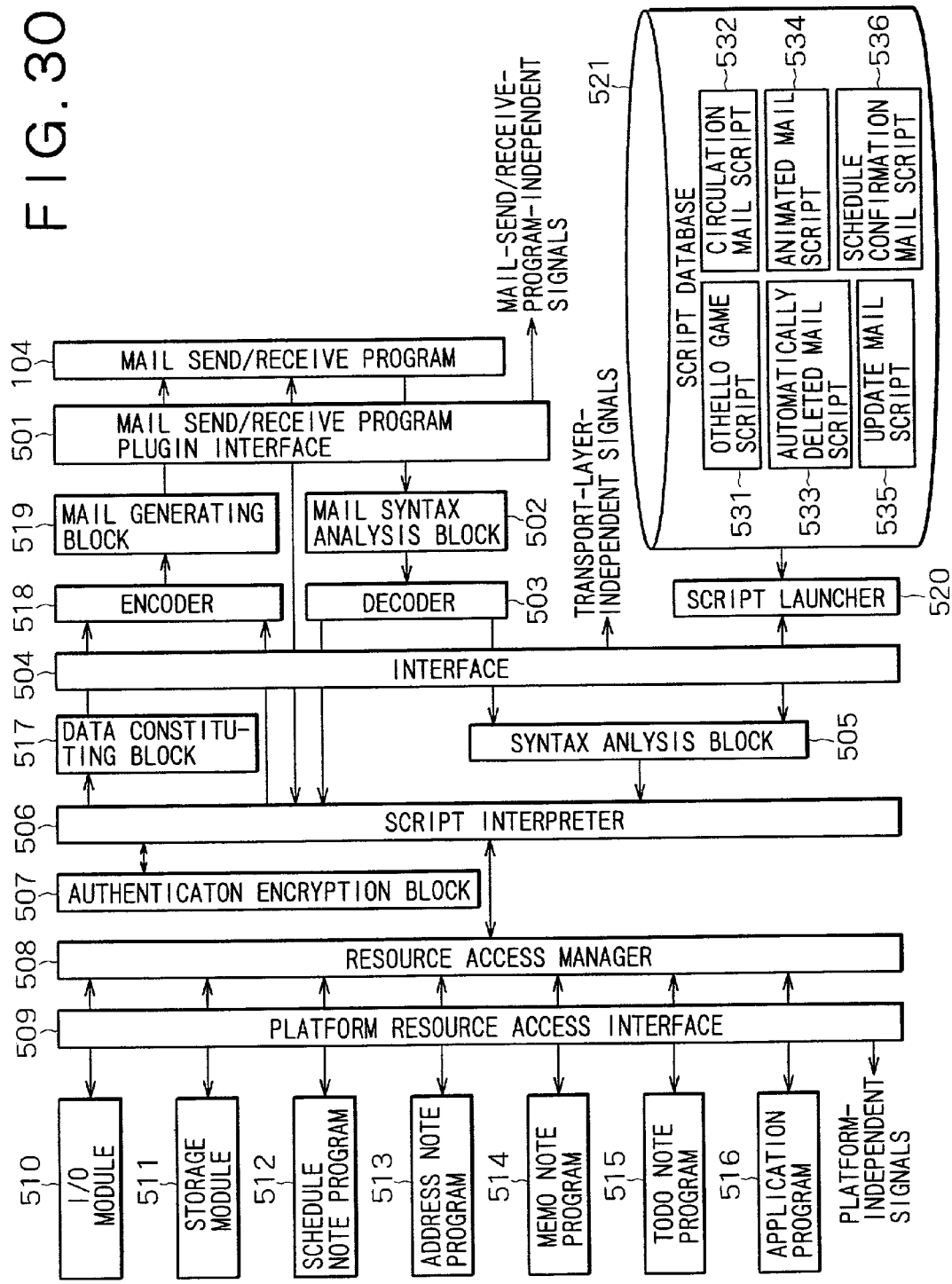
FIG. 30 is a block diagram illustrating an exemplary detail configuration of an interpreter.

FIG. 30 shows an exemplary detailed configuration of the interpreter 106.

A mail syntax analysis block 502, a decoder 503, a syntax analysis block, a data constituting block 517, an encoder 518, and a mail generating block 519 shown in FIG. 30 correspond to the syntax analysis module 121 shown in FIG. 10.

A script interpreter 506, an authentication encryption block 507, a resource access manager 508, and a storage module 511 shown in FIG. 30 correspond to the execution module 122 shown in FIG. 10.

An I/O (Input/Output) module 510 shown in FIG. 30 corresponds to the output module 123 shown in FIG. 10.

The mail send/receive program 104 supplies the electronic mail 151 to be opened to the mail syntax analysis block 502 via a mail send/receive program plugin interface 501 or gets the electronic mail 151 generated by the mail generating block 519.

The mail syntax analysis block 502 analyzes the syntax of the electronic mail 151 supplied from the mail send/receive program 104 via the mail send/receive program plugin interface 501 and extracts a script and data from the electronic mail 151. The mail syntax analysis block 502 supplies the extracted script and the extracted data to the decoder 503.

A script is a kind of program consisting of a sequence of commands in which a processing procedure is described by character codes such as alphanumeric characters.

The decoder 503 decodes data which is encoded by a coding algorithm such as Base64. Base64 is a binary data encoding algorithm for converting data or programs into 64-type ASCII code strings for transmitting data or programs over a network which transmits only 7-bit data.

It should be noted that the decoder 503 may be adapted to decode coded scripts.

The decoder 503 supplies the decoded script to the syntax analysis block 505 via an interface 504 and the decoded data to the script interpreter 506.

The syntax analysis block 505 replaces a predetermined character string included in the script by an intermediate code which can be processed by the script interpreter 506. The intermediate code is broadly classified into: (1) a text string such as a result of lexical analysis or a generated text string; (2) an analysis tree or a syntax tree generated as a result of syntax analysis or a tree structure based on Polish notation; and (3) a form near machine language such as a virtual machine code called three-pair or four-pair. In the present specification, the intermediate code denotes the analysis tree.

It should be noted that, in the Java language, the above (3) is called a byte code.

An intermediate code is a code which is temporarily generated for the purpose of convenience in the process of converting a source code in a software program into a finally executable form. Thus, by finely dividing the process of conversion from source to target, a language processing system can be made compatible with a plurality of platforms (or targets) with ease.

In the Java language for example, a source code is temporarily converted into an intermediate code called a byte code, which is stored in a WWW server. The WWW server sends this byte code to the WWW browser of the client side. The Java VM (Virtual Machine) of the client side interprets and executes the byte code. In this case, the difference between platforms (namely, the difference between CPUs and between operating systems) is dissolved by the Java VM, so that the byte code itself is independent of particular platforms. Consequently, in the Java language, the program environment independent of platforms can be realized while minimizing the run-time load (namely, the conversion from byte code to executable code).

In other high-level language compilers, too, a source code is not directly converted into an executable program (normally, a binary code which can be interpreted by the CPU), but it is often converted into an intermediate code which is higher in abstraction than an actual machine (by which code optimization is facilitated because of the freedom from the restrictions of actual machine architecture for example), subsequently generating a final executable binary code.

The syntax analysis block 505 supplies the script with a predetermined character string replaced by an intermediate code to the script interpreter 506.

The script interpreter 506 supplies the script to the authentication encryption block 507 to cause it to determine the validity of the script.

The authentication encryption block 507 applies a hash function such as MD5 (Message Digest 5) for example to the script to compute a hash value corresponding to the script. The authentication encryption block 507 determines whether the computed hash value matches the authentication data contained in the script.

FIG. 31 shows an exemplary electronic mail 151 which includes authentication data.

In the electronic mail 151 shown in FIG. 31, the data such as "347a9d8684ab96533fb6b51906fdacf9" arranged between "<SIGNATURE>" and "</SIGNATURE>" is the authentication data.

It should be noted that an electronic signature or certificate may be included in the electronic mail 151 to be authenticated by the authentication encryption block 507 on the basis of the electronic signature or certificate.

If the computed hash value is found matching the authentication data, the authentication encryption block 507 supplies the data indicative of the validity of the script to the script interpreter 506 because the script has not been modified.

If the computed hash value is found not matching the authentication data, the authentication encryption block 507 supplies the data indicative of the invalidity of the script to the script interpreter 506 because the script has been modified.

When the data indicative of the invalidity of the script comes from the authentication encryption block 507, the script interpreter 506 does not execute that script.

When the data indicative of the validity of the script comes from the authentication encryption block 507, the script interpreter 506 executes that script on the basis of the data supplied from the decoder 503.

Thus, the script interpreter 506 executes only the valid scripts, so that the mail send/receive system associated with the present invention can prevent the attacks based on modified, invalid scripts, thereby guaranteeing the security in script execution.

When displaying an image on the display block 21 or retrieving data inputted from the touch pad, the script interpreter 506 causes the resource access manager 508 to execute the processing of image display or data retrieval.

When storing data into the flash ROM 33 or the EDO DRAM 34 or retrieving data from the flash ROM 33 or the EDO DRAM 34, the script interpreter 506 causes the resource access manager 508 to execute the processing of data storage or data retrieval.

When accessing a schedule note program 512, an address note program 513, a memo note program 514, a ToDo note program 515, or an application program 516, the script interpreter causes the resource access manager 508 to access the schedule note program 512, the address note program 513, the memo note program 514, the ToDo note program 515, or the application program 516.

When requested by the script interpreter 506 for displaying an image on the display block 21 or requested for retrieving the data inputted from the touch pad, the resource access manager 508 causes, via a platform resource access interface 509, the I/O module 510 to display the image on the display block 21 or retrieve the data inputted from the touch pad. The data inputted from the touch pad and retrieved by the I/O module 510 is supplied to the resource access manager 508 via the platform resource access interface 509.

The resource access manager 508 supplies the data inputted from the touch pad and retrieved by the I/O module 510 to the script interpreter 506.

When requested by the script interpreter 506 for storing data into the flash ROM 33 or the EDO DRAM 34 or requested for retrieving data from the flash ROM 33 or the EDO DRAM 34, the resource access manager 508 causes, via the platform resource access interface 509, the storage module 511 to store the data into the flash ROM 33 or the EDO DRAM 34 or retrieve data from the flash ROM 33 or the EDO DRAM 34. The data retrieved by the storage module 511 from the flash ROM 33 or the EDO DRAM 34 is supplied to the resource access manager 508 via the platform resource access interface 509.

The resource access manager 508 supplies the data retrieved by the storage module 511 from the flash ROM 33 or the EDO DRAM 34 to the script interpreter 506.

When requested by the script interpreter 506 for accessing the schedule note program 512, the address note program 513, the memo note program, 514, the ToDo note program 515, or the application program 516, the resource access manager 508 accesses the schedule note program 512, the address note program 513, the memo note program 514, the ToDo note program 515, or the application program 516 via the platform resource access interface 509.

The schedule note program 512 is an application program for recording schedule to a schedule note or displaying recorded schedule.

The memo note program 514 is an application program for recording memo to a memo note or displaying recorded memo.

The ToDo note program 515 is an application program for recording items to be done by the user or displaying recorded items to be done by the user.

The application program 516 executes predetermined processing.

The data constituting block 517, when sending desired data attached with the electronic mail 151, converts this data supplied from the script interpreter 506 into a predetermined data structure.

For example, when discontinuing the execution of the script and sending the data indicative of script execution status attached with the electronic mail 151, the script interpreter 506 supplies the data indicative of a program counter value or the data stored in a push-down stack to the data constituting block 517.

The data constituting block 517 converts the predetermined data indicative of the script execution status supplied from the script interpreter 506 into a predetermined data structure.

The data constituting block 517 supplies the data of the predetermined data structure to the encoder 518 via the interface 504.

The data constituting block 517 determines whether or not the attribute of volatility is attached to the data supplied from the script interpreter 506 (for example, the data stored in the flash ROM 33 or the EDO RAM 34, retrieved by the storage module 511). If the attribute of volatility is found attached, the data constituting block 517 nullifies (or deletes) the personal information contained in the data and then converts the data into a predetermined data structure (the details thereof will be described later).

The data constituting block 517 supplies the data (with no personal information included) having the predetermined data structure to the encoder 518 via the interface 504.

When sending a desired script by attaching to the electronic mail 151, the script interpreter 506 supplies the script to the encoder 518 via the interface 504.

The encoder 518 encodes, by Base64 for example, the data having the predetermined structure supplied from the data constituting block 517. The encoder 518 supplies the encoded data to the mail generating block 519. The encoder 518 supplies the script received from the script interpreter 506 directly to the mail generating block 519.

It should be noted that the encoder 518 may be adapted to encode the script.

The mail generating block 519 generates the electronic mail 151 which stores the coded data and the script supplied from the encoder 518. The mail generating block 519 supplies the generated electronic mail 151 to the mail send/receive program 104 via the mail send/receive program plugin interface 501.

The mail send/receive program 104 sends the electronic mail 151 supplied from the mail generating block 519.

A script launcher 520 selects, on the basis of the input from the touch pad of the display block 21, one of an Othello game script 531, a circulation mail script 532, an automatically deleted mail script 533, an animated mail script 534, an update mail script 535, and a schedule confirmation script 536 and supplies the selected script to the syntax analysis block 505 via the interface 504.

Figure 32:
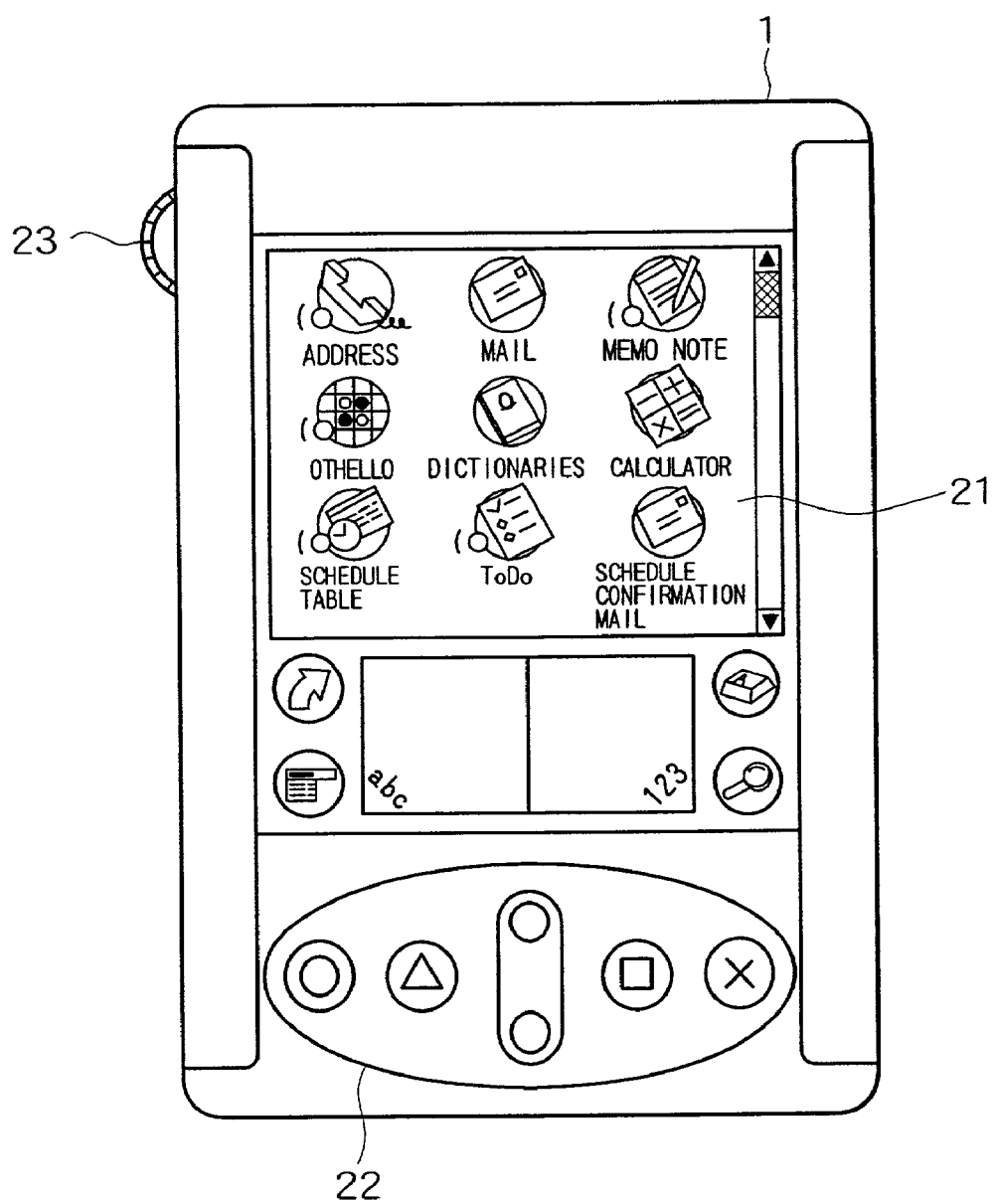
FIG. 32 illustrates icons shown on the display block.

As shown in FIG. 32 for example, of the icons shown on the display block 21, if an icon labeled Othello is selected, the script launcher 520 reads the Othello game script corresponding to the Othello icon from a script database 521 and supplies the script to the syntax analysis block 505 via the interface 504.

Of the icons shown on the display block 21, if an icon labeled schedule confirmation mail is selected, the script launcher 520 reads the schedule confirmation mail script 536 corresponding to the schedule confirmation mail icon from the script database 521 and supplies the script to the syntax analysis block 505 via the interface 504.

The syntax analysis block 505 replaces a predetermined character string included in the Othello game script 531, the circulation mail script 532, the automatically deleted mail script 533, the animated mail script 534, the update mail script 535 or the schedule confirmation mail script 536 by an intermediate code which can be processed by the script interpreter 506. The syntax analysis block 505 supplies the intermediate code script to the script interpreter 506.

The script interpreter 506 executes the Othello game script 531, the circulation mail script 532, the automatically deleted mail script 533, the animated mail script 534, the update mail script 535 or the schedule confirmation mail script 536 replaced by an intermediate code supplied from the syntax analysis block 505.

Thus, the interpreter 106 of which configuration is shown in FIG. 30 executes the script attached to the electronic mail 151 when it is opened, thereby executing the processing of displaying a predetermined image on the display block 21, the process corresponding to the touch pad operation on the display block 21, the storing of desired data into the flash ROM 33 or the EDO DRAM 34, or the retrieving data from the flash ROM 33 or the EDO DRAM 34, for example.

Therefore, the attachment of a script for executing predetermined processing to the electronic mail 151 allows its sender to cause its recipient to take desired actions quickly and securely.

For example, even if the recipient of the electronic mail 151 uses a small-sized terminal device, too small to make a prompt response to the mail, the sender of the electronic mail 151 can have its recipient make a response quickly and securely.

When the mail send/receive program 104 is going to open the message 151, the interpreter 106 executes the script attached thereto, so that the recipient of the mail need not acquire the corresponding script before the reception of the electronic mail 151.

A newly created script is transmitted as attached to the electronic mail 151, so that its recipient can quickly get the script, thereby quickly executing the newly created script.

Also, the interpreter 106 of which configuration is shown in FIG. 30 executes a stored script to execute the processing such as displaying a predetermined image on the display block 21, executing a process corresponding to a touch pad operation on the display block 21, storing desired data into the flash ROM 33 or the EDO DRAM 34, or retrieving data from the flash ROM 33 or the EDO DRAM 34, for example.

Moreover, the interpreter 106 of which configuration is shown in FIG. 30 executes a stored script to generate the electronic mail 151 storing a desired script, sending the created electronic mail 151 to the mail send/receive program 104.

The following describes the changing of platforms and script transmission media.

Figure 33:
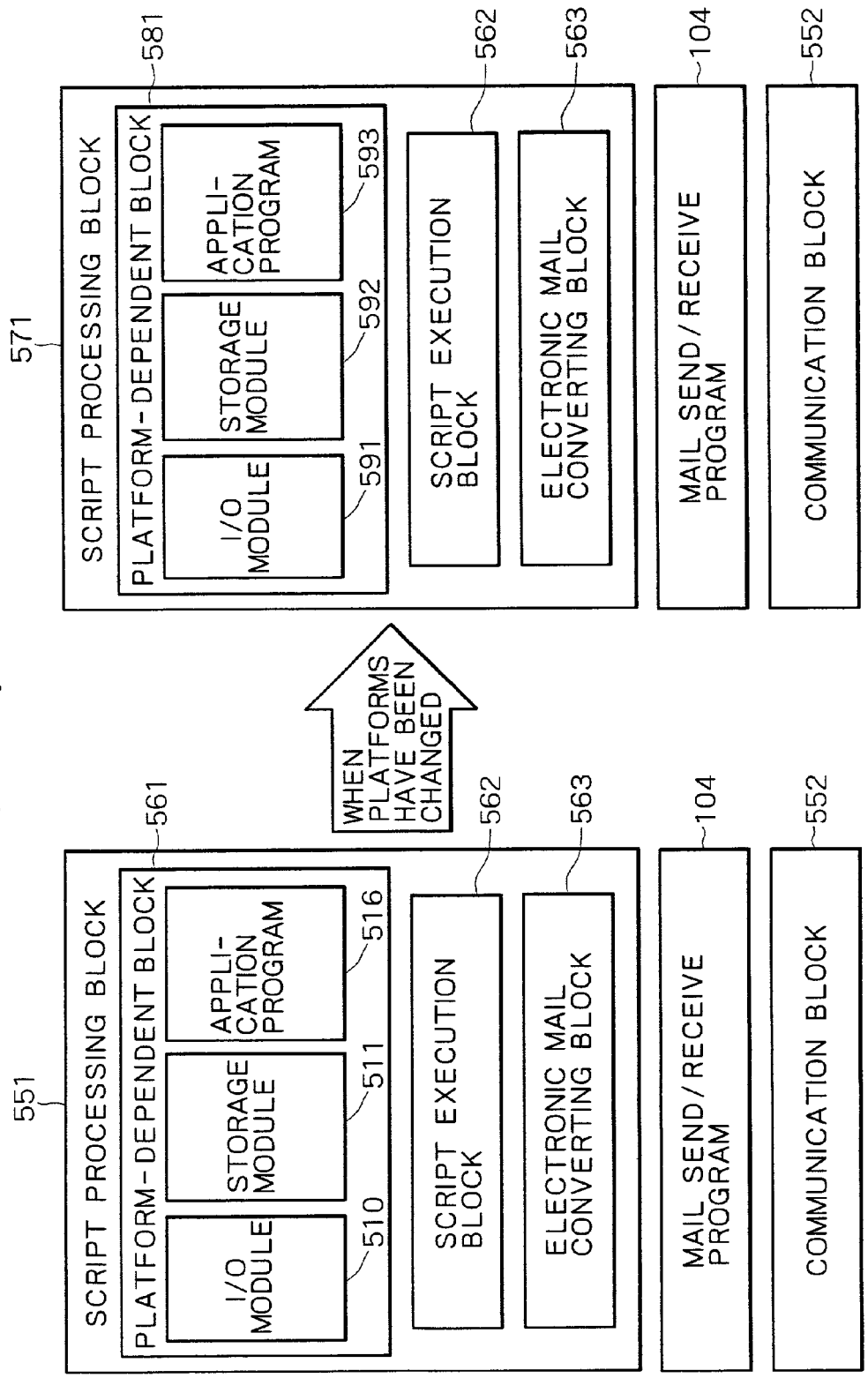
FIG. 33 is a schematic diagram illustrating a changed configuration of the interpreter caused by the change of platforms.

FIG. 33 illustrates the changing of the configuration of the interpreter 106 in which the OS 101 is changed to Windows CE (trademark of Microsoft Corporation) for example or another operating system.

A script processing block 551 shown in FIG. 33 includes a platform-dependent block 561, a script execution block 562, and an electronic mail converting block 563.

The platform-dependent block 561 is composed of the I/O module 510, the storage module 511, and the application module 516.

The script execution block 562 corresponds to the syntax analysis block 505, the script interpreter 506, the authentication encryption block 507, the resource access manager 508, and the data constituting block 517 shown in FIG. 30.

The electronic mail converting block 563 corresponds to the mail send/receive plugin interface 501, mail syntax analysis block 502, decoder 503, interface 504, encoder 518, and mail generating block 519 shown in FIG. 30.

A communication block 552 corresponds to the USB interface 36 (shown in FIG. 5) which receives the electronic mail 151 via the cradle 2 and the Internet 4.

For example, a platform change, such as changing of the OS 101 to another operating system, takes place, a script processing block 571 corresponding to the changed platform is changed from the platform-dependent block 561 to a platform-dependent block 581. The script execution block 562 and the electronic mail converting block 563 remain unchanged.

The platform-dependent block 581 is composed of an I/O module 591 corresponding to the changed platform, a storage module 592, and an application program 593.

Thus, if the platforms are changed, changing the platform dependent portions alone allows the interpreter 106 to execute the script attached to the electronic mail 151.

Figure 34:
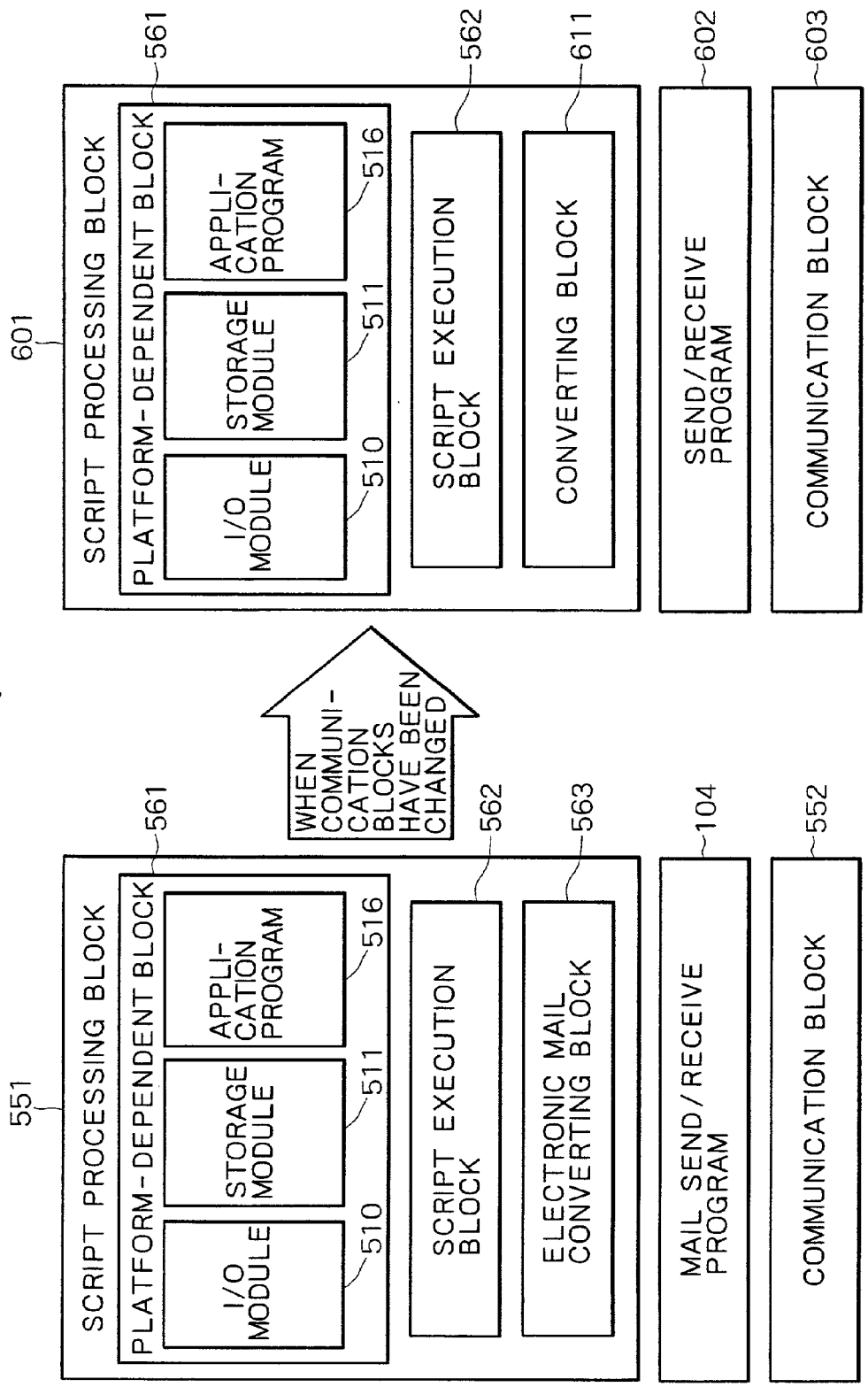
FIG. 34 is a schematic diagram illustrating a changed configuration of the interpreter caused by the change of script transmission media.

FIG. 34 illustrates a change in the configuration of the interpreter 106 when script transmission media have been changed such as transmitting a script itself by the communication compliant with the Bluetooth (trademark) specification for example.

A script processing block 601 after the changing of script transmission media includes a platform-dependent block 561, a script execution block 562, and a converting block 611.

A send/receive program 602 is a program for causing a communication block 603 which executes communication compliant with the Bluetooth specification to receive or send a script and data. The send/receive program 602 gets the script and data received by the communication block 603 and supplies the script and data to the converting block 611 of the platform-dependent block 561.

In addition, the send/receive program 602 causes the communication block 603 to send the script and data supplied from the converting block 611.

The converting block 611 converts a predetermined character string in the script supplied from the send/receive program 602 and supplies the converted script to the script execution block 562. Further, the converting block 611 converts the script and data supplied from the script execution block 562 and supplies the converted script and data to the send/receive program 602.

The script execution block 562 executes the script supplied from the converting block 611.

Thus, even if the script transmission media are changed, changing of the transmission-media-dependent portion alone allows the interpreter 106 to execute scripts.

Figure 35:
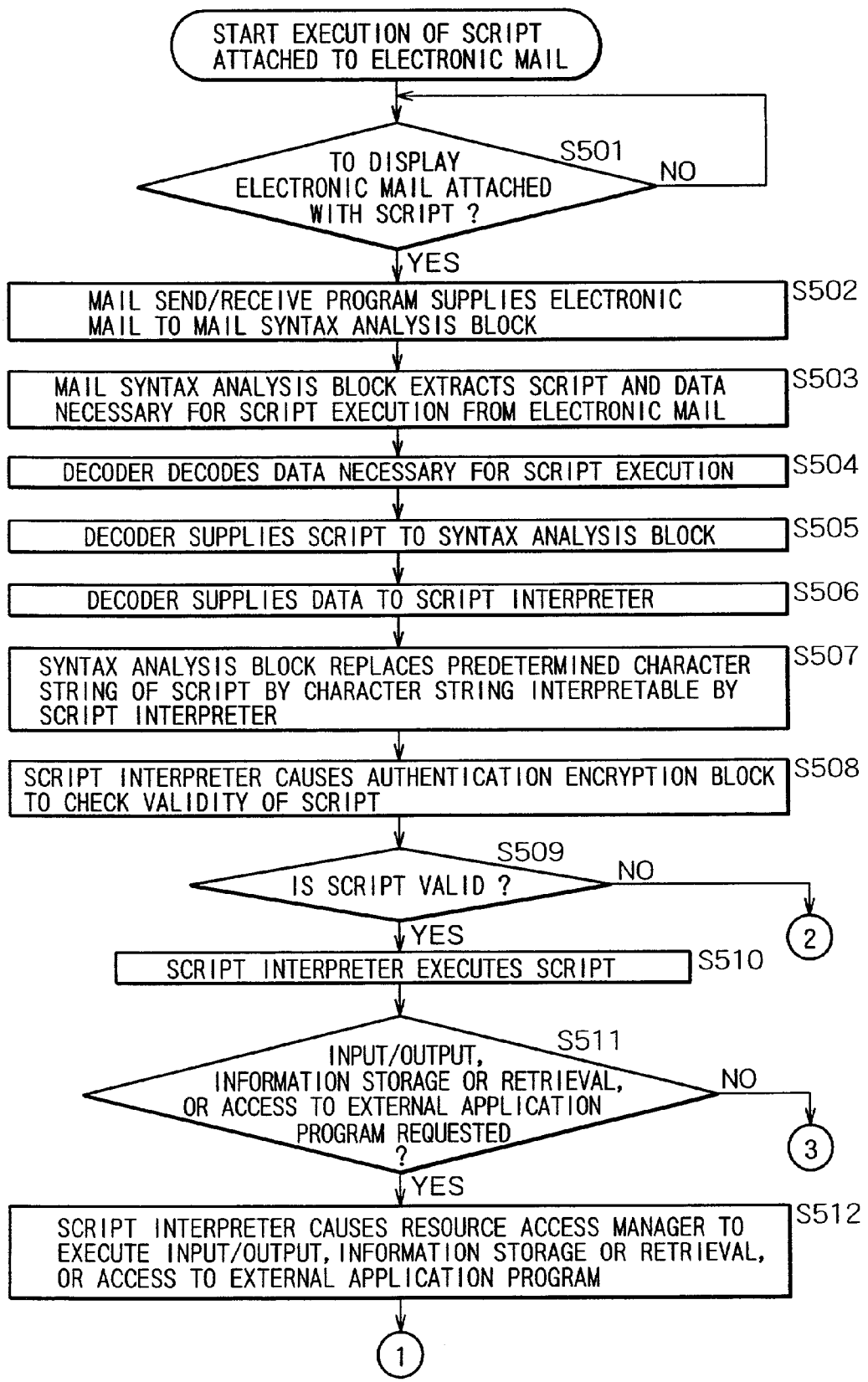
FIG. 35 is a flowchart describing the execution by the interpreter shown in FIG. 30 of a script attached to an electronic mail.
Figure 36:
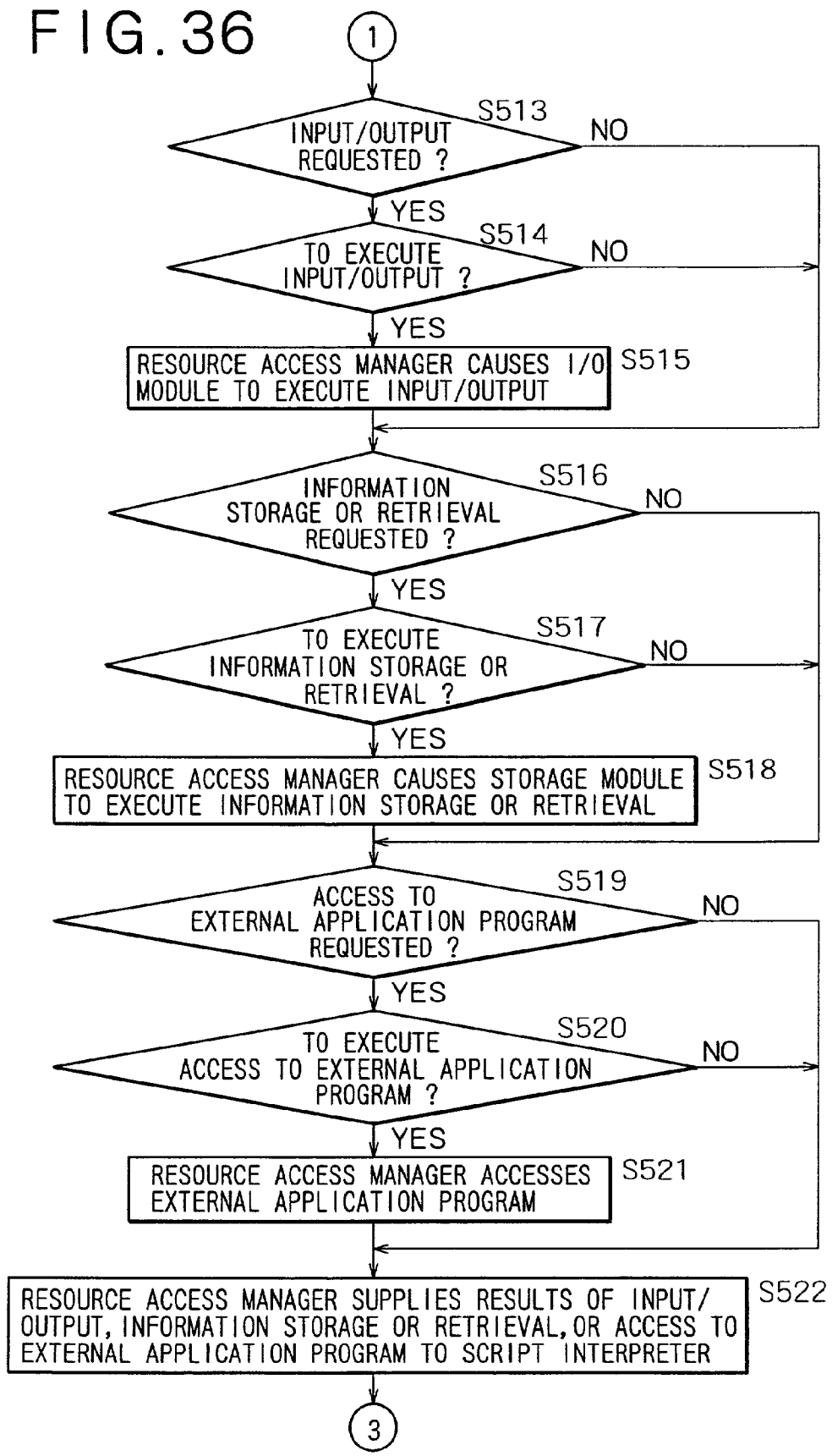
FIG. 36 is a flowchart continued from the flowchart of FIG. 35.
Figure 37:
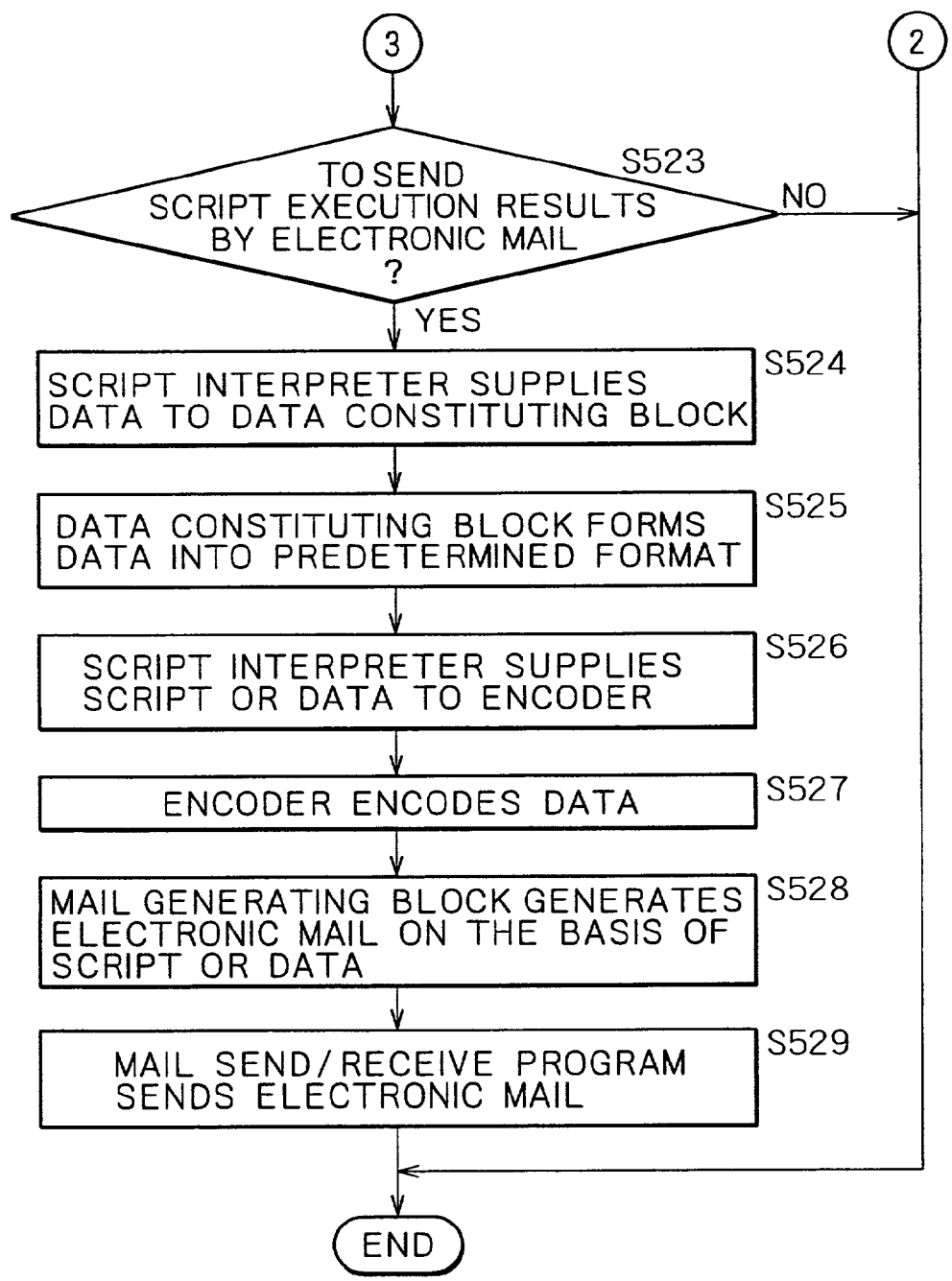
FIG. 37 is a flowchart continued from the flowcharts of FIGS. 35 and 36.

The following describes the execution of a script attached to an electronic mail by the interpreter 106 of which configuration is shown in FIG. 30, with reference to the flowcharts shown in FIGS. 35 through 37.

In step S501, the mail send/receive program 104 determines whether the electronic mail 151 having a script is to be displayed or not. If the electronic mail 151 having a script is found not to be displayed, the procedure returns to step S501 to repeat the decision process.

In step S501, if the electronic mail 151 having a script is found to be displayed, then, in step S502, the mail send/receive program 104 supplies the electronic mail 151 to be opened to the mail syntax analysis block 502 via the mail send/receive program plugin interface 501.

In step S503, the mail syntax analysis block 502 extracts the script and the data necessary for script execution from the electronic mail 151 obtained from the mail send/receive program 104. The data necessary for script execution is data corresponding to the program counter value or stack pointer value indicative of the script execution status when the script execution is discontinued, the data indicative of an Othello game piece arrangement, the data for drawing animation, the data for program updating, or the data indicative of electronic mail circulation status, for example.

The mail syntax analysis block 502 supplies the extracted script and the extracted data necessary for script execution to the decoder 503.

In step S504, the decoder 503 decodes, by Base64 for example, the data necessary for script execution supplied from the mail syntax analysis block 502.

In step S505, the decoder 503 supplies the script to the syntax analysis block 505 via the interface 504.

In step S506, the decoder 503 supplies the data necessary for script execution to the script interpreter 506 via the interface 504.

In step S507, the syntax analysis block 505 replaces a predetermined character string in the script supplied from the decoder 503 by an intermediate code which can be interpreted by the script interpreter 506. The syntax analysis block 505 supplies the script with the predetermined character string replaced by the intermediate code to the script interpreter 506.

In step S508, the script interpreter 506 supplies the script to the authentication encryption block 507 to cause it to check the validity of the script. The authentication encryption block 507 extracts authentication data from the script supplied from the script interpreter 506 and applies a hash function to the script to generate a hash value. The authentication encryption block 507 determines the validity of the script on the basis of a match between the extracted authentication data and the generated hash value.

The authentication encryption block 507 supplies the data indicative of the validity or invalidity of the script to the script interpreter 506.

In step S509, the script interpreter 506 determines on the basis of the data supplied from the authentication encryption block 507 whether the script is valid or not. If the script is found invalid, it indicates that the script has been modified, so that the processing comes to an end without executing the script.

In step S509, if the script if found valid, then the script interpreter 506 executes the script in step S510.

In step S511, the script interpreter 506 determines by executing the script whether input/output, information storage or retrieval, or access to external application has been requested. If requested, then, in step S512, the script interpreter 506 causes the resource access manager 508 to execute the requested input/output operation, information storage or retrieval, or access to external application.

In step S513, the resource access manager 508 determines whether an input/output operation has been requested. If an input/output operation is found requested, then, in step S514, the resource access manager 508 causes the I/O module 510 to display a dialog box on the display block 21 which prompts the user to input whether to execute the input/output operation, thereby determining whether to execute the input/output operation on the basis of the user input operation.

If the input/output operation is found to be executed in step S514, then the resource access manager 508 causes the I/O module 510 to execute the input/output processing such as image displaying in step S515, upon which the procedure goes to step S516.

If no input/output operation is found requested in step S513, it indicates that no input/output processing is required, so that the processes of steps S514 and S515 are skipped, upon which the procedure goes to step S516.

If the input/output operation is found not to be executed in step S514, it indicates that no input/output operation should be executed, so that the process of step S515 is skipped, upon which the procedure goes to step S516.

In step S516, the resource access manager 508 determines whether information storage or retrieval has been requested or not. If information storage or retrieval is found requested, then, in step S517, the resource access manager 508 causes the I/O module 510 to display the dialog box on the display block 21 which prompts the user to input whether to execute the information storage or retrieval, thereby determining whether to execute the information storage or retrieval on the basis of the user input operation.

If the information storage or retrieval is found to be executed in step S517, then the resource access manager 508 causes the storage module 511 to execute information storage or retrieval with the flash ROM 33 in step S518, upon which the procedure goes to step S519.

If the information storage or retrieval is found not requested in step S516, it indicates that the information storage or retrieval processing is not required, so that the processes of steps S517 and S518 are skipped, upon which the procedure goes to step S519.

If the information storage or retrieval is found not to be executed in step S517, it indicates that the information storage or retrieval processing should not be executed, so that the process of step S518 is skipped, upon which the procedure goes to step S519.

In step S519, the resource access manager 508 determines whether access to an external application program such as the schedule note program 512, the address note program 513, the memo note program 514, the ToDo note program 515, or the application program 516 has been requested or not. If the access to any of these external application programs is found requested, then, in step S520, the resource access manager 508 causes the I/O module 510 to display a dialog box on the display block 21 for making the user input whether to execute the access to any external application program, thereby determining whether to execute the access on the basis of the input operation by the user.

If the access to an external application program is found to be executed in step S520, then the resource access manager 508 accesses the specified external application program in step S521, upon which the procedure goes to step S522.

If the access to an external application program is found not requested in step S519, it indicates that the processing of accessing an external application program is not required, so that the processes of steps S520 and S521 are skipped, upon which the procedure goes to step S522.

If the access to an external application program is found not to be executed in step S520, it indicates that the processing for accessing an external application program should not be executed, so that the process of step S521 is skipped, upon which the procedure goes to step S522.

In step S522, the resource access manager 508 supplies the results of the input/output operation, the information storage or retrieval, or the access to an external application program to the script interpreter 506.

In step S523, the script interpreter 506 determines on the basis of the user operation or the script description whether to send a script execution result by an electronic mail. If the script execution result is to be sent, then, in step S524, the script interpreter 506 supplies to the data constituting block 517 the data, to be attached to an electronic mail, such as script execution status indicating data which must be formed into a predetermined format.

In step S525, the data constituting block 517 forms the data supplied from the script interpreter 506 into a predetermined format. The data constituting block 517 supplies the formatted data to the encoder 518 via the interface 504.

In step S526, the script interpreter 506 supplies the script or data to be attached to an electronic mail to the encoder 518 via the interface 504. The data to be supplied by the script interpreter 506 to the encoder 518 need not be formatted by the data constituting block 517.

In step S527, the encoder 518 encodes, by Base64 for example, the data supplied from the data constituting block 517 or the data supplied from the script interpreter 506. The encoder 518 supplied the coded data and script to the mail generating block 519.

In step S528, the mail generating block 519 generates the electronic mail 151 attached with the script or data on the basis of the script or data supplied from the encoder 518. The mail generating block 519 supplies the generated electronic mail 151 to the mail send/receive program 104 via the mail send/receive program plugin interface 501.

In step S529, the mail send/receive program 104 sends the electronic mail 151 supplied from the mail generating block 519, upon which the processing comes to an end.

If, in step S511, an input/output operation, information storage or retrieval, or the access to an external application program is found not requested, it indicates that the processing for the input/output operation, information storage or retrieval, or the access to an external application program is not required, so that the processes of steps S512 through S522 are skipped, upon which the procedure goes to step S523, in which the script interpreter determines whether to send a script execution result by an electronic mail.

If, in step S523, the script execution result is found not to be sent, it indicates that the processing for sending an electronic mail is not required, so that the processes of steps S524 through S529 are skipped, upon which the processing comes to an end.

Thus, the interpreter of which configuration is shown in FIG. 30, when displaying the electronic mail 151 attached with a script, extracts the script from the electronic mail 151 and executes the extracted script.

When an input/output operation, information storage or retrieval, or the access to an external application program is requested by the execution of the script attached to the electronic mail 151, the interpreter 106 of which configuration is shown in FIG. 30 can execute the requested input/output operation, information storage or retrieval, or access to an external application program.

When the sending of a script execution result by an electronic mail is requested, the interpreter 106 of which configuration is shown in FIG. 30 can send the electronic mail 151 attached with the script or data in accordance with the script execution result.

Figure 38:
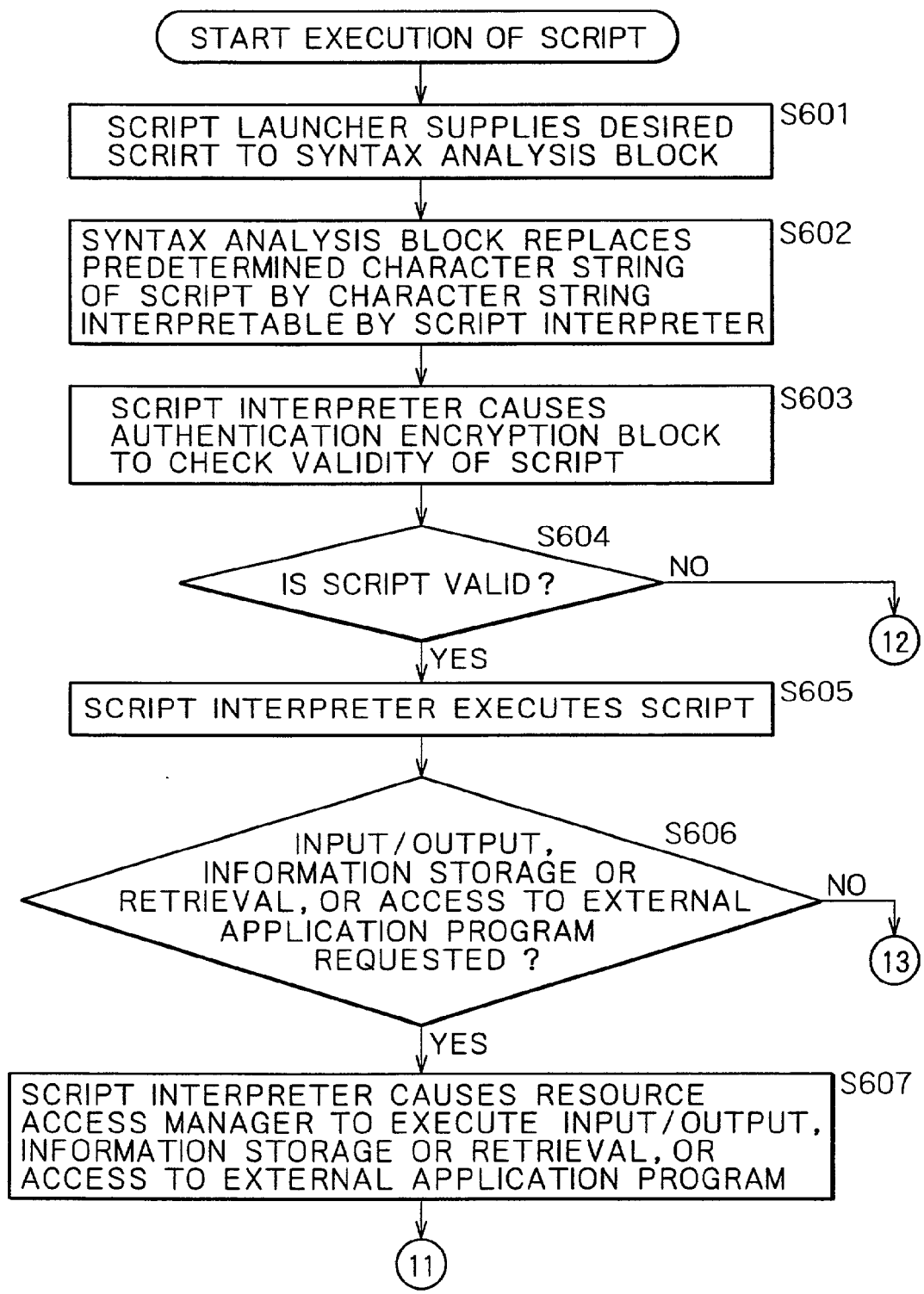
FIG. 38 is a flowchart describing the execution by the interpreter of FIG. 30 of a script stored in a script database.
Figure 39:
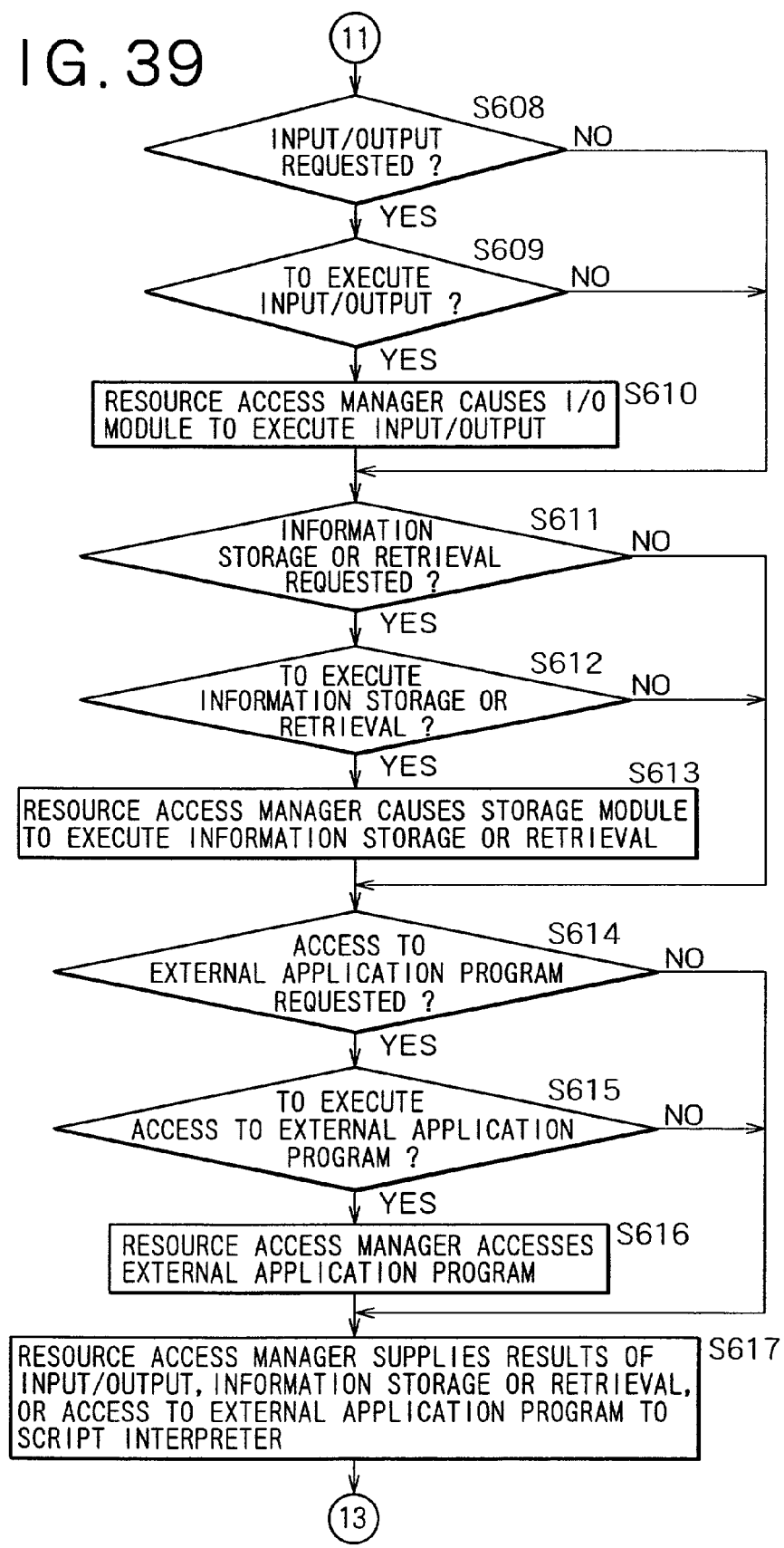
FIG. 39 is a flowchart continued form the flowchart of FIG. 38.
Figure 40:
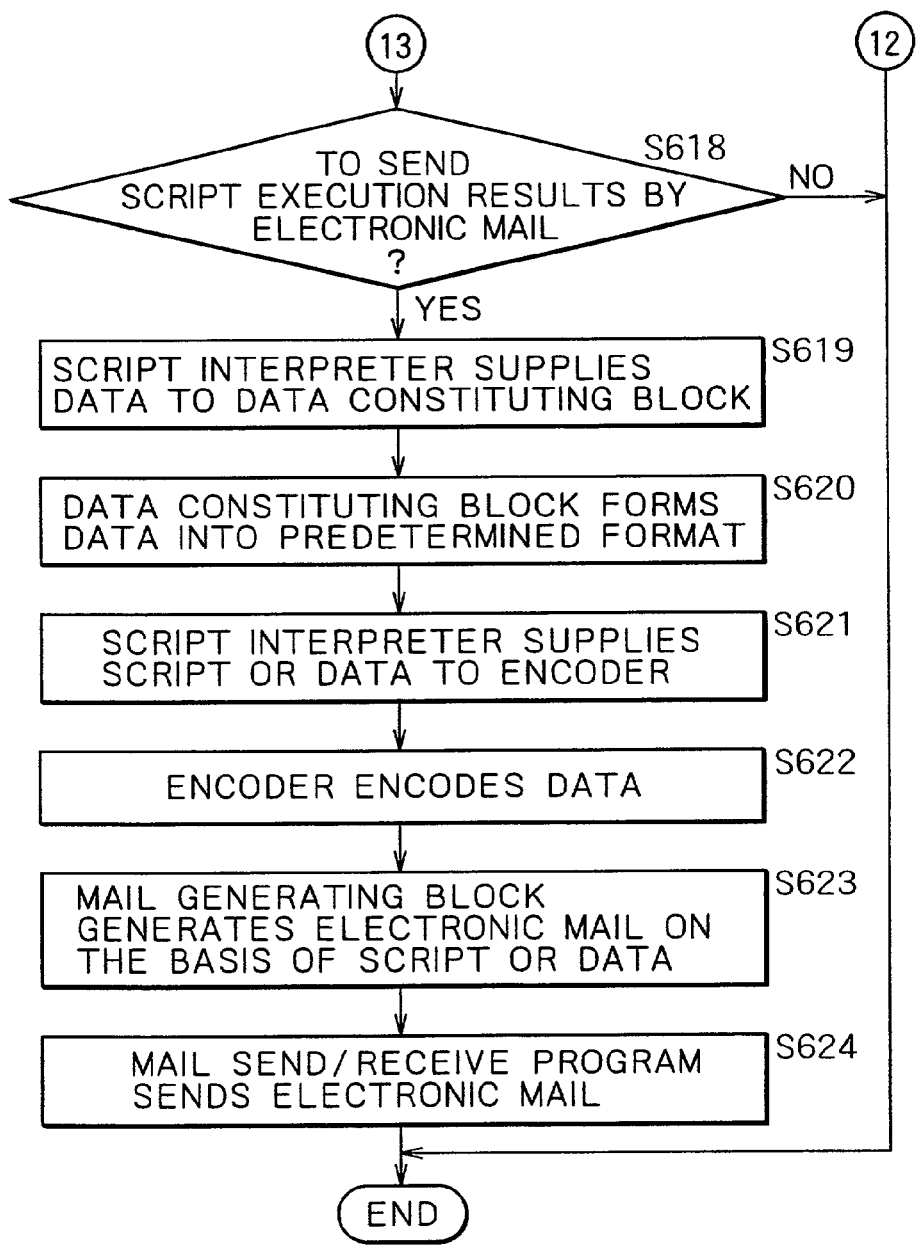
FIG. 40 is a flowchart continued from the flowcharts of FIGS. 38 and 39.

The following describes the processing for executing scripts stored in the script database 521 by the interpreter of which configuration is shown in FIG. 30, with reference to the flowcharts shown in FIGS. 38 through 40.

In step S601, on the basis of the input from the touch pad, the script launcher 520 selects one of the Othello game script 531, the circulation mail script 532, the automatically deleted mail script 533, the animated mail script 534, and the update mail script 535 for example stored in the script database 521 and supplies the selected script to the syntax analysis block 505 via the interface 504.

The processes of steps S602 through S624 are the same as those of steps S507 through S529 and therefore their descriptions are omitted.

Thus, the interpreter of which configuration is shown in FIG. 30 can execute the selected script stored in the script database.

When an input/output operation, information storage or retrieval, or an access to an external application program is requested by the execution of the stored script, the interpreter 106 of which configuration is shown in FIG. 30 can execute the requested input/output operation, information storage or retrieval, or access to an external application program.

By executing the selected script stored in the script database, the interpreter 106 of which configuration is shown in FIG. 30 can send the electronic mail 151 attached with the script or data.

The following describes a specific example of the execution of the script attached to the electronic mail with reference to the flowcharts shown in FIGS. 35 through 37 and a specific example of the script execution described with reference to the flowcharts shown in FIGS. 38 through 40.

For example, the sender of an electronic mail can attach an script thereto for causing the recipient thereof to extract the schedule of a predetermined date from the stored schedule data by a scheduler (for example, the schedule note program 512 shown in FIG. 30) executable by the PDA 1 or the personal computer 3 owned by the mail recipient, thereby making the mail recipient to return (or transfer) the extracted schedule. The electronic mail attached with such a script is referred to as schedule confirmation mail.

Figure 41:
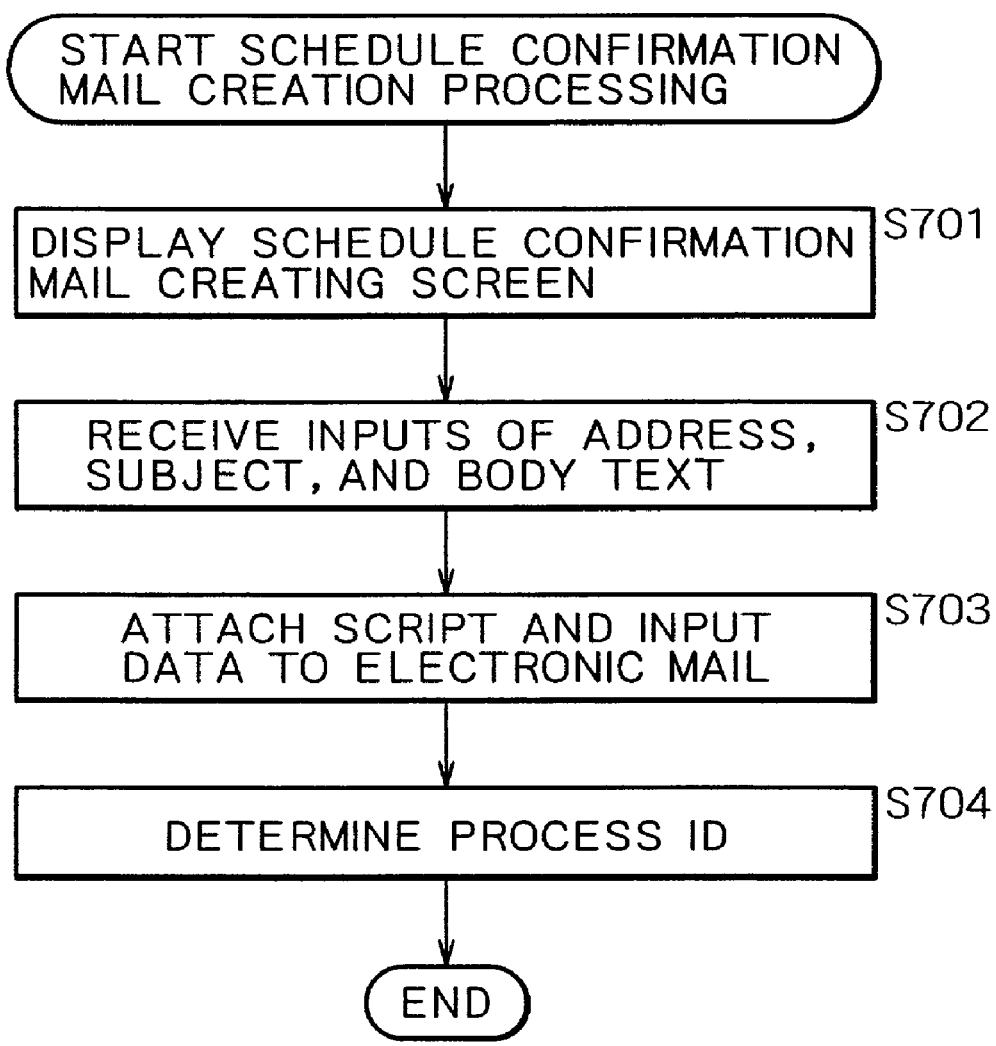
FIG. 41 is a flowchart describing the creation of a schedule confirmation mail.

The following describes, with reference to the flowchart of FIG. 41, the creation of a schedule confirmation mail as a specific example of steps S601 of FIG. 38 and step S623 of FIG. 40. The following description is made on the assumption that the schedule confirmation mail is created on the PDA 1-1 installed with the Palm OS. Basically the same processing is executed when creating the schedule confirmation mail on the personal computer 3 or the camera-mounted digital mobile phone 301 for example.

To send a schedule confirmation mail, the user must create it beforehand. To display a schedule confirmation mail creating screen, the user taps the icon labeled "Schedule Confirmation Mail" on the initial display screen of the Palm OS shown in FIG. 32 for example. Consequently, the script launcher 520 retrieves a schedule confirmation mail script 536 corresponding to the tapped icon from the script database 521 and supplies the retrieved script to the syntax analysis block 505 in step S701. The syntax analysis block 505 converts a predetermined character string contained in the script of the schedule confirmation mail script 536 supplied from the script launcher 520 into an intermediate code which can be processed by the script interpreter 506 and supplies the intermediate code to the script interpreter 506.

Receiving the input from the touch pad (namely, the input by the user for displaying the schedule confirmation mail creating screen), the script interpreter 506 causes the resource access manager 508 to execute the processing for displaying the schedule confirmation mail creating screen. The resource access manager 508 displays the schedule confirmation mail creating screen onto the display block 21 via the platform resource access interface 509 and the I/O module 510. Consequently, the schedule confirmation mail creating screen as shown in FIG. 42 for example is displayed on the display block 21.

Figure 42:
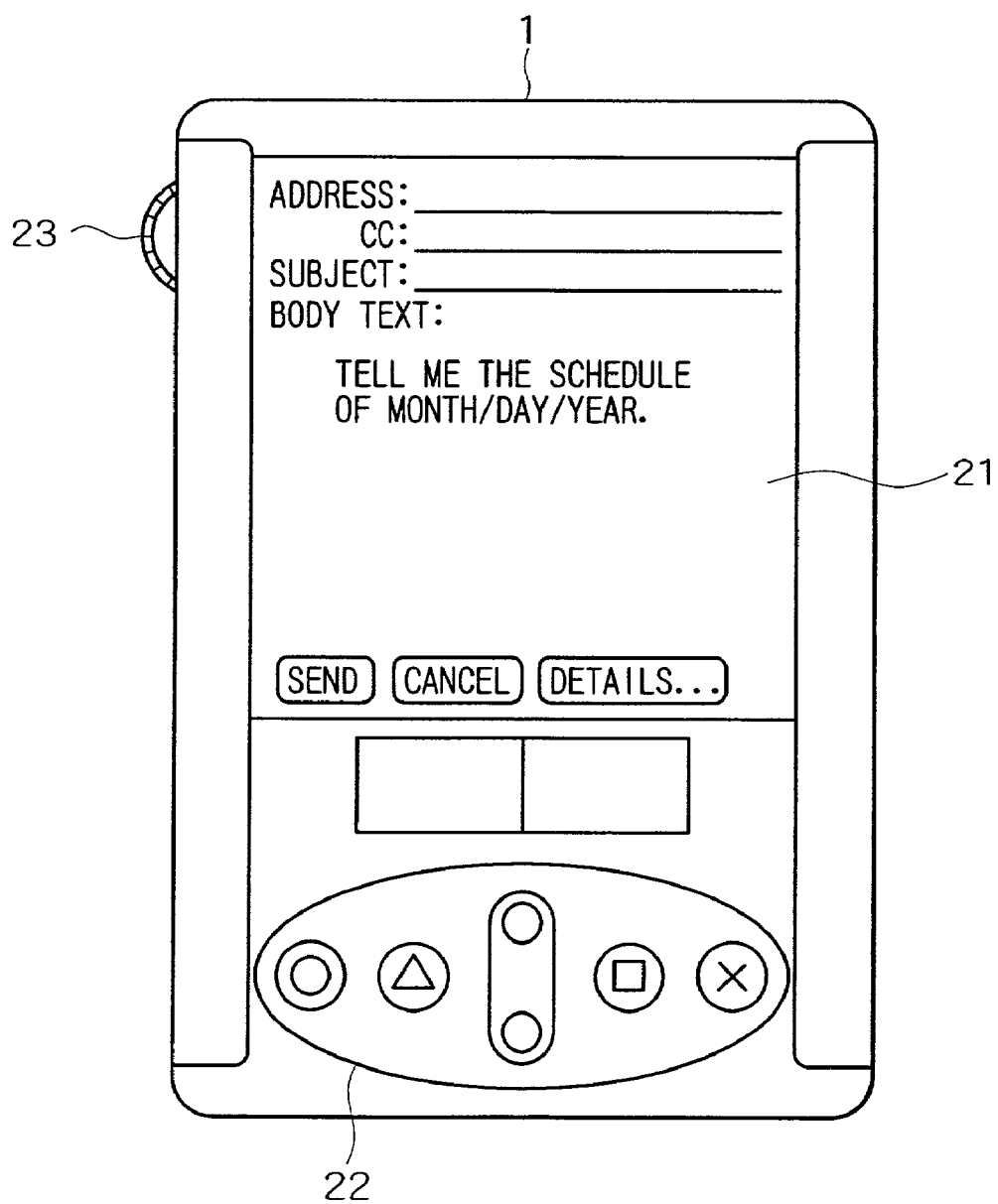
FIG. 42 is the top view of the PDA on which a schedule confirmation mail creating screen is shown.

On the schedule confirmation mail creating screen shown in FIG. 42, the user can enter mail address, carbon copy (CC) sending destination, mail subject, and schedule date to be confirmed.

Referring to the schedule confirmation mail creating screen shown on the display block 21, the user enters necessary information into the corresponding spaces. In step S702, the script interpreter 506 receives the entries (the address (including CC), subject, and schedule date to be confirmed inputted by the user) from the touch pad.

The script interpreter 506 supplies the script to be attached to the electronic mail to the mail generating block 519 via the interface 504 and the encoder 518 and, at the same time, supplies the data inputted by the user to the mail generating block 519 via the data constituting block 517, the interface 504, and the encoder 518. It should be noted that the script to be attached to the electronic mail may either be contained in the schedule confirmation mail script 536 being executed or recorded to the script database 521.

In step S703, the mail generating block 519 attaches the script and input data supplied from the script interpreter 506 to the electronic mail and creates a schedule confirmation mail having the format of the electronic mail 151 shown in FIG. 12 containing the script.

In step S704, the mail generating block 519 determines the process ID unique to each schedule mail and associates the determined process ID with the electronic mail 151 (schedule confirmation mail) created in step S703. Then, the procedure goes to step S624 shown in FIG. 40, in which the mail send/receive program 104 sends the schedule confirmation mail.

Thus, the schedule of the mail recipient can be automatically extracted and, at the same time, the electronic mail 151 attached with the script for returning the extracted schedule can be created.

Figure 43:
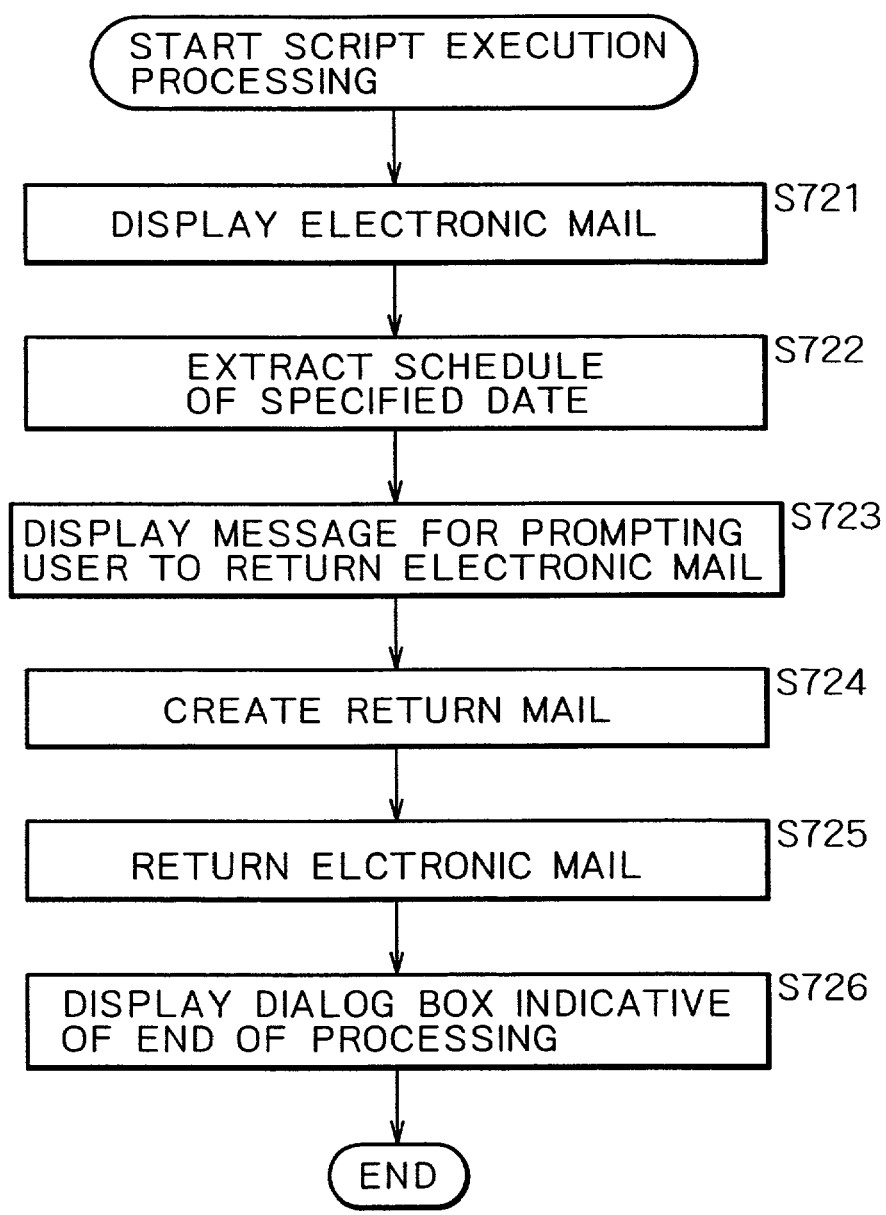
FIG. 43 is a flowchart describing the processing of script execution.

The following describes, with reference to the flowchart shown in FIG. 43, script execution processing as a specific example of the processing to be executed in steps S510 shown in FIG. 35 through S529 shown in FIG. 37 by the PDA 1-2 which has received the schedule confirmation mail generated by the above-mentioned schedule confirmation mail creating processing shown in FIG. 42.

In step S721, the script interpreter 506 executes the script attached to the received mail (to be more specific, the script interpreter 506 executes show( ) method of the script extracted in step S503 of FIG. 35, thereby causing the resource access manager 508 to execute the processing of displaying the body text of the received mail. The resource access manager 508 displays the body text of the received mail onto the display block 21 via the platform resource access interface 509 and the I/O module 510. Consequently, the received mail as shown in FIG. 44 for example is displayed on the display block 21.

Figure 44:
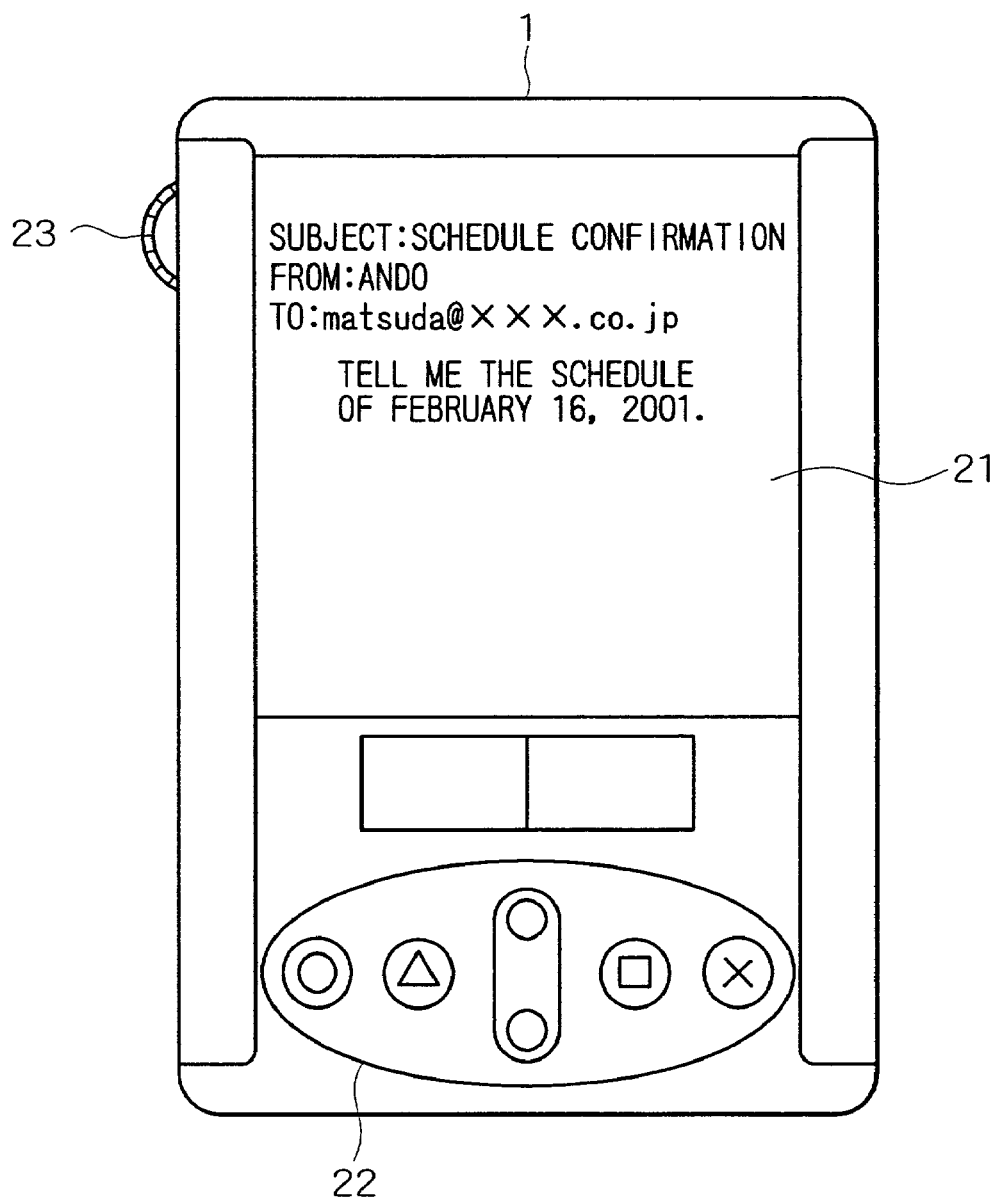
FIG. 44 is the top view of the PDA on which a received schedule confirmation mail is displayed.

The received mail shown in FIG. 44 carries a subject and a date to be confirmed (message "Tell me the schedule of February 16, 2001") set in step S702 of FIG. 41.

In step S722, on the basis of the data attached to the script, the script interpreter 506 causes the resource access manager 508 to execute the processing of extracting the schedule of the date specified by the execution of the script. The resource access manager 508 accesses a schedule database managed by the schedule note program 512 stored in the flash ROM 33 via the platform resource access interface 509 and the storage module 511 to extract the schedule of the date specified by the execution of the script from the schedules stored in the schedule database.

In step S723, the script interpreter 506 causes the resource access manager 508 to execute the processing of displaying a dialog box in which a message for prompting the return of the electronic mail is displayed. The resource access manager 508 displays the dialog box on the display block 21 via the platform resource access interface 509 and the I/O module 510. Consequently, a dialog box 601 as shown in FIG. 45 for example is displayed.

Figure 45:
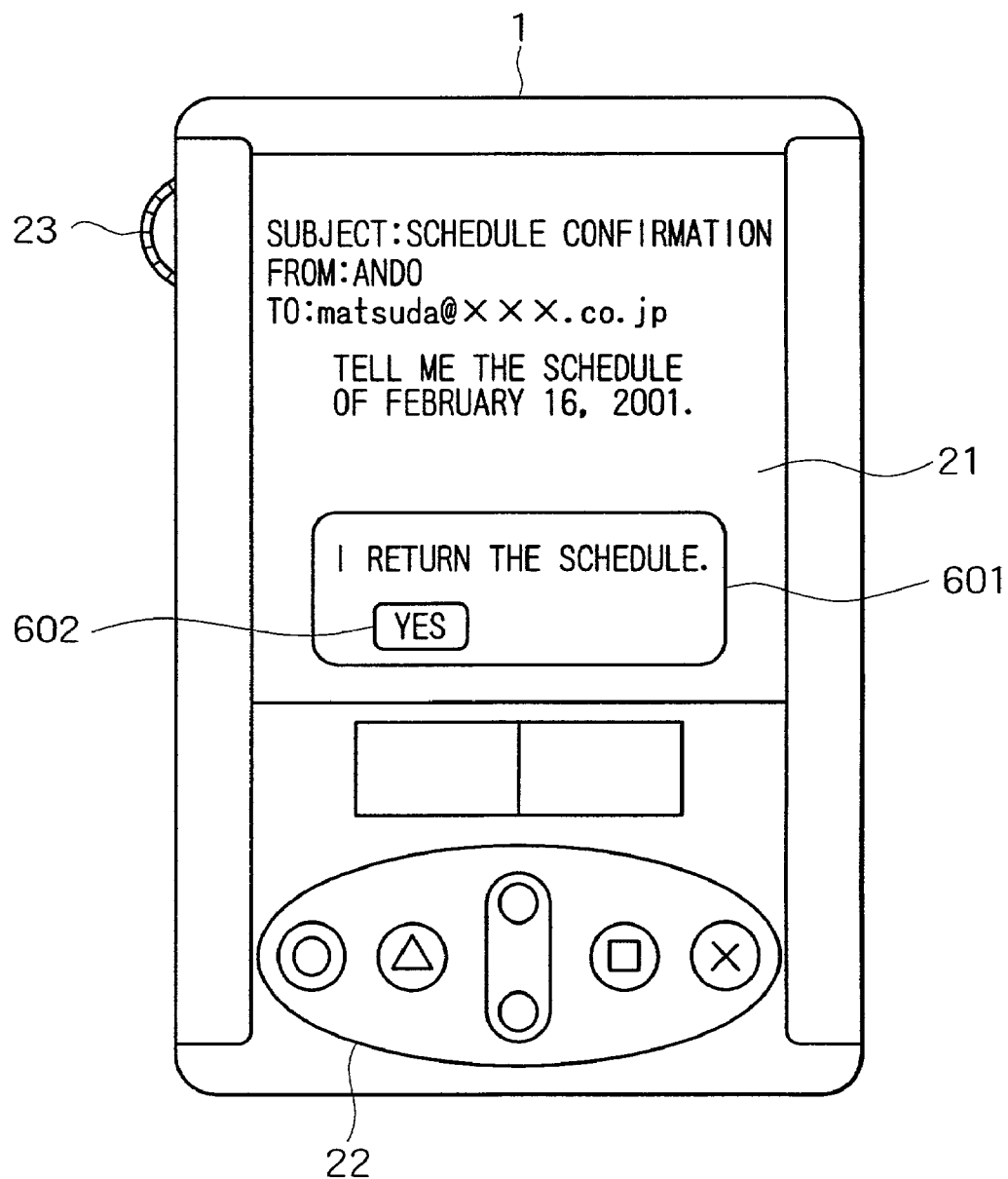
FIG. 45 is the top view of the PDA on which a dialog box is displayed.

The dialog box 601 in FIG. 45 shows a message "I return the schedule" and "Yes" button 602 which is used for prompting the returning of an electronic mail.

When the user taps "Yes" button 602, the script interpreter 506 supplies the schedule data extracted by the resource access manager 508 to the mail generating block 519 via the data constituting block 517, the interface 504, and the encoder 518 in step S724.

The mail generating block 519 creates the return mail by attaching the schedule data supplied from the script interpreter 506. The created return mail is supplied to the mail send/receive program 104 via the mail send/receive program plugin interface 501.

In step S725, the mail send/receive program 104 attaches the process ID of the returned schedule confirmation mail to the return mail supplied from the mail generating block 519 and returns the resultant return mail to the sender.

In step S726, the script interpreter 506 causes the resource access manager 508 to display a dialog box indicative of the end of the processing. The resource access manager 508 displays the dialog box on the display block 21 via the platform resource access interface 509 and the I/O module 510, upon which the processing comes to an end. Consequently, a dialog box 611 indicative of the end of the processing as shown in FIG. 46 for example is displayed.

Figure 46:
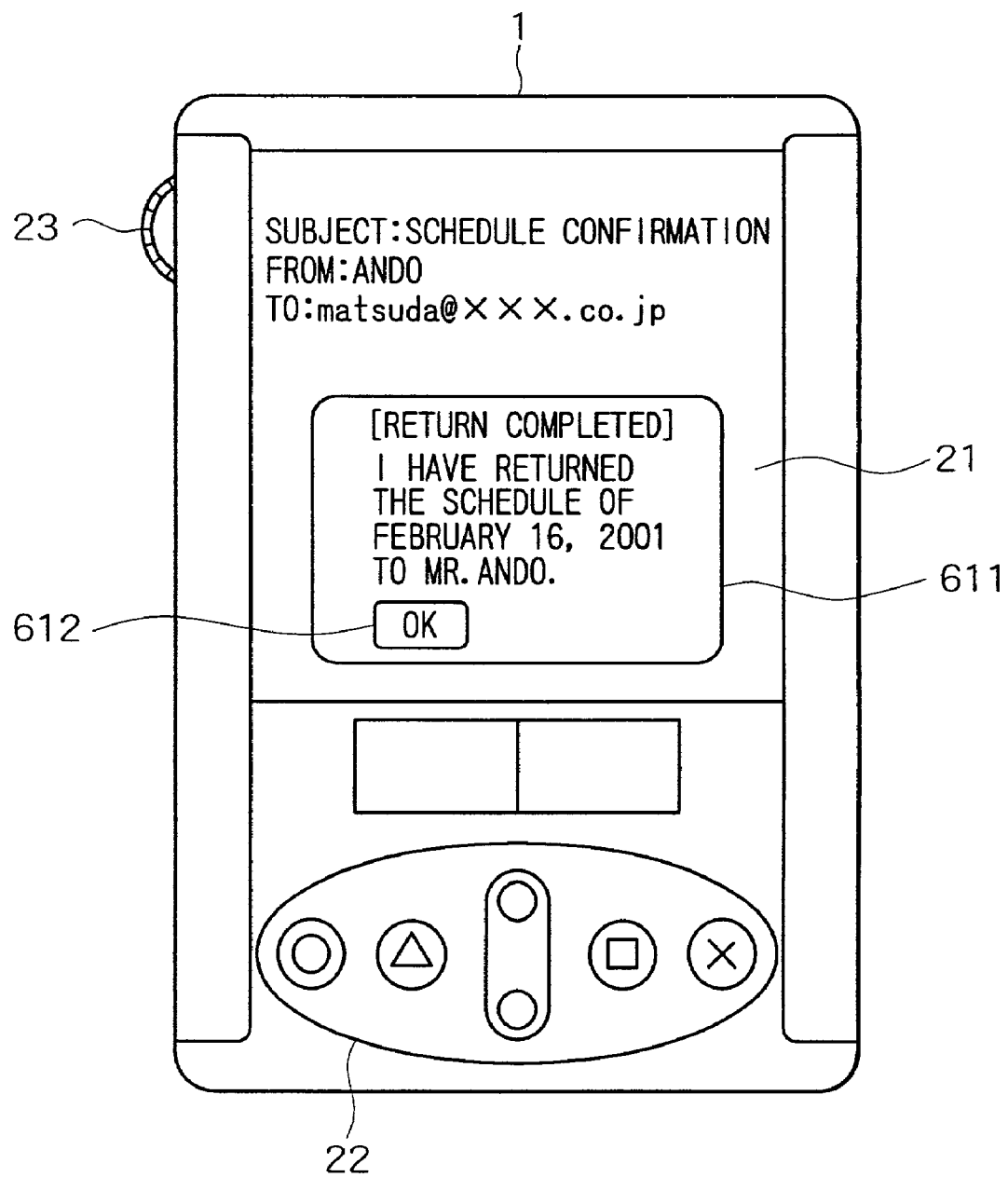
FIG. 46 is the top view of the PDA on which another dialog box is displayed.

The dialog box 611 in FIG. 46 shows a message "I have returned the schedule of February 16, 2001 to Mr. Ando" and an OK button 612 for prompting the confirmation of the electronic mail.

As described, the recipient of each electronic mail attached with the script can return a predetermined schedule to the sender of each schedule confirmation mail without exiting the mailer activated by the PDA 1-2 and then activating the scheduler to confirm the schedule. The sender of each schedule confirmation mail having the PDA 1-1 can receive a return mail as shown in FIG. 47 for example.

Figure 47:
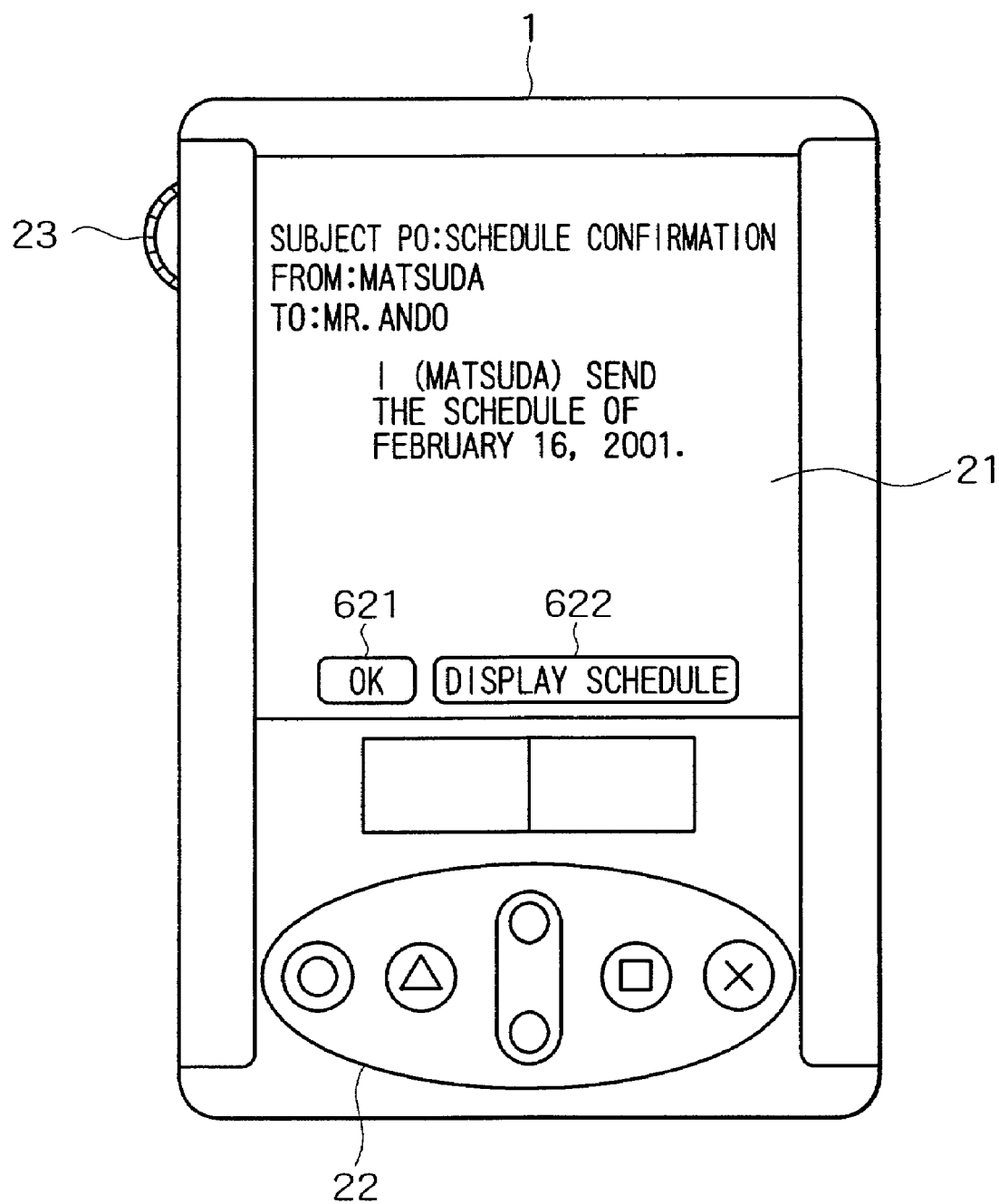
FIG. 47 is the top view of the PDA on which a received return mail is displayed.

The return mail in FIG. 47 shows a message "I (Matsuda) send my schedule of February 16, 2001," an OK button 621 which tapped when ending the currently displayed electronic mail, and a schedule display button 622 which is tapped when displaying the received schedule data.

When the user taps the schedule display button 622 shown in FIG. 47, the script interpreter 506 causes the resource access manager 508 to access the schedule note program 512 via the platform resource access interface 509, starting the scheduler. The schedule note program 512 displays a schedule table (a schedule note) as shown in FIG. 48 onto the display block 21 on the basis of the schedule data attached to the electronic mail.

Figure 48:
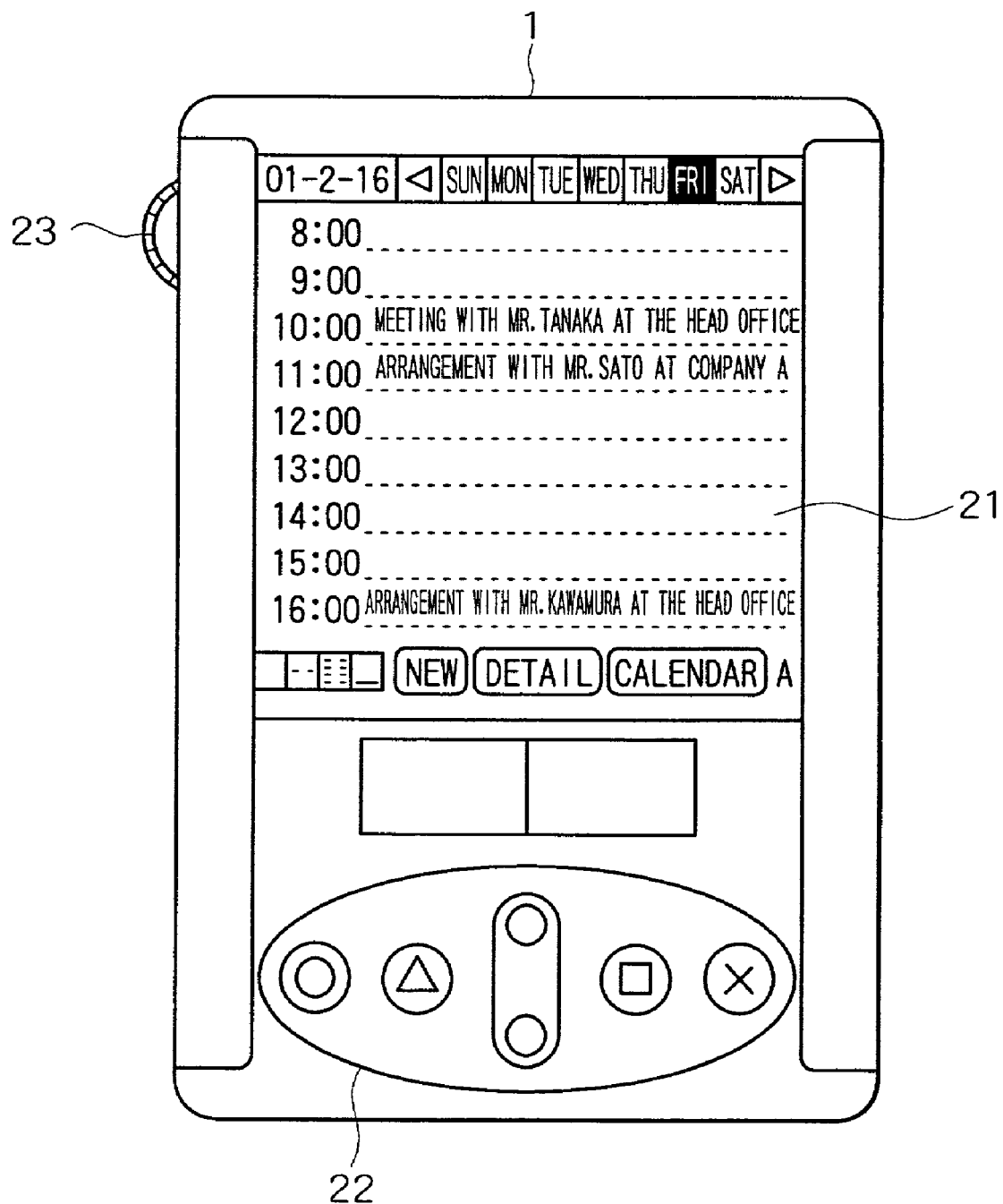
FIG. 48 is the top view of the PDA on which a schedule table display screen is shown.

The schedule table in FIG. 48 shows items "10:00 Meeting with Mr. Tanaka at the head office," "11:00 Arrangement with Mr. Sato at company A," and "16:00 Arrangement with Mr. Kawamura at the head office."

Namely, the schedule table retrieved from the recipient of the schedule confirmation mail displayed on the PDA 1-1 of the sender of the schedule confirmation mail is exactly the same as the schedule table displayed on the PDA 1-2 of the recipient of the schedule confirmation mail.

As described, attaching the script for extracting the schedule of a predetermined date and sending the extracted schedule to the recipient to the electronic mail 151 allows the sender of the electronic mail 151 to easily get (or confirm) the schedule of the predetermined date without bothering the recipient of the electronic mail 151.

Meanwhile, by attaching the above-mentioned script to an electronic mail, a predetermined action is executed in cooperation with the opening of the received mail at the recipient side. However, this poses a risk that the confidential personal information for example of the recipient is accessed by the sender.

To eliminate the above-mentioned risk, namely, to prevent any malicious user from retrieving the confidential personal information of the recipient, the personal information may be attached with the attribute of volatility for example.

The following describes the setting for preventing the leakage of personal information.

To prevent a malicious mail attached with a script for extracting and transmitting the personal information of the recipient from being inadvertently opened by the user, resulting in the theft of the personal information, the attribute of volatility must be attached to the personal information.

Figure 49:
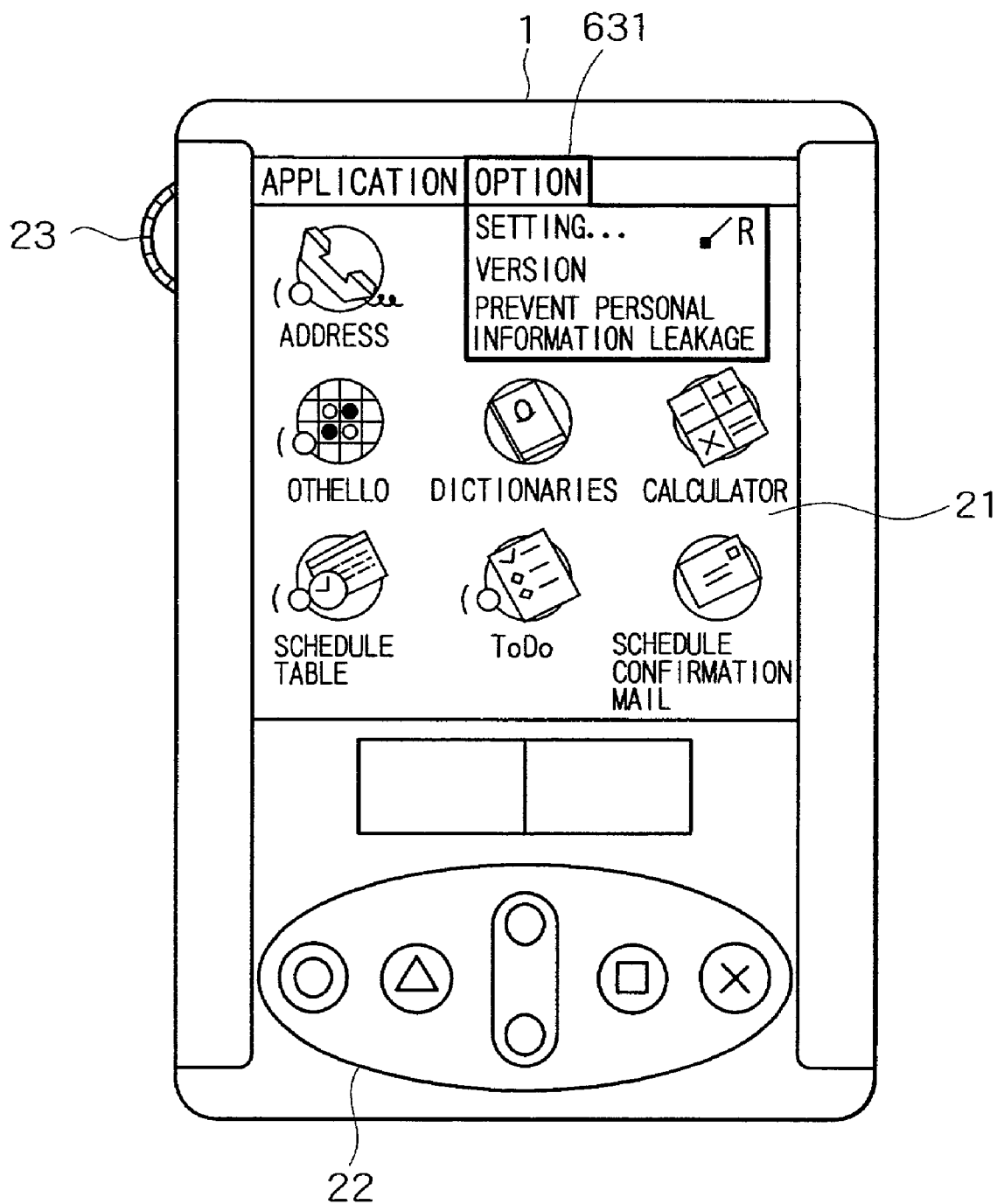
FIG. 49 is the top view of the PDA on which an option tag is displayed.

For the user to display a personal information leakage prevention setting screen, the user taps a tag button (not shown) arranged in the upper side of the Palm OS initial display screen shown in FIG. 32 for example to display an option tag 631 shown in FIG. 49 and selects (or taps) item "Prevent Personal Information Leakage" in the option tag 631.

Receiving the input from the touch pad (namely, the user input for displaying the personal information leakage prevention setting screen), the script interpreter 506 causes the resource access manager 508 to display the personal information leakage prevention setting screen. The resource access manager 508 displays the personal information leakage prevention setting screen onto the display block 21 via the platform resource access interface 509 and the I/O module 510. Consequently, the personal information leakage prevention setting screen as shown in FIG. 50 for example is displayed on the display block 21.

Figure 50:
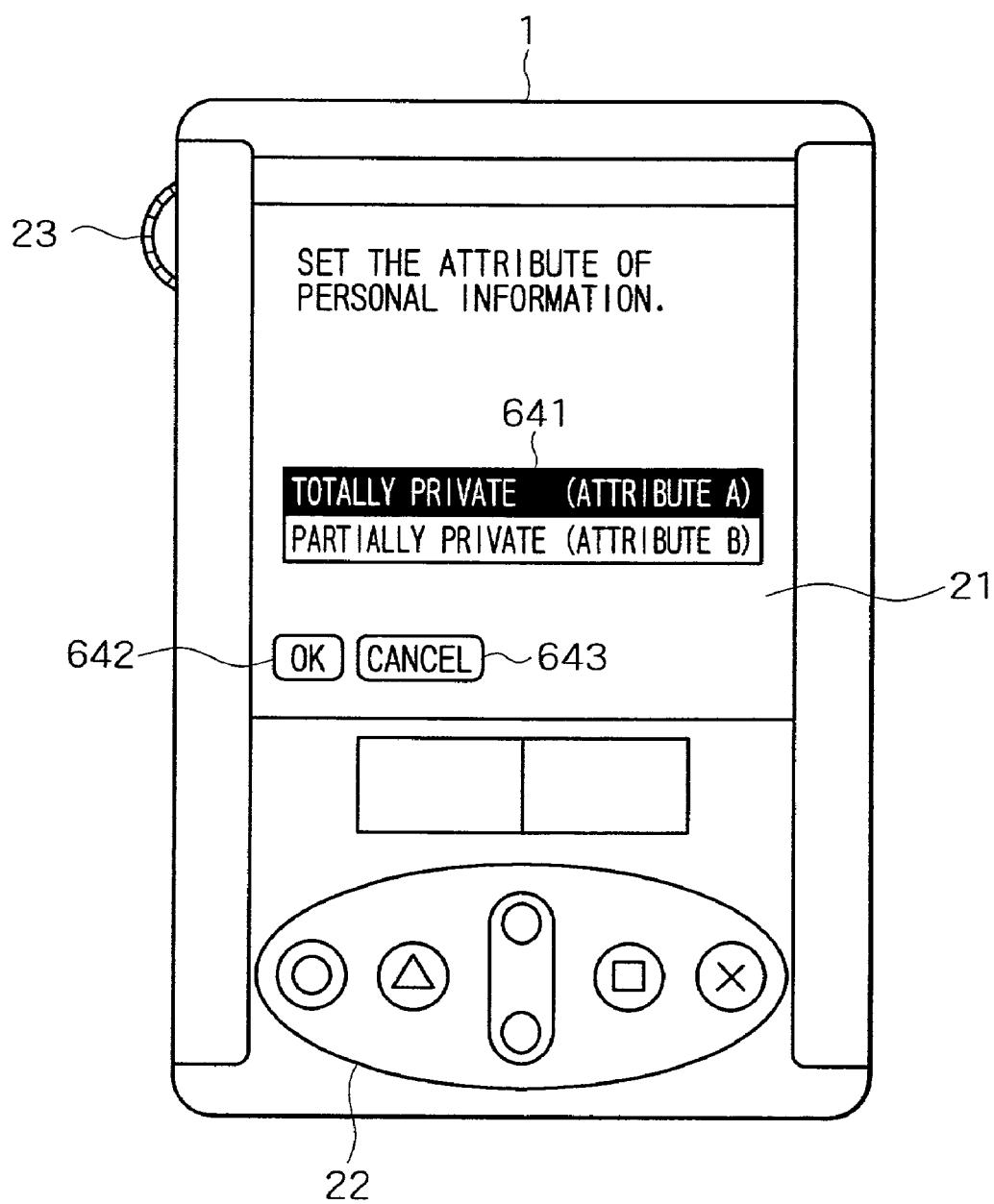
FIG. 50 is the top view of the PDA on which a personal information leakage prevention setting screen is displayed.

The personal information leakage prevention setting screen in FIG. 50 shows a message "Set the attribute of personal information," a list box 641 for setting the prevention of personal information leakage, an OK button 642 which is tapped to confirm the settings, and a cancel button 643 which is tapped to cancel the settings.

The user references the personal information leakage prevention setting screen shown on the display block 21 and selects the desired item to be set from the list box 641.

For example, if the user selects item "Totally Private," the script interpreter 506 causes the resource access manager 508 to execute the recording of data so as to prevent all the personal information (for example, schedule tables and addresses) from being taken out of the PDA 1. The resource access manager 508 accesses the flash ROM 33 or the EDO DRAM 34 via the platform resource access interface 509 and the storage module 511 to attach volatility attribute A (hereafter referred to as attribute A) to the personal information stored in the flash ROM 33 or the EDO DRAM 34.

If the user selects item "Partially Private," the script interpreter 506 causes the resource access manager 508 to execute the recording of data so as to prevent some of the personal information (for example, the private personal information rather than the private information for the company) from being taken out of the PDA 1. The resource access manager 508 accesses the flash ROM 33 or the EDO DRAM 34 to attach volatility attribute B (hereafter referred to as attribute B) to the personal information stored in the flash ROM 33 or the EDO DRAM 34.

FIG. 51 shows an example of the recording of the schedule data associated with the schedule table stored in the flash ROM 33 or the EDO DRAM 34. As shown, each piece of the schedule data is attached with attribute A by the above-mentioned setting for personal information leakage prevention.

Figure 52:
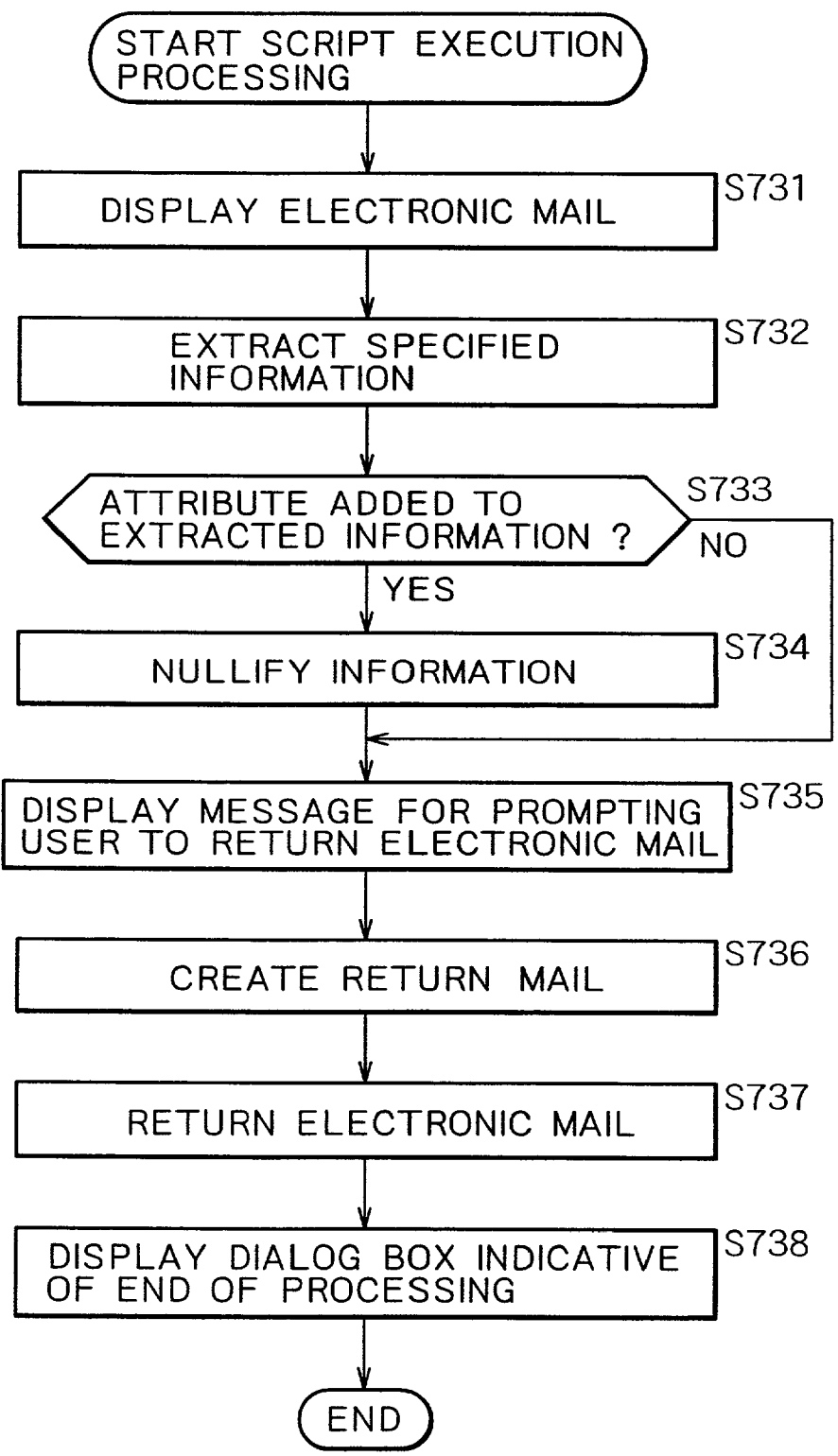
FIG. 52 is a flowchart describing the processing of script execution.

The following describes, with reference to the flowchart shown in FIG. 52, the processing of executing a script to be performed by the PDA 1 which has received a schedule confirmation mail generated by the above-mentioned schedule confirmation mail creating processing shown in FIG. 41 when the attribute of volatility (in this example, attribute A) is attached to personal information as shown in FIG. 51.

The processing operations of steps S731 and S732 are the same as those of steps S721 and S722 of FIG. 43, so that their descriptions will be skipped.

In step S733, the data constituting block 517 determines whether or not the information (in this example, schedule data) supplied from the script interpreter 506 is attached with the attribute of volatility. If the attribute of volatility is found attached to the information supplied from the script interpreter 506, then, in step S734, the data constituting block 517 nullifies (or deletes) the personal information contained in the information supplied from the script interpreter 506.

If the attribute of volatility is found not attached to the information supplied from the script interpreter 506 in step S733, then the processing of step S734 is skipped and the procedure goes to step S735.

The processing operations of steps S735 through S738 are the same as those of steps S723 through S726 of FIG. 43, so that their descriptions will be skipped.

Figure 53:
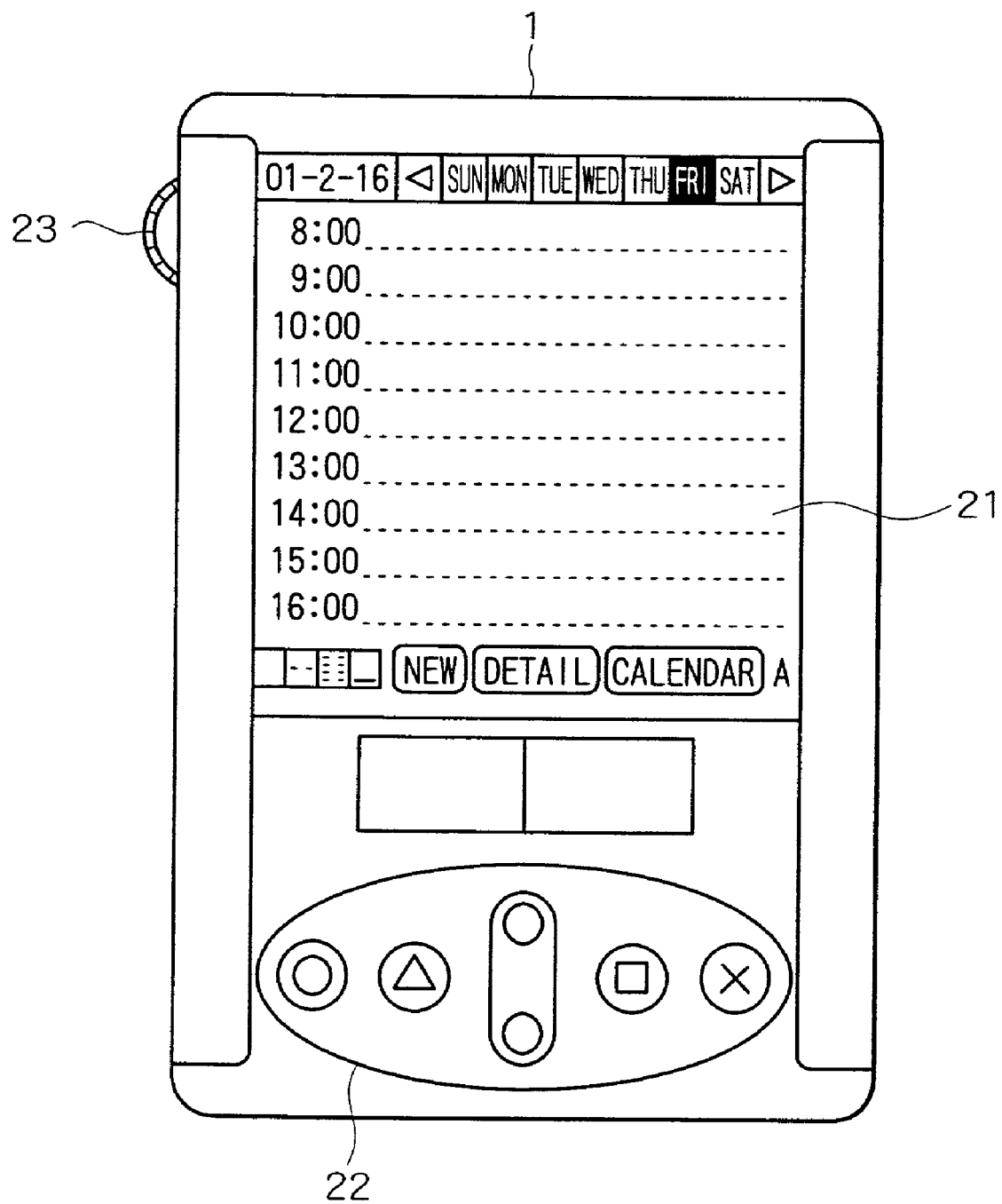
FIG. 53 is the top view of the PDA on which another schedule table display screen is shown.

By the above-described processing, the sender of the schedule confirmation mail can receive the return mail as shown in FIG. 47, but the schedule as shown in FIG. 48 is not displayed for the schedule table shown in FIG. 53 which is displayed when the schedule display button 622 is tapped.

Consequently, if a malicious mail attached with a script which is intended to take without notice the personal information from the PDA 1-2 is sent thereto from the PDA 1-1, the PDA 1-2 can foil this attempt by the above-mentioned setting of personal information leakage prevention.

Thus, selecting attribute A or attribute B from the list box 641 in the personal information leakage prevention setting screen described with reference to FIG. 50 allows the user to prevent his/her personal information from being unintentionally leaked.

However, depending on user's schedule, some information can be disclosed to the third party. In such a case, the user taps a scheduled item in the schedule table shown in FIG. 48, upon which, in response to the input from the touch pad, the script interpreter 506 causes the resource access manager 508 to display the personal information leakage prevention setting screen. The resource access manager 508 displays the personal information leakage prevention setting screen onto the display block 21 via the platform resource access interface 509 and the I/O module 510. Consequently, the personal information leakage prevention setting screen as shown in FIG. 54 for example is displayed on the display block 21.

Figure 54:
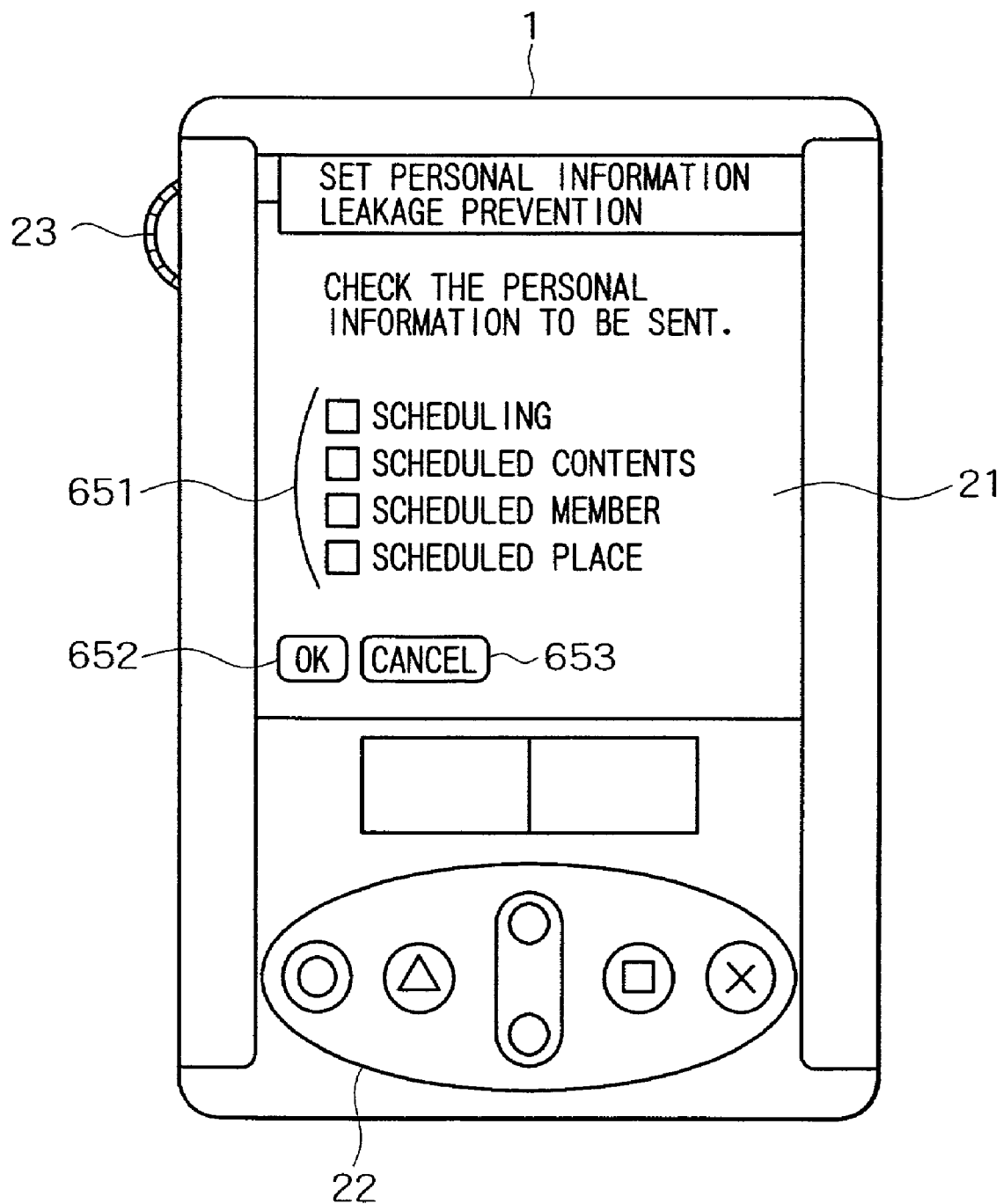
FIG. 54 is the top view of the PDA on which another personal information leakage prevention setting screen is shown.

The personal information leakage prevention setting screen in FIG. 54 shows a message "Check the personal information to be sent," check boxes 651, an OK button 652 which is tapped to confirm the checked personal information, and a cancel button 653 which is tapped to cancel the checking.

For example, if item "Scheduling" is checked and, when the script execution processing described with reference to FIG. 52 is executed, the data constituting block 517 nullifies the personal information other than "Scheduling" in step S734 to convert only message data "Scheduled" for example into a predetermined data structure, supplying the converted message data to the mail generating block 519 via the interface 504 and the encoder 518.

For the other items, if item "Scheduled contents" is checked, the personal information other than "Scheduled contents" is nullified in the data constituting block 517. If item "Scheduled member" is checked, the personal information other than "Scheduled members" is nullified in the data constituting block 517. If item "Scheduled place" is checked, the personal information other than "Scheduled place" is nullified in the data constituting block 517.

For example, if the user does not want to disclose his/her schedule outside his/her firm to any third party and if the user can disclose only the schedule inside his/her firm, then the user taps item "10:00 Meeting with Mr. Tanaka at the head office " in the schedule table shown in FIG. 48 to display the personal information leakage prevention setting screen onto the display block 21 and checks item "Scheduled contents" among the check boxes 651. Also, the user taps item "Arrangement with Mr. Kawamura at the head office" in the schedule table shown in FIG. 48 to display the personal information leakage prevention setting screen onto the display block 21 and checks item "Scheduled contents" among the check boxes 651.

The sender of the schedule confirmation mail receives the return mail as shown in FIG. 47. When the schedule display button 622 is tapped, the script interpreter 506 causes the resource access manager 508 to access the schedule note program 512 via the platform resource access interface 509 to start the scheduler. On the basis of the schedule data attached to the received mail, the schedule note program 512 displays a schedule table as shown in FIG. 55 onto the display block 21.

Figure 55:
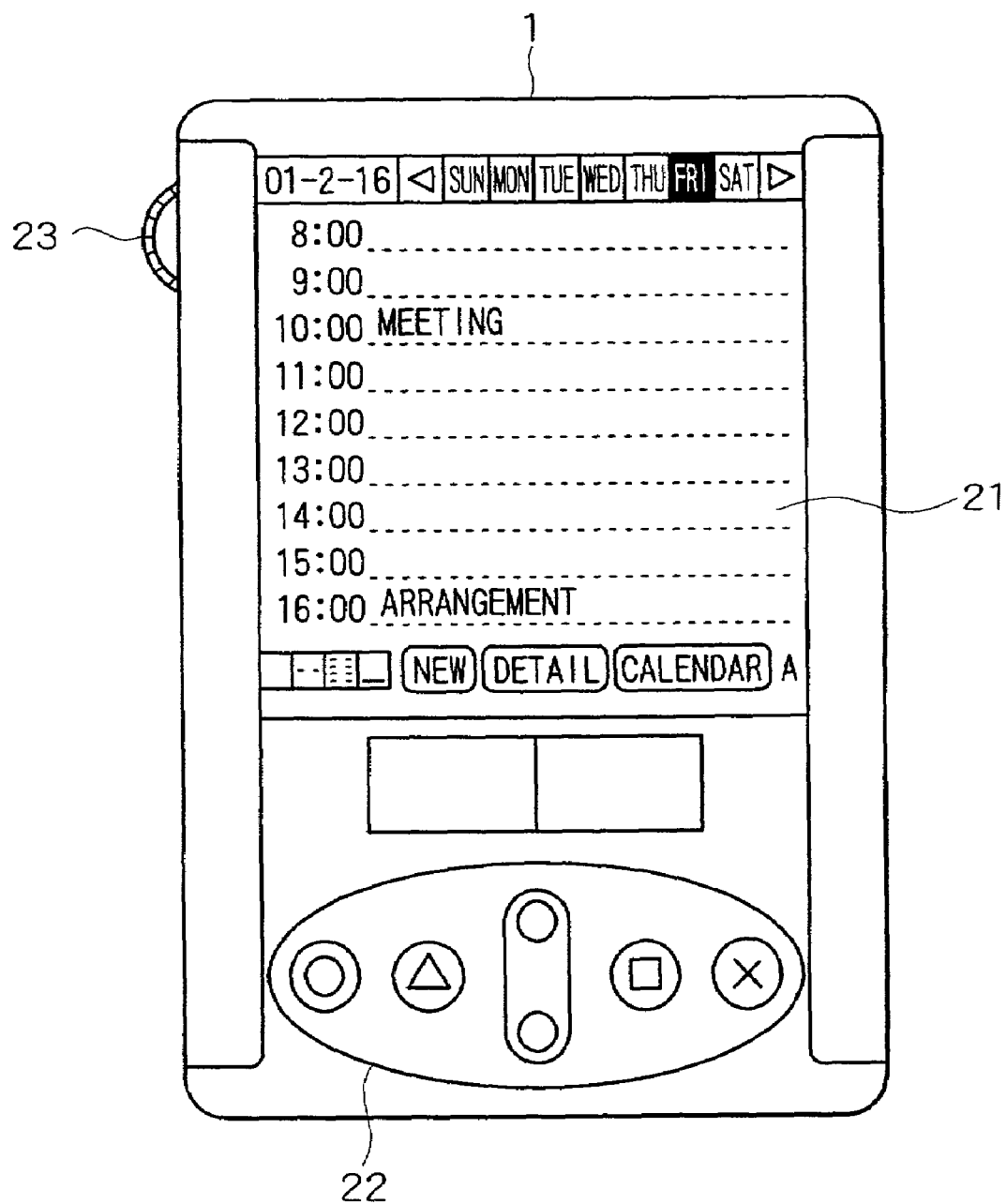
FIG. 55 is the top view of the PDA on which still another schedule table display screen is shown.

The schedule table in FIG. 55 shows items "10:00 Meeting" and item "16:00 Arrangement."

As described above, the setting for completely preventing the leakage of personal information may be made or the setting for unconditional disclosing of a schedule to any third party depending on its contents may be made.

In the above-mentioned example, the prevention of leakage of the personal information of schedule data managed by the schedule note program 512 is executed. It will be apparent that present invention is also applicable to the prevention of leakage of the personal information of address data managed by the address note program 513. In this case, all the address data may be set to nondisclosure or only the address data of official corporate names may be disclosed, which the user can set as required.

In the above-mentioned example, the electronic mails containing scripts are sent and received via the Internet 4. It will also be apparent that the same processing can be executed with other communication methods such as wireless communications based on radio or electromagnetic wave, infrared ray, and Bluetooth or wired communications based on predetermined cables.

The recording medium may be a package medium constituted by the magnetic disc 61 (including floppy disc), the optical disc 62 (including CD-ROM (Compact Disc-Read Only Memory) and DVD (Digital Versatile Disc)), the magneto-optical disc 63 (including MD (Mini-Disc)), or the semiconductor memory 64 shown in FIG. 5 or the flash ROM 33 or a hard disc in which programs are stored temporarily or permanently. The storage of programs in these recording media is executed by use of wired or wireless communication media such as the public switched network 202, a local area network, the Internet 4, or digital satellite broadcasting via the interfaces such as router and modem as required.

It should be noted that the steps describing the programs to be stored in the program storage medium are not only executed in a time-series manner in the order described, but also in parallel or in a discrete manner.

Term "system" used herein denotes a total apparatus composed of a plurality of component devices.

As described and according to the receiving apparatus and method, the recording medium, and the program associated with the present invention, a script added as an attachment file to an electronic mail is extracted therefrom in response to a mail opening command, a syntax analysis is performed on the extracted script, predetermined information stored in the receiving apparatus is retrieved on the basis of the result of the syntax analysis, the retrieved predetermined information is determined whether or not it is attached with a predetermined attribute, and, if the predetermined attribute is found attached to the predetermined information, the personal information contained in the predetermined information is deleted, thereby outputting the predetermined information with the personal information deleted. Consequently, the novel setup can prevent the personal information of recipients of electronic mails containing a script which is intended to take out the personal information without notice.

While the preferred embodiments of the present invention have been described using specific terms, such description is for illustrative purposes only, and it is to be understood that changes and variations may be made without departing from the spirit or scope of the appended claims.

What is claimed is:

1. A receiving apparatus for receiving an electronic mail, comprising:
   an extracting means for extracting a script added to said electronic mail as an attachment file in response to an opening command for opening said electronic mail;
   an executing means for executing a syntax analysis on said script extracted by said extracting means;
   a retrieving means for retrieving predetermined information and associated personal information stored in said receiving apparatus on the basis of the execution of said syntax analysis;
   a determining means for determining whether or not an attribute distinct from the associated personal information is attached to said predetermined information retrieved by said retrieving means;
   a deleting means for deleting all or only a part of the personal information associated with said predetermined information in accordance with said attribute when said attribute is determined to be attached to said predetermined information by said determining means; and
   an output control means for controlling the output of said predetermined information so that the predetermined information is output without said associated personal information deleted by said deleting means.

2. The receiving apparatus according to claim 1, further comprising:
   a return control means for storing return electronic mail to be returned with said predetermined information output by said output control means and controlling returning of said return electronic mail.

3. The receiving apparatus according to claim 1, still further comprising:
   an adding means for selectively adding said attribute as said separate attachment.

4. The receiving apparatus according to claim 1, wherein said script is written with a syntax for controlling the output of predetermined information stored in said receiving apparatus.

5. The receiving apparatus according to claim 1, wherein said attribute has a different characteristic to indicate whether all or only a part of the personal information associated with said predetermined information is to be deleted.

6. The receiving apparatus according to claim 1, wherein said predetermined information is at least one of schedule table data and address data.

7. A receiving method for a receiving apparatus for receiving an electronic mail, comprising the steps of:
   extracting a script added to said electronic mail as an attachment file in response to an opening command for opening said electronic mail;
   executing a syntax analysis on said script extracted in the extracting step;
   retrieving predetermined information and associated personal information stored in said receiving apparatus on the basis of the execution of said syntax analysis;
   determining whether or not an attribute distinct from the associated personal information is attached to said predetermined information retrieved in the retrieving step;
   deleting all or only a part of the personal information associated with said predetermined information in accordance with said attribute when said attribute is determined to be attached to said predetermined information in the determining step; and
   controlling the output of said predetermined information so that the predetermined information is output without said associated personal information deleted in the deleting step.

8. A tangible recording medium recording a computer-readable program for controlling a receiving apparatus for receiving an electronic mail, comprising the steps of:
   extracting a script added to said electronic mail as an attachment file in response to an opening command for opening said electronic mail;
   executing a syntax analysis on said script extracted in the extracting step;
   retrieving predetermined information and associated personal information stored in said receiving apparatus on the basis of the execution of said syntax analysis;
   determining whether or not an attribute distinct from the associated personal information is attached to said predetermined information retrieved in the retrieving step;
   deleting all or only a part of the personal information associated with said predetermined information in accordance with said attribute when said attribute is determined to be attached to said predetermined information in the determining step; and
   controlling the output of said predetermined information so that the predetermined information is output without said associated personal information deleted in the deleting step.

9. A receiving apparatus for receiving an electronic mail, comprising:

an extractor configured to extract a script added to said electronic mail as an attachment file in response to an opening command for opening said electronic mail;

a syntax analysis unit configured to execute a syntax analysis on said script extracted by said extractor;

a retrieval unit configured to retrieve predetermined information and associated personal information stored in said receiving apparatus on the basis of the execution of said syntax analysis;

a determination unit configured to determine whether or not an attribute distinct from the associated personal information is attached to said predetermined information retrieved by said retrieval unit;

a deletion unit configured to delete all or only a part of the personal information associated with said predetermined information in accordance with said attribute when said attribute is determined to be attached to said predetermined information by said determination unit; and an output controller configured to control the output of said predetermined information so that the predetermined information is output without said associated personal information deleted by said deletion unit.

10. The receiving apparatus according to claim 9, further comprising:

a return controller configured to control return of electronic mail with said predetermined information output by said output controller.

11. The receiving apparatus according to claim 9, still further comprising:

an adder configured to selectively add said attribute as said separate attachment.

12. The receiving apparatus according to claim 9, wherein said script is written with a syntax for controlling the output of predetermined information stored in said receiving apparatus.

13. The receiving apparatus according to claim 9, wherein said attribute has a different characteristic to indicate whether all or only a part of the personal information associated with said predetermined information is to be deleted.

14. The receiving apparatus according to claim 9, wherein said predetermined information is at least one of schedule table data and address data.

* * * * *